US00RE40103E

(19) United States
(12) Reissued Patent
Mitsutake et al.

(10) Patent Number: US RE40,103 E
(45) Date of Reissued Patent: Feb. 26, 2008

(54) ELECTRON BEAM APPARATUS AND IMAGE FORMING APPARATUS

(75) Inventors: Hideaki Mitsutake, Yokohama (JP); Shinichi Kawate, Sagamihara (JP); Naoto Nakamura, Isehara (JP); Yoshihisa Sano, Ebina (JP)

(73) Assignee: Canon Kabushiki Kaisha, Tokyo (JP)

(21) Appl. No.: 10/640,269

(22) Filed: Aug. 14, 2003

Related U.S. Patent Documents

Reissue of:
(64) Patent No.: 6,274,972
Issued: Aug. 14, 2001
Appl. No.: 09/045,681
Filed: Mar. 23, 1998

U.S. Applications:
(62) Division of application No. 08/914,618, filed on Aug. 19, 1997, now Pat. No. 5,760,538, which is a continuation of application No. 08/496,131, filed on Jun. 27, 1995, now abandoned.

(30) Foreign Application Priority Data

Jun. 27, 1994 (JP) ..... 6-144636
Oct. 28, 1994 (JP) ..... 6-265217
Jun. 23, 1995 (JP) ..... 7-157962

(51) Int. Cl.
*H01J 19/42* (2006.01)

(52) U.S. Cl. ..... 313/292; 313/495; 313/309
(58) Field of Classification Search ..... 313/495–497, 313/292, 309, 310, 422
See application file for complete search history.

(56) References Cited

U.S. PATENT DOCUMENTS 4,451,759 A * 5/1984 Heynisch ..... 313/495
4,904,895 A * 2/1990 Tsukamoto et al. ..... 313/336
4,954,744 A * 9/1990 Suzuki et al. ..... 313/336
5,063,323 A * 11/1991 Longo et al. ..... 313/309
5,066,883 A * 11/1991 Yoshioka et al. ..... 313/309

(Continued)

FOREIGN PATENT DOCUMENTS

EP 0 048 839 * 4/1982
EP 0 405 262 * 1/1991
EP 0 523 702 * 1/1993
EP 0 580 244 * 1/1994
JP 57-88656 6/1982

(Continued)

OTHER PUBLICATIONS

H. C. Miller, "Improving the Voltage Holdoff Performance of Alumina Insulators in Vacuum through Quasimentallizing", IEEE Transactions on Electrical Insulation, vol. EI–15No. 5, pp. 419–428 (Oct. 1980).*
H.C. Miller, "Improving the Voltage Holdoff Performance of Alumina Insulator Vacuum by Quasimentallizing or Doping", Physica 104C, pp. 183–188 (1981).*
H.C. Miller, et al., "The Effect on Mn/Ti Surface Treatment on Voltage—Holdoff Performance of Alumina Insulators in Vacuum", J.Appl. Phys., vol. 49, No. 11, pp. 5416–5420 (Nov. 1978.*

(Continued)

*Primary Examiner*—Karabi Guharay
(74) *Attorney, Agent, or Firm*—Fitzpatrick, Cella, Harper & Scinto

(57) ABSTRACT

An electron beam apparatus includes an electron source having an electron-emitting device, an electrode for controlling an electron beam emitted from the electron source, a target to be irradiated with an electron beam emitted from the electron source and a spacer arranged between the electron source and the electrode. The spacer has a semiconductor film on the surface thereof that is electrically connected to the electron source and the electrode.

23 Claims, 31 Drawing Sheets

U.S. PATENT DOCUMENTS

| | | | | | |
|---|---|---|---|---|---|
| 5,155,416 | A | * | 10/1992 | Suzuki et al. | 315/366 |
| 5,247,223 | A | * | 9/1993 | Mori et al. | 313/308 |
| 5,371,433 | A | * | 12/1994 | Horne et al. | 313/292 X |
| 5,532,548 | A | * | 7/1996 | Spindt et al. | 313/292 X |
| 5,594,296 | A | * | 1/1997 | Mitsutake et al. | 313/309 |
| 5,734,224 | A | * | 3/1998 | Tagawa et al. | 313/473 |
| 5,760,538 | A | * | 6/1998 | Mitsutake et al. | 313/422 |
| 5,828,352 | A | | 10/1998 | Nomura et al. | 345/74 |
| 5,952,775 | A | * | 9/1999 | Sato et al. | 313/422 |

FOREIGN PATENT DOCUMENTS

| | | | |
|---|---|---|---|
| JP | 57-118355 | | 7/1982 |
| JP | 64-31332 | * | 2/1989 |
| JP | 2-257551 | * | 10/1990 |
| JP | 3-55738 | * | 3/1991 |
| JP | 4-28137 | * | 1/1992 |
| JP | 5-266807 | | 10/1993 |
| JP | 8-7811 | | 1/1996 |
| WO | WO 94/18694 | * | 8/1994 |

OTHER PUBLICATIONS

T. Sudarshan, et al., "The Effect of Chromium Oxide Coatings on Surface Flashover of Alumina Spacers in Vacuum", IEEE Transactions on Electrical Insulation, vol. E1–11, No. 1, pp. 32–35 (Mar. 1976).*

C.A. Spindt, et al., "Physical Properties of Thin–Film Field Emission Cathodes with Molybdenum Cones", Journal of Applied Physics, vol. 47, No. 12, pp. 5248–5263 (Dec. 1976).*

R. Meyer, et al., "Recent Development on "Microtips" Display at LETI", Technical Digest of IVMC 91, pp. 6–9, Nagahara (1991).*

G. Dittmer, "Electrical Conduction and Electron Emission of Discontinous Thin Films", Thin Solid Films, vol. 9, pp. 317–328 (1972).*

H. Araki, et al., "Electroforming and Electron Emission of Carbon Thin Films", Journal of the Vacuum Society of Japan, vol. 26, No. 1, pp. 22–29 (Jan. 26, 1983).*

M. Hartwell, et al., "Strong Electron Emission From Patterned Tin–Indium Oxide Thin Films", International Electron Devices Meeting, pp. 519–521 (1975).*

* cited by examiner

ELECTRON BEAM APPARATUS AND IMAGE FORMING APPARATUS

Matter enclosed in heavy brackets [ ] appears in the original patent but forms no part of this reissue specification; matter printed in italics indicates the additions made by reissue.

This is a divisional of application Ser. No. 08/914,618, filed Aug. 19, 1997 now U.S. Pat. No. 5,760,538, which is a continuation of application Ser. No. 08/496,131, filed Jun. 27, 1995, now abandoned.

BACKGROUND OF THE INVENTION

1. Field of the Invention

This invention relates to an electron beam apparatus and an image forming apparatus such as a display apparatus realized by using the same. More particularly, the present invention relates to an electron beam device and an image forming apparatus comprising an envelope and spacers for supporting and reinforcing the envelope from inside to make it withstand the atmospheric pressure.

2. Related Background Art

There have been known two types of electron-emitting devices; the thermionic cathode type and the cold cathode type. Of these, the cold cathode type refers to devices including surface conduction electron-emitting devices, field emission type (hereinafter referred to as the FE type) devices and metal/insulation layer/metal type (hereinafter referred to as the MIM type) electron-emitting devices.

Examples of surface conduction electron-emitting devices include one proposed by M. I. Elinson, Radio Eng. Electron Phys., 10, 1290 (1965) as well as those that will be described hereinafter.

A surface conduction electron-emitting device is realized by utilizing the phenomenon that electrons are emitted out of a small thin film formed on a substrate when an electric current is forced to flow in parallel with the film surface. While Elinson proposes the use of $SnO_2$ thin film for a device of this type, the use of Au thin film is proposed in G. Dimmer: "Thin Solid Films", 9, 317 (1972) whereas the use of $In_2O_3/SnO_2$ and that of carbon thin film are discussed respectively in M. Hartwell and C. G. Fonstad: "IEEE Trans. ED Conf.", 519 (1975) and H. Araki et al.: "Vacuum", Vol. 26, No. 1, p. 22 (1983).

FIG. 36 of the accompanying drawings schematically illustrates a typical surface conduction electron-emitting device proposed by M. Hartwell. In FIG. 36, reference numeral 3001 denotes a substrate. Reference numeral 3004 denotes an electroconductive thin film normally prepared by producing an H-shaped thin metal oxide film by means of sputtering, part of which eventually makes an electron-emitting region 3005 when it is subjected to an electrically energizing process referred to as "energization forming" as described hereinafter. In FIG. 36, the thin horizontal area of the metal oxide film separating a pair of device electrodes has a length L of 0.5 to 1 mm and a width W of 0.1 mm. Note that, while the electron-emitting region 3005 has a rectangular form and is located at the middle of the electroconductive thin film 3004, there is no way to accurately know its location and contour.

For surface conduction electron-emitting devices including those proposed by M. Hartwell et al., the electroconductive film 3004 is normally subjected to an electrically energizing preliminary process, which is referred to as "energization forming", to produce an electron emitting region 3005. In the energization forming process, a constant DC voltage or a slowly rising DC voltage that rises typically at a rate of 1 V/min. is applied to given opposite ends of the electroconductive film 3004 to partly destroy, deform or transform the thin film and produce an electron-emitting region 3005 which is electrically highly resistive. Thus, the electron-emitting region 3005 is part of the electroconductive film 3004 that typically contains fissures therein so that electrons may be emitted from those fissures. Note that, once subjected to an energization forming process, a surface conduction electron-emitting device comes to emit electrons from its electron emitting region 3005 whenever an appropriate voltage is applied to the electroconductive film 3004 to make an electric current run through the device.

Examples of FE type device include those proposed by W. P. Dyke & W. W. Dolan, "Field emission", Advance in Electron Physics, 8, 89 (1956) and C. A. Spindt, "PHYSICAL Properties of thin-film field emission cathodes with molybdenum cones", J. Appl. Phys., 47, 5248 (1976).

FIG. 37 of the accompanying drawings illustrates in cross section an FE type device according to the above C. A. Spindt paper. Referring to FIG. 37, the device comprises a substrate 3010, an emitter wiring 3011, an emitter cone 3012, an insulation layer 3013 and a gate electrode 3014. When an appropriate voltage is applied between the emitter cone 3012 and the gate electrode 3014 of the device, the phenomenon of field emission appears at the top of the emitter cone 3012.

Apart from the multilayer structure of FIG. 37, an FE type device may also be realized by arranging an emitter and a gate electrode on a substrate substantially in parallel with the substrate.

MIM devices are disclosed in papers include C. A. Mead, "Operation of tunnel-emission Devices", J. Appl. Phys., 32, 646 (1961). FIG. 38 illustrates a typical MIM device in cross section. Referring to FIG. 38, the device comprises a substrate 3020, a lower electrode 3021, a thin insulation layer 3022 as thin as 100 angstroms and an upper electrode having a thickness between 80 and 300 angstroms. Electrons are emitted from the surface of the upper electrode 3023 when an appropriate voltage is applied between the upper electrode 3023 and the lower electrode 3023 of the MIM device.

Cold cathode devices as described above do not require any heating arrangement because, unlike thermionic cathode devices, they can emit electrons at low temperatures. Hence, the cold cathode device is structurally by far simpler than the thermionic cathode device and can be made very small. If a large number of cold cathode devices are densely arranged on a substrate, the substrate is free from problems such as melting by heat. Additionally, while the thermionic cathode device takes a rather long response time because it operates only when heated by a heater, the cold cathode device starts operating very quickly.

Therefore, studies have been and are currently being conducted on cold cathode devices.

For example, since a surface conduction electron-emitting device has a particularly simple structure and can be manufactured in a simple manner, a large number of such devices can advantageously be arranged on a large area without difficulty. As a matter of fact, a number of studies have been made to fully exploit this advantage of surface conduction electron-emitting devices. Studies that have been made to arrange a large number of devices and drive them effectively include the one described in Japanese Patent Application Laid-Open No. 64-31332 filed by the applicant of the present patent application.

Electron beam apparatuses using surface conduction electron-emitting devices that are currently being studied include charged electron beam sources and image forming apparatuses such as image displays and image recorders.

U.S. Pat. No. 5,066,883, Japanese Patent Application Laid-Open Nos. 2-257551 and 4-28137 also filed by the applicant of the present patent application disclose image display apparatuses realized by combining surface conduction electron-emitting devices and a fluorescent panel that emits light as it is irradiated with electron beams. An image display apparatus comprising surface conduction electron-emitting devices and a fluorescent panel can be highly advantageous relative to comparable conventional apparatuses such as liquid crystal image display apparatuses that have been popular in recent years because it is of a light emissive type which requires no backlight to make it glow and has a wide view angle.

On the other hand, U.S. Pat. No. 4,904,895 of the applicant of the present patent application discloses an image display apparatuses realized by arranging a large number of FE type devices. Other examples of image display apparatus comprising FE type devices include the one reported by R. Meyer R. Meyer: "Recent Development on Microtips Display at LETT", Tech. Digest of 4th Int. Vacuum Microelectronics Conf., Nagahama, p.p 6-9 (1991).

Japanese Patent Application Laid-Open No: 3-55738 also filed by the applicant of the present patent application describes an image display apparatus realized by arranging a large number of MIM type devices.

Image display apparatuses and other electron beam apparatuses described above normally comprise an envelope for maintaining the inside of the apparatus in a vacuum condition, an electron source arranged within the envelope, a target to be irradiated with electron beams emitted from the electron source and an accelerating electrode for accelerating electron beams heading for the target. In certain cases, such an apparatus additionally comprises one or more than one spacers arranged within the envelope for supporting the envelope from the inside in order to counter the atmospheric pressure applied to the envelope.

In particularly, in view of the current trend of the ever increasing demand for image display apparatuses and other image forming apparatuses that are very flat and have a large display screen, spacers within the envelope of display apparatus seems to be an indispensable component of such an apparatus.

However, spacers arranged within an electron beam apparatus can give rise to a problem of displacing the landing positions of electron beams from the respective designed positions on the plane where the target is arranged.

If the electron beam apparatus is a display apparatus of any of the above described types, the above problem may be expressed in terms of displaced landing positions and deformed contours of glowing spots on the surface of the fluorescent panel that are different from the designed ones.

When a color image forming panel that carries thereon fluorescent members of red, green and blue is used in such an apparatus, displaced landing positions of electron beams can result in a reduced brightness and color change. These problems are particularly observable around the spacers between the electron beam source and the image forming panel and in the peripheral areas of the image forming panel.

SUMMARY OF THE INVENTION

It is therefore an object of the invention to provide an electron beam apparatus that is free from displacement of landing positions of electron beams on the target plane.

It is another object of the invention to provide an electron beam apparatus that can effectively prevent displacement of landing positions of electron beams on the target plane when spacers are arranged within the electron beam apparatus in order to secure a predetermined distance between the electron source and the target plane.

It is still another object of the invention to provide an electron beam apparatus, or an image forming apparatus in particular, that can effectively prevent displacement of landing positions of electron beams on the image forming panel in order to reproduce clear images on the screen.

It is a further object of the invention to provide an image forming apparatus comprising a fluorescent panel carrying thereon fluorescent members that can effectively prevent displacement of landing positions of electron beams on the image forming panel in order to reproduce clear images on the screen.

It is a still further object of the invention to provide an image forming apparatus comprising a fluorescent panel carrying thereon color fluorescent members red, green and blue that can effectively prevent displacement of landing positions of electron beams, deformed contours of glowing spots on the surface of the fluorescent panel that are different from the designed ones, reduced brightness and color change on the image forming panel in order to reproduce clear images on the screen.

According to an aspect of the invention, the above objects are achieved by providing an electron beam apparatus comprising an electron source having an electron-emitting device, an electrode for controlling an electron beam emitted from said electron source, a target to be irradiated with an electron beam emitted from said electron source and a spacer arranged between said electron source and said electrode, characterized in that said spacer has a semiconductor film on the surface thereof that is electrically connected to said electron source and said electrode.

According to another aspect of the invention, there is provided an electron beam apparatus comprising an electron source having an electron-emitting device, an electrode for controlling an electron beam emitted from said electron source, a target to be irradiated with an electron beam emitted from said electron source and a spacer arranged between said electron source and said electrode, characterized in that said spacer is provided with abutting members arranged at the abutments of said spacer and said electron source and said electrode and has a semiconductor film on the surface thereof that is electrically connected to said electron source and said electrode.

According to another aspect of the invention, there is provided an electron beam apparatus comprising an electron source having an electron-emitting device, an electrode for controlling an electron beam emitted from said electron source and a target to be irradiated with an electron beam emitted from said electron source, characterized in that it further comprises a spacer arranged between at least two electrodes to which different respective electric potentials are applied and said spacer is provided with abutting members arranged at the abutments of said spacer and said electrodes and has a semiconductor film on the surface thereof that is electrically connected to said electrodes.

An electron beam apparatus according to the invention can advantageously be an image forming apparatus.

DETAILED DESCRIPTION OF THE PREFERRED EMBODIMENTS

Now, the configuration of a display panel that can be used for an image forming apparatus according to the invention and a method of manufacturing it will be described.

Figure 1:
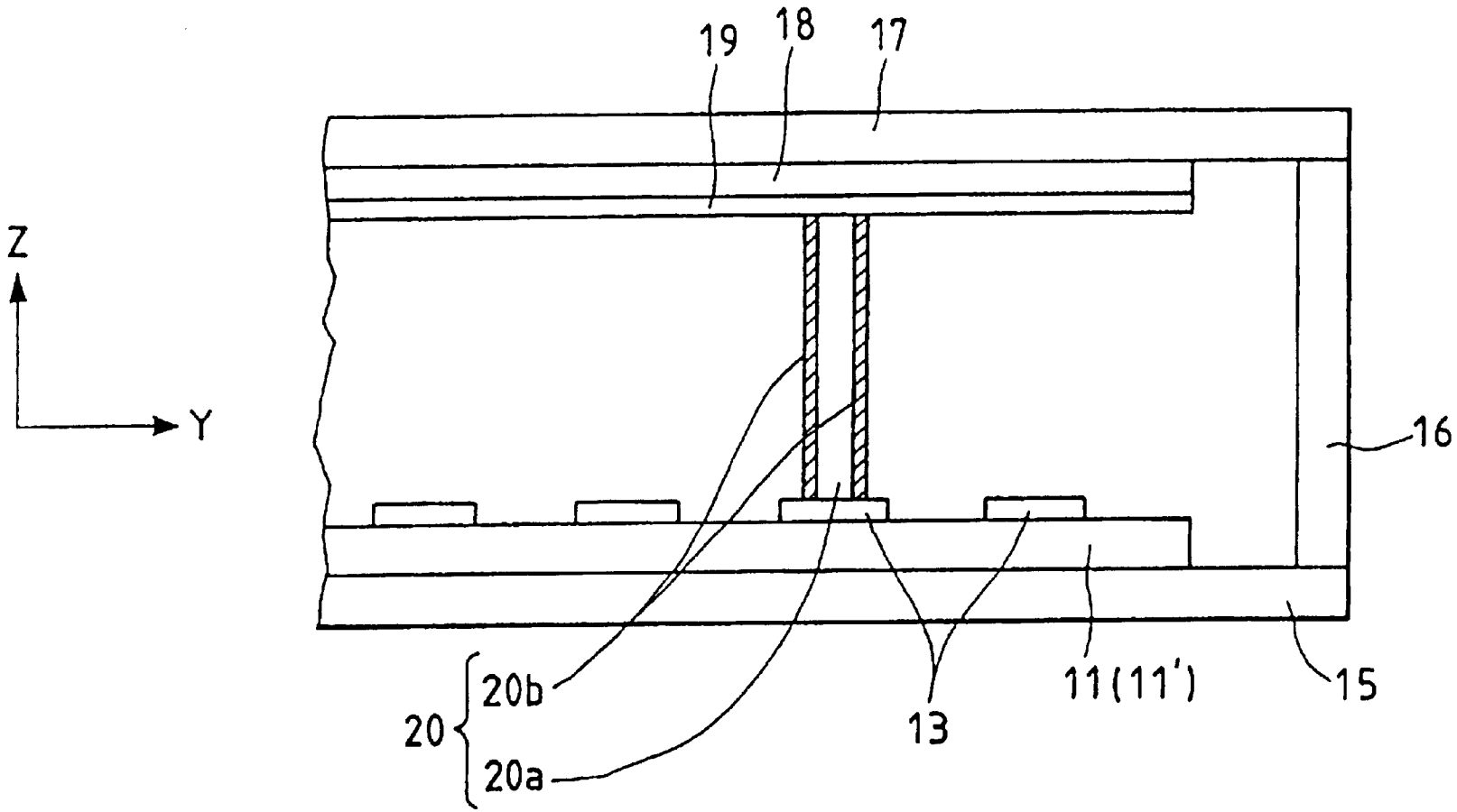
FIG. 1 is a schematic cross sectional view showing part of an image forming apparatus according to the invention and taken along line 1-1 of FIG. 2 to illustrate a spacer and its vicinity.
Figure 2:
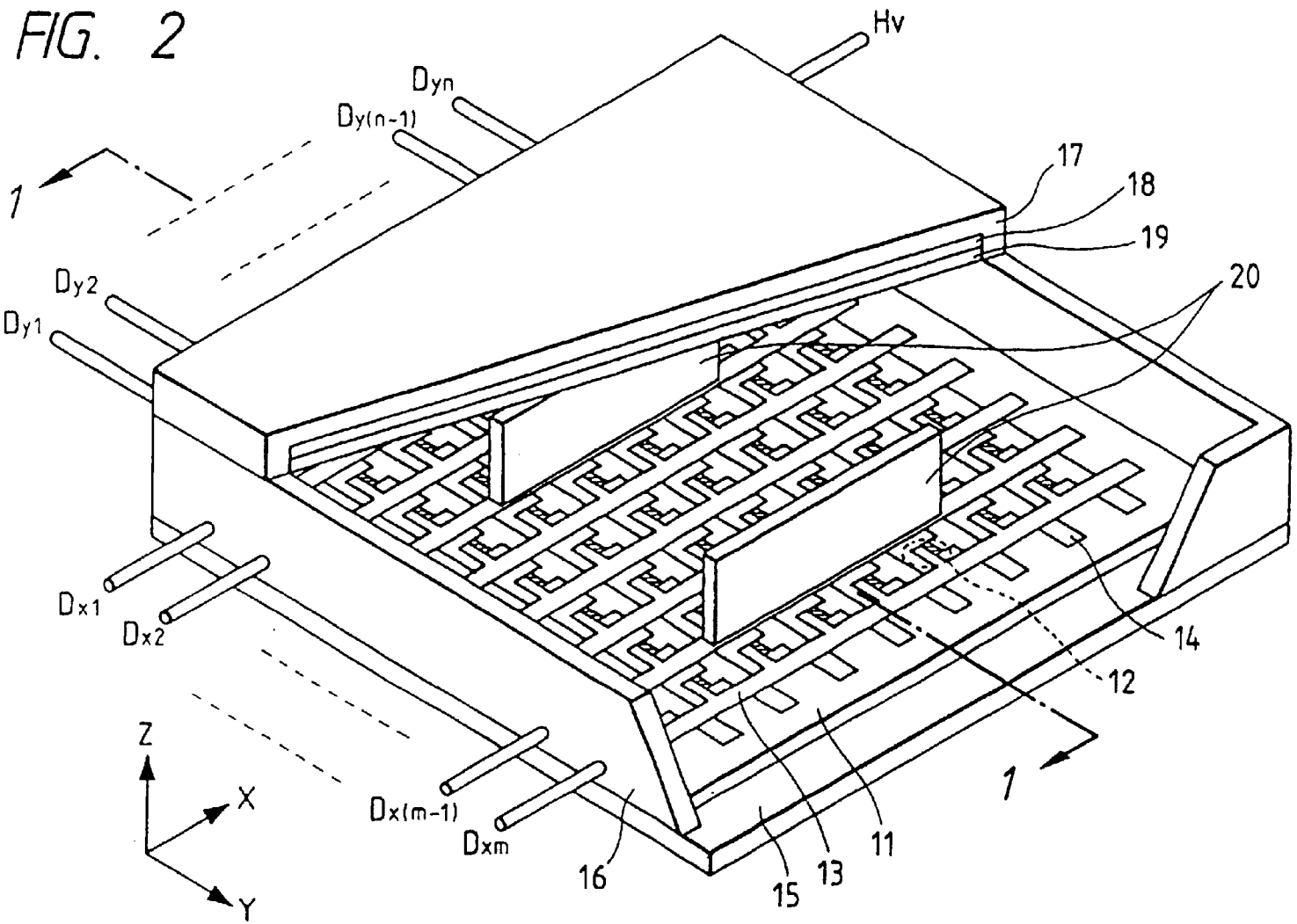
FIG. 2 is a partially broken schematic perspective view of an image forming apparatus according to the invention.

FIG. 2 shows a schematic perspective view of the display panel which is partially broken to illustrate the inside. FIG. 1 is a schematic cross sectional view showing part of the display panel of FIG. 2 taken along line 1-1.

Referring to FIGS. 1 and 2, the apparatus comprises a rear plate 15, lateral walls 16 and a face plate 17 to form an envelope that is airtightly sealed to maintain the inside in a vacuum condition.

A substrate 11 is rigidly secured to the rear plate 15 and a total of N×M cold cathode devices are formed on the substrate 11. N and M are integers greater than 2 and selected appropriately as a function of the number of electron-emitting devices to be arranged in the apparatus. For instance, if the apparatus is a high definition television set, N and M are preferably equal to or greater than 3,000 and 1,000 respectively. In an embodiment that will be described hereinafter, N=3,072 and M=1,024 are used. The N×M cold cathode devices are wired by M row-directed wirings 13 and N column-directed wirings 14 to form a simple matrix wiring pattern. The unit constituted by the components 11, 12, 13 and 14 is termed as a multiple electron beam source.

An insulation layer (not shown) is provided between the row-directed wirings 13 and the column-directed wirings 14 at least at the crossings thereof in order to electrically insulate them from each other.

While the substrate 11 of the multiple electron beam source is rigidly secured to the rear plate 15 of the air-tightly sealed envelope in the above description, the rear plate of the airtightly sealed envelope may be constituted by the substrate 11 itself of the multiple electron beam source if it has sufficiently large strength.

Materials that can be used for the substrate 11 include quartz glass, glass containing impurities such as Na to a reduced concentration level, soda lime glass, glass substrate realized by forming an $SiO_2$ layer on soda lime glass by sputtering, ceramic substances such as alumina. The dimensions of the substrate 11 may be selected depending on the number of electron-emitting devices to be arranged on the substrate 11 and the designed configuration of each electron-emitting device as well as the resistance against the atmospheric pressure and other considerations if the substrate 11 itself constitutes the rear plate of the air-tightly sealed envelope of the apparatus. Materials to be used for the rear plate 15, the face plate 17 and the lateral walls 16 of the airtightly sealed envelope are preferably selected from those that can withstand the atmospheric pressure applied to the envelope and are electrically highly insulating so that they can also withstand the high voltage applied between the multiple electron beam source and the metal back of the apparatus, which will be described hereinafter. Materials that can be used for them also include quartz glass, glass containing impurities such as Na to a reduced concentration level, soda lime glass, glass substrate realized by forming an $SiO_2$ layer on soda lime glass by sputtering, ceramic substances such as alumina. Note that at least the material of the face plate 17 has to show a transmissivity equal to or greater than a given level relative to visible light. Also note that the materials of the components of the envelope have to show thermal expansion coefficients that are close to one another.

The row-directed wirings 13 and the column-directed wirings 14 are made of a conductive material such as metal and arranged to show a desired pattern by means of an appropriate technique such as vapor deposition, printing or sputtering. The material, the thickness and the width of the wirings are so selected that a given voltage may be evenly applied to all the cold cathode devices 12.

The insulation layer arranged between the row-directed wirings 13 and the column-directed wirings 14 at least at the crossings thereof is typically made of $SiO_2$ which is formed by means of an appropriate technique such as vapor deposition, printing or sputtering. It may be formed to cover entirely or partly the column-directed wirings 14 arranged on the substrate 11 and the material, the thickness and the manufacturing method of the insulation layer are so selected that it may withstand the difference of electric potential existing at the crossings of the row-directed wirings 13 and the column-directed wirings 14.

While the row-directed wirings 13 and the column-directed wirings 14 may be made of any highly electroconductive material, preferred candidate materials include metals such as Ni, Cr, Au, Mo, W, Pt, Ti, Al, Cu and Pd and their alloys, printable conductive materials made of a metal or a metal oxide selected from Pd, Ag, Au, $RuO_2$ and Pd—Ag and glass, transparent conductive materials such as $In_2O_3$—$SnO_2$ and semiconductor materials such as polysilicon.

Figure 4A:
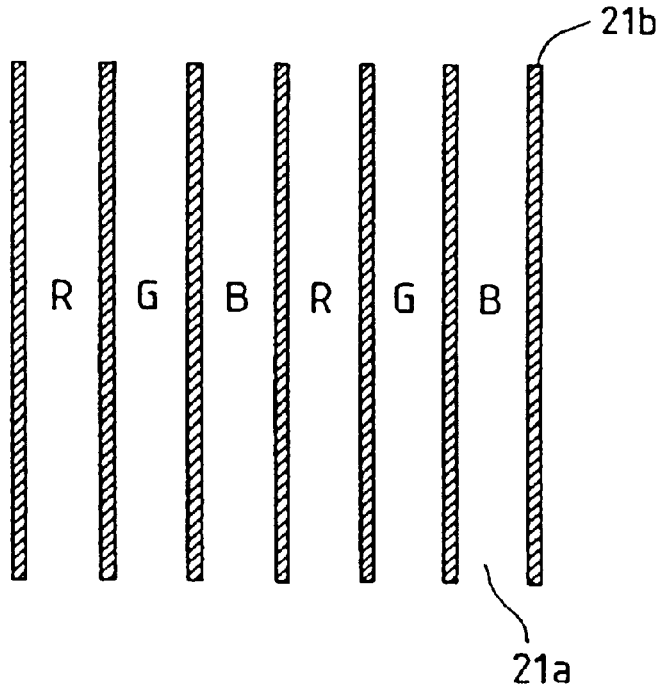
FIGS. 4A and 4B are schematic views of two different fluorescent films that can be used for the purpose of the invention.

As seen from FIGS. 1 and 2, a fluorescent film 18 is formed under the face plate 17. Since the mode of realizing the present invention as described here corresponds to a color display apparatus, fluorescent members of red, green and blue are arranged on respective areas of the film 18 as in the case of ordinary color CRTS. In the case of FIG. 4A, fluorescent members 21a of three different colors are realized in the form of so many stripes and any adjacent stripes are separated by a black electroconductive member 21b. Black electroconductive members 21b are arranged for a color display panel so that no color breakups may appear if electron beams do not accurately hit the target, that the adverse effect of external light of reducing the contrast of displayed images may be reduced and that the fluorescent film may not be electrically charged up by electron beams. While graphite is normally used for the black electroconductive members 89, other conductive material having low light tansmissivity and reflectivity may alternatively be used.

Figure 4B:
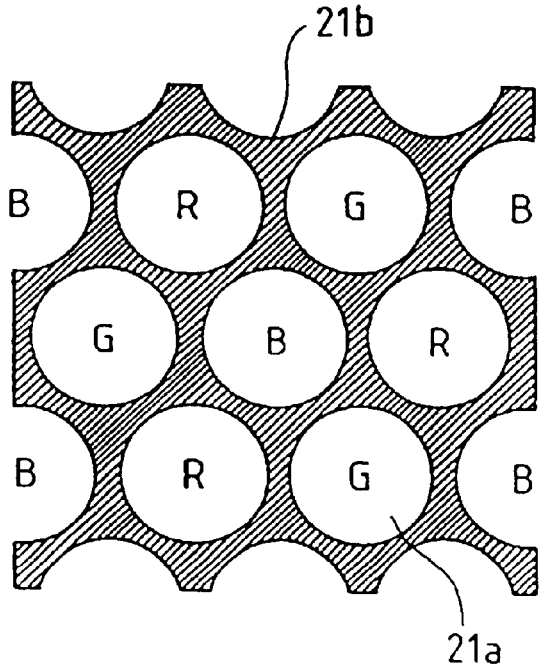

The striped pattern of FIG. 4A for fluorescent members of three primary colors may be replaced by a triangular arrangement of round fluorescent members of three primary colors as shown in FIG. 4B or some other arrangement.

A monochromatic fluorescent film 18 is used for a black and white display panel.

An ordinary metal back 19 well known in the art of CRT is arranged on the inner surface of the fluorescent film 18, which is the side of the fluorescent film closer to the rear plate. The metal back 19 is provided in order to reflect back part of rays of light emitted by the fluorescent film 18 to enhance the efficiency of utilization of light, to protect the fluorescent film, to function as an electrode for applying an electron beam acceleration voltage, and to provide guide paths for electrons for exciting the fluorescent film 18. The metal back 19 is prepared by smoothing the inner surface of the fluorescent film 18 and forming an Al film thereon by vacuum deposition after preparing the fluorescent film 18 on the face plate substrate 17. The metal back 19 may not be necessary if a fluorescent material that is good for a low voltage is used for the fluorescent film 18.

A transparent electrode typically made of ITO may be arranged between the face plate substrate 17 and the fluorescent film 18 in order to apply an accelerating voltage and raise the conductivity of the fluorescent film 18.

Dx1 through Dxm and Dy1 through Dyn and Hv in FIG. 2 are external terminals for electric connection arranged outside the envelope in order to connect the display panel and electric circuits (not shown). Dx1 through Dxm are electrically connected to row-directed wirings 13 of the multiple electron beam source while Dy1 through Dyn and Hv are electrically connected to column-directed wirings 14 of the multiple electron beam source and the metal back 19 of the face plate respectively.

Since the inside of the envelope (airtightly sealed container) is held to a degree of vacuum of approximately $10^{-6}$ Torr, one or more than one spacers 20 are arranged within the envelope in order to make it withstand the atmospheric pressure and unexpected impacts. Each of the spacers 20 is prepared by forming a semiconductor thin film 20b on an insulating member 20a. A required number of spacers are arranged within the envelope with required intervals separating them from one another and bonded to the inside of the envelope and the surface of the substrate 11 with frit glass. The semiconductor thin film 20b of each spacer is electrically connected to the inner surface (e.g., the metal back 19) of the face plate 17, the surface of the substrate 11 and a row- or column-directed wiring 13 or 14.

In the above described mode of carrying out the invention, the spacers 20 have a profile of a thin plate and are arranged in parallel with the row-directed wirings 13 and connected to the column-directed wirings 14.

The spacers 20 may be made of any material that provides sufficient insulation and withstands the high voltage applied between the wirings 13 and 14 on the substrate 11 and the metal back 19 on the inner surface of the face plate 17, while showing a degree of surface conductivity for effectively preventing an electric charge from building upon on the surface of the spacers.

Materials that can be used for the insulating members 20a of the spacers 20 include quartz glass, glass containing impurities such as Na to a reduced concentration level, soda lime glass, glass substrate realized by forming an $SiO_2$ layer on soda lime glass by sputtering, ceramic substances such as alumina. It is preferable that the material of the insulating members 20a has a thermal expansion coefficient substantially equal to those of the materials of the envelope (airtightly sealed container) and the substrate 11.

The semiconductor thin film 20b preferably has a surface electric resistance between $10^5$ and $10^{12}$ Ω/□ so that it can maintain the effect of preventing electrification of the surface and it can suppress the power consumption by leak current not to exceed the tolerable limit. Materials that can be used for the semiconductor thin film 20b include semiconductor substances of the IV group such as silicon and germanium, semiconductor compounds such as gallium arsenide, noble metals such as Pt, Au, Ag, Rh and Ir, metals such as Al, Sb, Sn, Pb, Ga, Zn, In, Cd, Cu, Ni, Co, Rh, Fe, Mn, Cr, V, Ti, Zr, Nb, Mo and W in the form of thin film having an islands structure, oxide semiconductors such as nickel oxide and zinc oxide and extrinsic semiconductor substances realized by adding one or more than one impurities at a minute concentration to any of the above semiconductor substances and having the form of amorphous, polycrystalline or monocrystalline thin film. The semiconductor thin film 20b may be formed by means of an appropriate film forming technique selected from methods of forming thin film in vacuum such as vapor deposition, methods of applying an organic or dispersion solution by dipping or by using a [sprinner] *spinner* followed by baking, and non-electrolytic plating methods for forming a thin metal film on the surface of an insulating body through chemical reactions.

A semiconductor thin film 20b is formed at least on the surface exposed to vacuum in the envelope (airtightly sealed container) of the insulating member 20b of each spacer. The formed semiconductor thin film 20b is electrically connected to the above described black electroconductive member 21b or the metal back 19 on the side of the face plate 17 and to a row-directed wiring 13 or a column-directed wiring on the side of the rear plate 15.

It should be noted, however, that the configuration, the positions and the means of arranging spacers 20 may be different from those described above and that they may be electrically connected to the face plate 17 and the rear plate 15 in any fashion so long as they provide a strength sufficiently strong to make the envelope withstand the atmospheric pressure, a degree of electric insulation that can satisfactorily withstand the high voltage applied between the wirings 13 and 14 and the metal back 19 and a degree of surface electric conductivity that can effectively prevent electrification of the surface of the spacers 20.

For assembling the envelope (airtightly sealed container), the members 15, 16 and 17 have to be hermetically sealed in order to provide the junctions of the members 15, 16 and 17 with a sufficient strength and a satisfactory degree of airtightness. Such sealing of the members can be realized by applying frit glass to the junctions and baking the assemble in ambient air or in a nitrogen atmosphere at 400 to 500° C. for more than 10 minutes. The method for evacuating the hermetically sealed envelope will be described hereinafter.

After assembling the envelope (airtightly sealed container), the exhaust pipe (not shown) of the envelope is connected to a vacuum pump and the envelope is then evacuated to a degree of vacuum of approximately $10^{-7}$ Torr. Thereafter, the exhaust pipe is sealed. Note that a getter film (not shown) is formed at a given location within the envelope immediately before or after sealing the exhaust pipe as means for maintaining the inside of the envelope to a given degree of vacuum. Getter film is a film obtained by vapor deposition, where a getter material typically containing Ba as a principal ingredient is heated by means of a heater or high frequency heating. The inside of the envelope is maintained to a degree of vacuum of $1\times10^{-5}$ to $1\times10^{-7}$ Torr by the adsorption effect of getter film.

In an image display apparatus comprising a display panel as described above, the cold cathode devices are driven to emit electrons when a voltage is applied to the devices by way of the external terminals Dx1 through Dxm and Dy1 through Dyn while a high voltage of several kilovolts is applied to the metal back 19 (or a transparent electrode (not shown)) by way of the high voltage terminal Hv to accelerate electrons emitted from the devices and make them collide with the face plate 17 at high speed. Then, the fluorescent members 21a of the fluorescent film 18 are energized to emit light and produce an image on the display screen.

Figure 5:
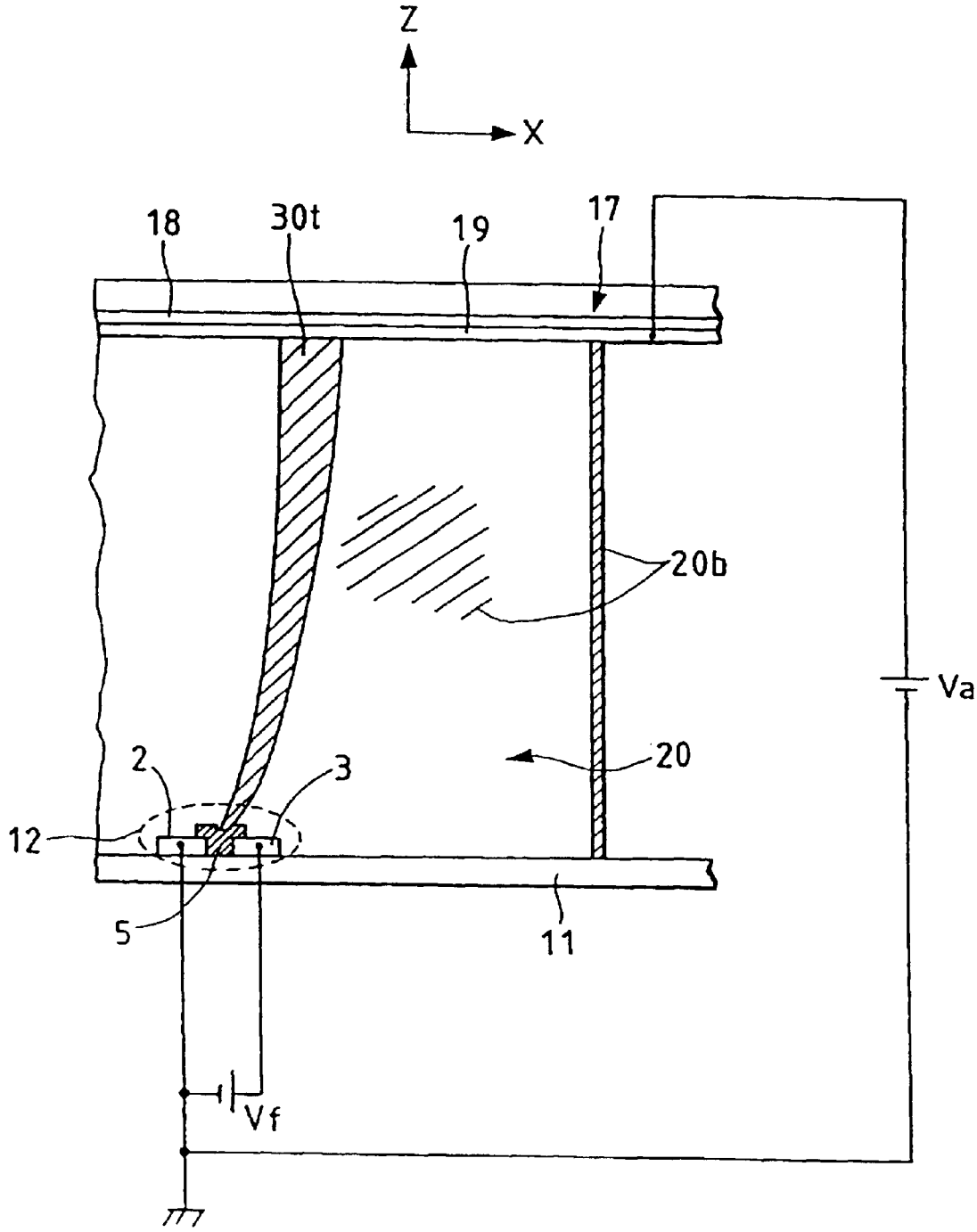
FIG. 5 is a schematic cross sectional view showing part of the image forming apparatus of FIG. 2 as viewed along the Y-direction to illustrate how electrons fly from the electron-emitting region of an electron-emitting device arranged near a spacer.
Figure 6:
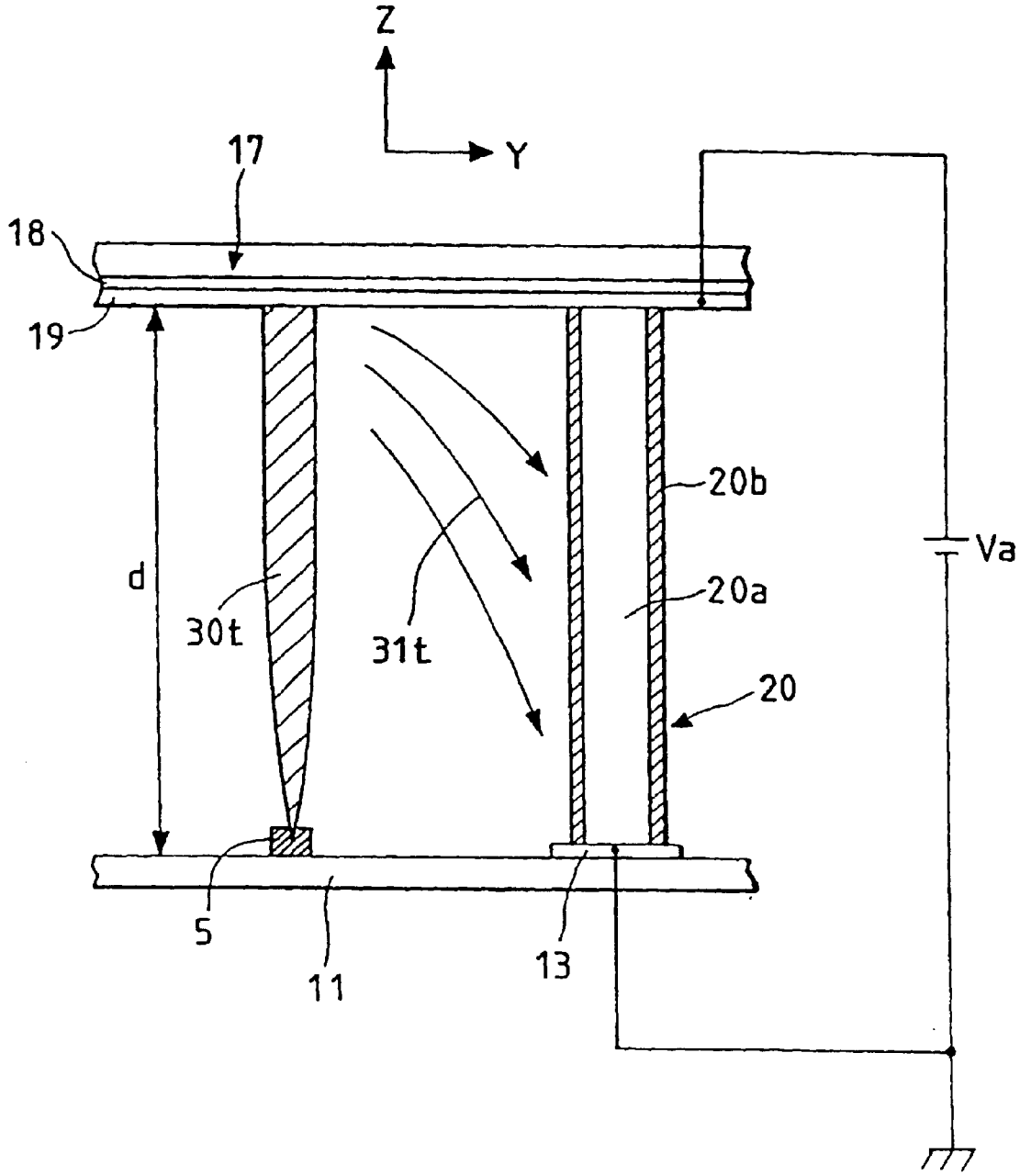
FIG. 6 is a schematic cross sectional view showing part of the image forming apparatus of FIG. 2 as viewed along the X-direction to illustrate how electrons fly from the electron-emitting region of an electron-emitting device arranged near a spacer and how scattering particles fly.

FIGS. 5 and 6 schematically illustrate how electrons and scattering particles, which will be described hereinafter, are generated within the display panel of FIG. 2. Of these, FIG. 5 is a cross sectional view as seen along the Y-direction while FIG. 6 is a view seen along the X-direction of FIG. 2. It will be seen from FIG. 5 that electrons are emitted from the cold cathode devices as [voltage•vf] *voltage Vf* is applied to the devices on the substrate 11 and then accelerated by accelerating voltage Va applied to the metal back 19 on the face plate 17 before they collide with the fluorescent film 18 on the inner surface of the face plate 17 to make the latter emit light. In the case where the cold cathode device is a surface conduction electron-emitting device, comprising a high potential side device electrode and a low potential side device electrode arranged in parallel with each other on the surface of a substrate along with an electron-emitting region between the device electrodes, electrons are emitted along a parabolic trajectory indicated by 30t and deviated toward the high potential side device electrode from the normal line relative to the surface of the substrate 11 standing from the electron-emitting region of the device. Thus, the center of the glowing spot on the fluorescent film 18 is deviated from the normal line relative to the surface of the substrate 11 that is standing from the electron-emitting region of the device. Such behavior on the part of emitted electrons can result in an asymmetric distribution pattern of electric potentials in a plane parallel to the substrate 11.

Apart from electrons emitted from the cold cathode devices 12 that eventually collide with the inner surface of the face plate 17 and make the fluorescent film 18 glow, scattering particles (ions, secondary electrons, neutral particles, etc.) can be generated with a given probability as electrons collide with the fluorescent film 18 and, if with a low probability, gas remaining in the vacuum envelope and dispersed along paths as indicated by 31t in FIG. 6.

In an experiment using an image display apparatus where the spacers 20 were not provided with a semiconductor thin film 20b, the inventors of the present invention have discovered that the fluorescent film can glow at locations displaced from the designed spots (where electrons are supposed to collide) in areas close to the spacers 20. Particularly when image forming members for color images are used, the apparatus can give rise to a phenomenon of reduced brightness and color change.

It may be safely assumed that the main cause of the phenomenon lies in the fact that part of the scattering particles collide with the exposed areas of the insulating members 20a of the spacers 20, which are then electrically charged to produce electric fields around them that by turn deviate electrons from their normal trajectories and make the fluorescent film glow at locations displaced from the designed spots with deformed profiles of glowing spots.

It was also discovered by closely looking into the displaced glowing spots and their deformed profiles that most of the exposed areas are positively charged. This phenomenon may be caused by positively charged scattering particles that adhere to the exposed areas and/or any scattering particles that collide with the exposed areas to generate secondary electrons which are then discharged to leave a positive electric charge on those areas.

On the other hand, in an image display apparatus according to the invention and comprising spacers 20 that are coated with a semiconductor thin film 20b as shown in FIG. 1, it was confirmed that the fluorescent film 18 produces glowing spots with a designed profile at designed locations. In other words, it may be safely said that, if electrically charged particles adhere to the surface of the spacers 20, they are neutralized by part of the electric current (more specifically electrons or holes) flowing along the semiconductor thin film 20 arranged on the surface of the spacers 20 to immediately nullify any electric charges that may arise on the surface of the spacers.

In an image display apparatus according to the invention, the voltage Vf applied to the pair of electrodes 2 and 3 (FIG. 5) of each cold cathode device 12 is between 12V and 16V and the distance d between the metal back 19 and each cold cathode device 12 is between 1 mm and 8 mm, while the voltage Va between the metal back 19 and each cold cathode device 12 is between 1kV and 10kV.

Now, preferred modes of realizing the spacers of an image display apparatus according to the invention will be described by referring to FIGS. 7A through 7C.

Figure 7A:
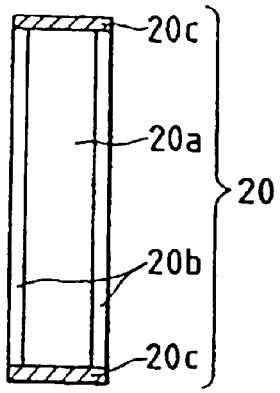
FIGS. 7A to 7C are schematic cross sectional views of three different spacers that are provided with abutting members and can be used for an image forming apparatus according to the invention.

Referring firstly to FIG. 7A, it shows a spacer 20 comprising an insulating base member 20a, an electroconductive film 20c formed on the surface of the member 20a in areas to be made to abut the corresponding areas of the electron accelerating electrode 19 (FIGS. 1, 2, 5 and 6) and a wiring 13 or 14 (FIGS. 1 through 3 and 6) and a semiconductor film 20b formed on the surface of the member 20a in areas other than the abutting areas coated with an electroconductive film 20c. The electroconductive film 20c formed in the abutting areas of the surface of the member 20a is electrically connected to the semiconductor film 20b formed in areas other than the abutting areas.

Figure 7B:
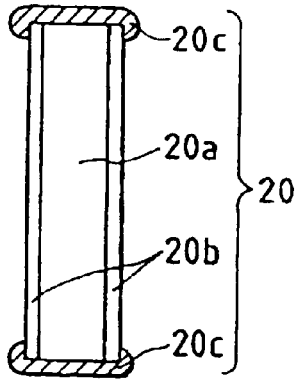

On the other hand, FIG. 7B shows a spacer 20 comprising an insulating base member 20a, an electroconductive film 20c formed on the surface of the member 20a in areas to be made to abut the corresponding areas of the electron accelerating electrode 19 and a wiring 13 or 14 as well as in some areas that are left free and an semiconductor film 20b formed on the surface of the member 20a in the remaining areas other than the abutting area. With such an arrangement, the electroconductive film 20c formed in areas to be made to abut the corresponding areas of the electron accelerating electrode 19 and a wiring 13 or 14 as well as in some areas that are left free is electrically connected to the semiconductor film 20b formed in the remaining areas.

Figure 7C:
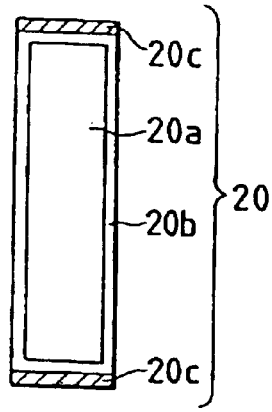

Finally, FIG. 7C shows a spacer 20 comprising an insulating base member 20a, a semiconductor film 20b formed on the entire surface of the member 20a and an electroconductive film 20c formed on the surface of the semiconductor film 20b in areas to be made to abut the corresponding areas of the electron accelerating electrode 19 and a wiring 13 or 14. The electroconductive film 20c formed in the abutting areas of the surface of the semiconductor film 20b is electrically connected to the semiconductor film 20b formed on the entire surface of the member 20a.

The semiconductor film 20b can be prepared by using a material and a method similar to those described earlier by referring to FIGS. 1, 5 and 6, considering the effect of preventing electrification of the surface and reducing the energy consumption by leak currents.

Since the spacers shown in FIGS. 7A to 7C are electrically connected to a semiconductor film 20b and have a conductive film 20c formed on the abutting area, electric current can flow uniformly through the whole area of the semiconductor film 20b by connecting at least part of the conductive film 20c with an electric power supplying means. Thus, charged particles can be neutralized without disturbing a parallel electric field between the face plate and the electron source.

Figure 8:
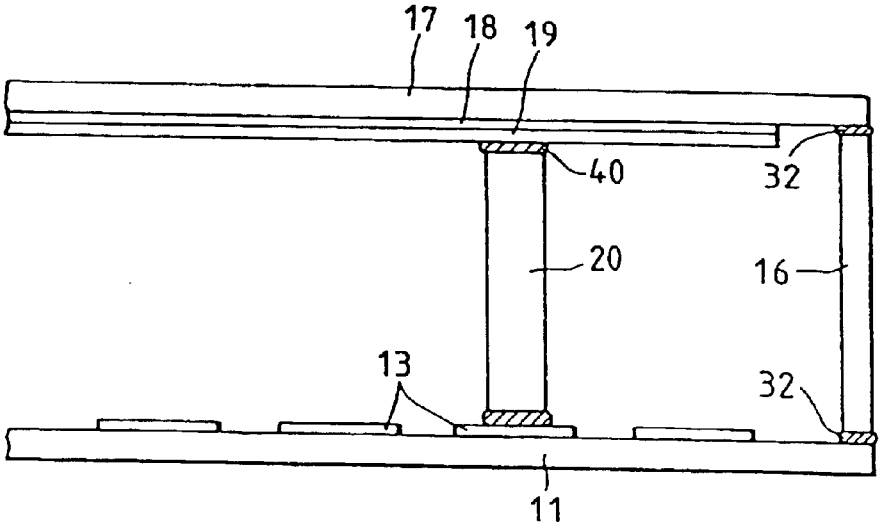
FIG. 8 is a schematic cross sectional view showing part of the image forming apparatus of FIG. 2 to illustrate how a spacer is arranged in it with abutting members.

FIG. 8 shows a cross sectional partial view of a display panel according to the invention, where a spacer 20 is provided with abutment members 40 that include electroconductive members. In FIG. 8, 20 denotes a spacer that may be any of the above described ones and 40 denotes abutment members arranged on the spacer 20. Otherwise, there are shown a substrate 11 (soda lime glass) carrying thereon a number of row-directed wirings 13, a face plate 17, a fluorescent film 18, a metal back 19, a lateral wall 16 and pieces of frit glass 32.

Note that, as will be described in greater detail hereinafter, abutment members 40 provided on a spacer refer to respective components of the display panel that electrically connect and mechanically secure the spacer to the electron accelerating electrode (or the metal back) and a wiring (a row- or column-directed wiring).

Referring to FIG. 8, a spacer 20 is electrically connected to a row-directed wiring 13 on the substrate 11 and the electron accelerating electrode (metal back 19) on the face plate and mechanically secured to them in any of the following manners.

(1) The spacer is electrically connected and mechanically secured by means of electroconductive frit glass containing electroconductive fine particles.

(2) The spacer is electrically connected by applying an electroconductive material on part of the abutting areas and mechanically secured by applying frit glass to the remaining portions of the abutting areas.

(3) The spacer is mechanically secured in the first place by applying frit glass to the abutting areas and then electrically connected by an electroconductive material formed on at least part of the abutting areas or the side surface.

(4) The spacer is mechanically secured in the first place by applying frit glass to the abutting areas and then electrically connected by flashing a getter material on necessary portions of the surface of the spacer 20.

Now, cold cathode devices that are used for the multiple electron beam source of a display panel according to the invention will be described. Any multiple electron beam source comprising a number of cold cathode devices arranged in the form of a matrix may be used for the purpose of the invention, regardless of the material and the profile of the cold cathode devices. In other words, cold cathode devices that can be used for the purpose of the invention include surface conduction electron-emitting device, FE type cold cathode devices and MIM type cold cathode devices.

However, under the current circumstances where image display apparatuses having a large display screen and available at low cost are desired, the use of surface conduction electron-emitting devices is particularly preferable. As described earlier, the electron emission performance of an FE type cold cathode device is highly dependent on the relative positions and the profiles of the emitter cone and the gate electrode and hence high precision techniques are required for manufacturing it, which are by any means disadvantageous for producing large screen image display apparatues at low cost. On the other hand, an MIM type device requires a very thin insulation layer and an upper electrode that needs to be very thin too. These requirements also provide disadvantages if such devices are used for large screen image display apparatuses that have to be manufactured at low cost. Contrary to these devices, a surface conduction electron-emitting device can be manufactured in a relatively simple manner and, therefore, large screen image display apparatuses comprising such devices can be manufactured at relatively low cost. Additionally, the inventors of the present invention have discovered that a surface conduction electron-emitting device comprising a pair of device electrodes and an electroconductive film including an electron-emitting region arranged therebetween and made of fine particles is particularly excellent in the performance of electron emission and can be manufactured with ease. Thus, such surface conduction electron-emitting devices are very preferable when used for the multiple electron beam source of a large screen image display apparatus that can produce bright images. Therefore, some surface conduction electron-emitting devices that can advantageously be used for the purpose of the invention will be described hereinafter in terms of basic configuration and manufacturing method.

There are two types of surface conduction electron-emitting devices comprising a pair of device electrodes and an electroconductive film including an electron-emitting region arranged therebetween and made of fine particles. They are a flat type and a step type.

*Firstly, a flat type surface conduction* electron-emitting device will be described along with a method of manufacturing the same.

Figure 9A:
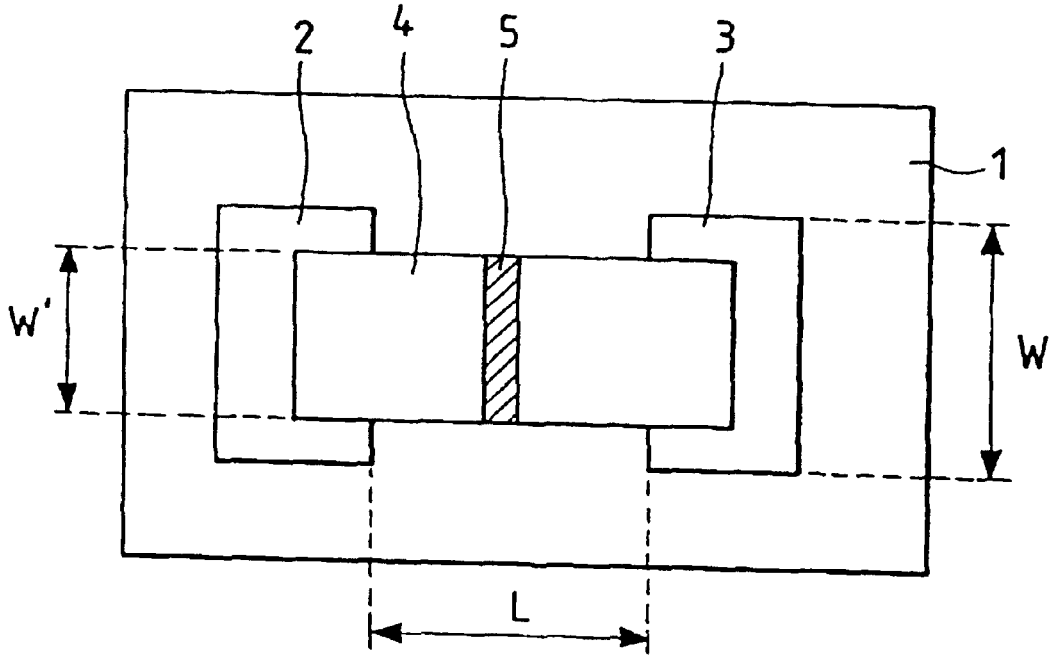
FIGS. 9A, 9B, 10A and 10B are schematic plan views and elevational cross sectional views of two different surface conduction electron-emitting devices that can be used for the purpose of the invention.
Figure 9B:
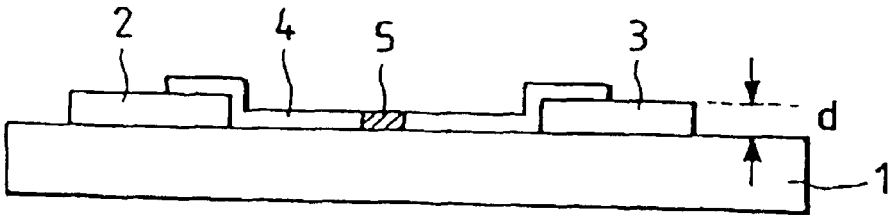

FIGS. 9A and 9B are schematic plan and sectional side views showing the basic configuration of a flat type surface conduction electron-emitting device. Referring to FIGS. 9A and 9B, the device comprises a substrate 1, a pair of device electrodes 2 and 3, an electroconductive film 4 including an electron-emitting region 5 produced by means of an energization forming operation.

The substrate 1 may be a glass substrate of quartz glass, soda lime glass or some other type of glass, a ceramic substrate made of alumina or some other ceramic material or a substrate realized by forming an insulation layer of $SiO_2$ on any of the above listed substrates.

While the oppositely arranged device electrodes 2 and 3 may be made of any highly conducting material, preferred candidate materials include metals such as Ni, Cr, Au, Mo, W, Pt, Ti, Al, Cu, Pd and Ag and their alloys, metal oxides such as $In_2O_3$—$SnO_2$, semiconductor materials such as polysilicon and other materials. The device electrodes may be prepared by using in combination a film forming technique such as vapor deposition and a patterning technique such as photolithography or etching, although any other techniques (such as printing) may also be used.

The device electrodes 2 and 3 may be formed to any appropriate shape that suits the application of the electron-emitting device. Generally speaking, the distance L separating the device electrodes 2 and 3 is normally between several hundred angstroms and several hundred micrometers and, preferably, between several micrometers and tens of several micrometers. The film thickness d of the device electrodes is between tens of several nanometers and several micrometers.

The electroconductive thin film 4 is preferably a fine particle film. The term "a fine particle film" as used herein refers to a thin film constituted of a large number of fine particles (including conglomerates such as islands). When microscopically ovserved, it will be found that the fine particle film normally has a structure where fine particles are loosely dispersed, tightly arranged or mutually and randomly overlapping.

The fine particles in the fine particle film has a diameter between several angstroms and several thousand angstroms and preferably between 10 angstroms and 200 angstroms. The thickness of the fine particle film is determined as a function of a number of factors as will be described hereinafter, including the requirement of electrically connecting itself to the device electrodes 2 and 3 in good condition, that of carrying out an energization forming operation as will be described hereinafter in good condition and that of making the electric resistance of the film conform to an appropriate value as will be described hereinafter. Specifically it is found several angstroms and several thousand angstroms and, preferably, between 10 angstroms and 500 angstroms.

Materials that can be used for the fine particle film include metals such as Pd, Pb, Ru, Ag, Au, Ti, In, Cu, Cr, Fe, Zn, Sn, Ta, W and Pb, oxides such as PdO, $SnO_2$, $In_2O_3$, PbO and $Sb_2O_3$, borides such as $HfB_2$, $ZrB_2$, $LaB_6$, $CeB_6$, $YB_4$ and $GdB_4$, carbides such as TiC, ZrC, HfC, TaC, SiC and WC, nitrides such as TiN, ZrN and HfN, semiconductors such as Si and Ge and carbon.

The electroconductive film 4 normally shows a resistance per unit surface area (sheet resistance) between $10^3$ and $10^7$ Ω/□.

The electroconductive film 4 and the device electrodes 2 and 3 are arranged in a partly overlapped manner in order to secure good electric connection therebetween. While the substrate 1, the device electrodes 2 and 3 and the electroconductive film 4 are laid in the above order to a multilayer structure in FIGS. 9A and 9B, the electroconductive film may alternatively be arranged between the substrate and the device electrodes.

The electron-emitting region 5 is realized as part of the electroconductive thin film 4 and it contains fissures and is electrically more resistive than the surrounding areas of the electroconductive film. It is produced as a result of an energization forming operation as will be described hereinafter. The fissures may contain fine particles having a dimater between several angstroms and several hundred angstroms. The electron-emitting region is only schematically shown in FIGS. 9A and 9B because there is no way to accurately determine its position and shape.

Figure 10A:
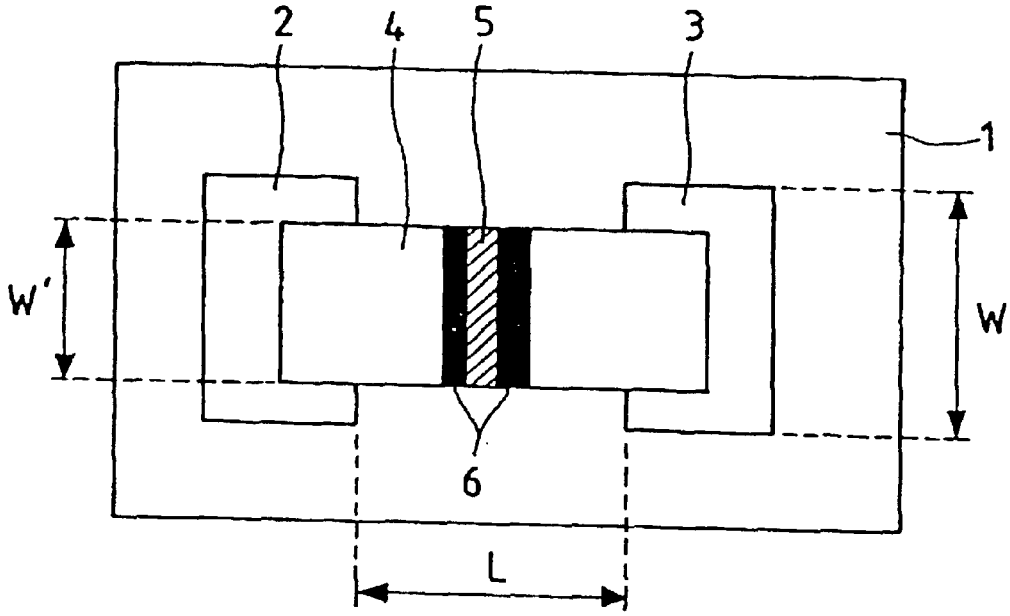
Figure 10B:
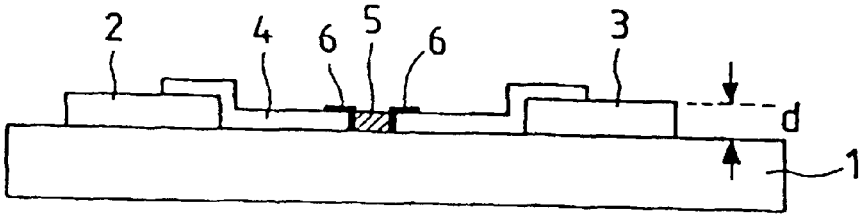

As shown in FIGS. 10A and 10B, the electroconductive film 4 may additionally contain thin films 6 of carbon and carbon compounds in the electron-emitting region 5 and its neighboring areas. These films are produced when the device is subjected to an energization activating operation after an energization forming operation, which will be described hereinafter.

The thin films 6 are made of monocrystalline graphite, polycrystalline graphite, non-crystalline carbon or a mixture of them and have a film thickness of less than 500 angstroms, preferably less than 300 angstroms.

The thin films 6 are only schematically shown in FIGS. 10A and 10B because there is no way to accurately determine their positions and shape.

In the examples as will be described hereinafter, surface conduction electron-emitting devices having a basic configuration as described above were prepared according to the following specifications.

The substrate 1 is made of soda lime glass and the device electrodes 2 and 3 are made of a thin Ni film having a thickness d of 1,000 angstroms and separated from each other with a distance L of 2 micrometers.

The electroconductive film is principally made of Pd or PdO and has a film thickness of about 100 angstroms and a width W of 100 micrometers.

Now, a method of manufacturing a flat type surface conduction electron-emitting device will be described.

FIGS. 11A to 11E are schematic elevational cross sectional views of a surface conduction electron-emitting device that can be used for the purpose of the invention, illustrating different manufacturing steps thereof.

Figure 11A:
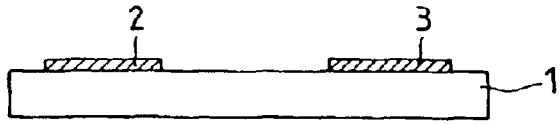
FIGS. 11A to 11E are schematic elevational cross sectional views of a surface conduction electron-emitting device that can be used for the purpose of the invention, illustrating different manufacturing steps thereof.

1) Firstly, a pair of device electrodes 2 and 3 are formed on a substrate 1 as shown in FIG. 11A.

After thoroughly cleaning the substrate 1 with a detergent, pure water and an organic solvent, the material of the device electrodes is formed on the insulating substrate 1 by appropriate film deposition means using vacuum such as vacuum deposition or sputtering and the deposited material is then etched to show a given pattern by photolithography etching.

Figure 11B:
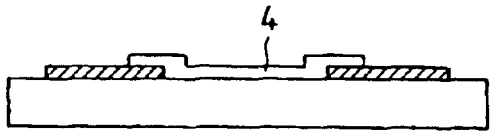
Figure 11C:
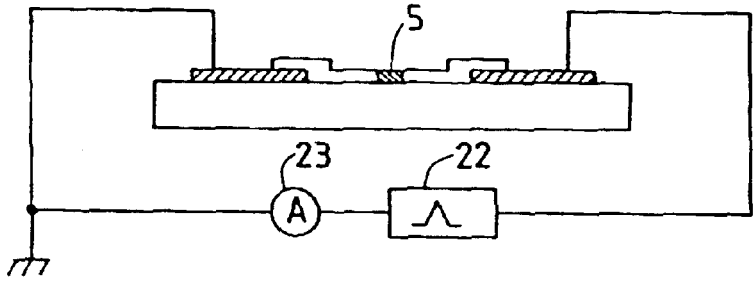

2) Then, an electroconductive film is formed as shown in FIG. 11B.

An organic metal solution is applied to the substrate of FIG. 11A and thereafter dried, heated and baked to produce a fine particle film, which is then etched to show a given pattern by photolithography etching. The organic metal solution is a solution of an organic compound containing as a principal ingredient thereof a metal with which an electroconductive film is formed on the substrate. In the examples as will be described hereinafter, Pd was used for the principal ingredient. While a dipping technique was used to apply the solution on the substrate, a spinner or a sprayer may alternatively be used.

Techniques for forming an electroconductive film of fine particles on the substrate include vacuum deposition, sputtering and chemical vapor phase deposition other than the above technique of applying an organic metal solution.

3) Thereafter, an appropriate voltage is applied to the device electrodes 2 and 3 by a forming power source 22 to carry out an energization forming operation on the electroconductive film and produce an electron-emitting region 5 in the electroconductive film.

An energization forming operation is an operation with which the electroconductive film 4 of fine particles is electrically energized and partly destroyed, deformed or changed to produce a region that is structurally suited to emit electrons. Fissures are appropriately formed in the structurally modified region suited to emit electrons (or electron-emitting region 5). The electron-emitting region 5 shows a large electric resistance if compared with that portion of the electroconductive film before it is produced when a voltage is applied between the device electrodes 2 and 3.

Figure 12:
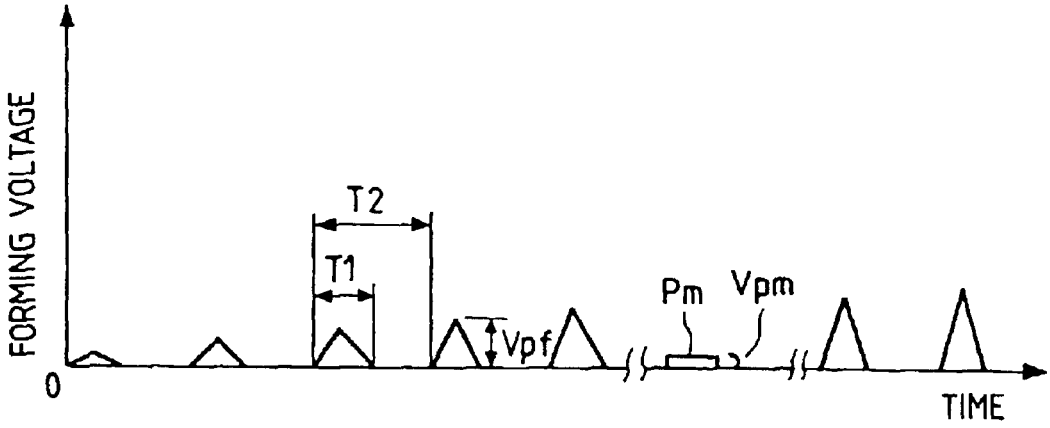
FIG. 12 is a graph showing a voltage waveform that can be used for an energization forming operation for the purpose of the invention.

The energization forming operation will now be described further by referring to FIG. 12 that illustrates a typical waveform of the voltage applied by the forming power source 22. A pulse-shaped voltage is preferably used for the operation of electrically forming an electroconductive film of fine particles. An increasing triangular pulse voltage showing triangular pulses with an increasing pulse height Vpf as illustrated in FIG. 12 is preferably used as in the case of the examples that will be described hereinafter, said triangular pulses having a width of T1 and appearing with an interval of T2. Additionally, a monitor pulse Pm is appropriately inserted in the above triangular pulses to detect the electric current given rise to by that pulse and hence the operation of the electron-emitting region 5 by means of an ammeter 23.

In the examples that will be described hereinafter, a pulse width T1 of 1 millisecond and a pulse interval T2 of 10 milliseconds were used in a vacuum atmosphere of typically $1\times10^{-5}$ Torr. The height of the triangular pulses was raised by an increment of 0.1V and a monitor pulse Pm is inserted for every five triangular pulses. The voltage of the monitor pulse Pm is set to 0.1V so that it may not adversely affect the energization forming operation. The energization forming operation is terminated when typically a resistance greater than $1\times10^{6}$ ohms is observed between the device electrodes 2 and 3 or the electric current detected by the ammeter 23 when a monitor pulse is applied is less than $1\times10^{-7}$ A.

Note that the above described numerical values for the energization forming operation are cited only as preferred examples and they may preferably and appropriately be modified when the different values are selected for the thickness of the electroconductive film of fine particles, the distance L separating the device electrodes and other design parameters.

Figure 11D:
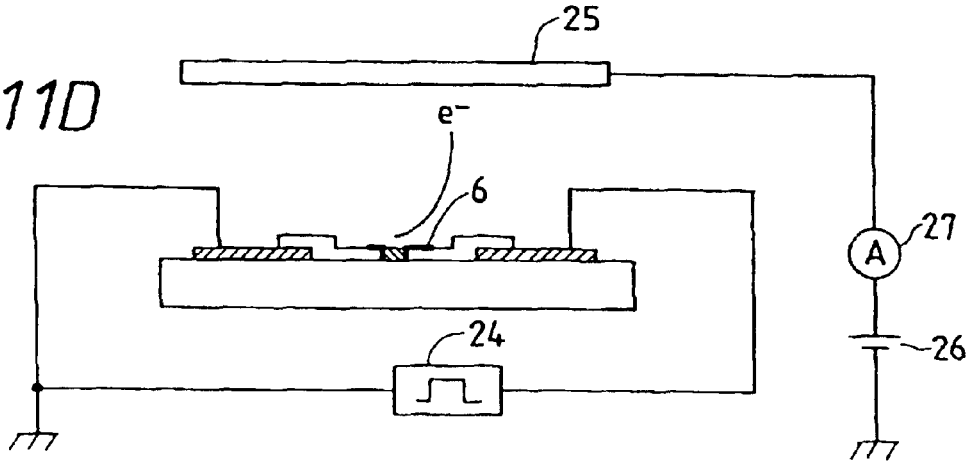

4) After the energization forming operation, the device may be subjected to an energization activation process to form a thin film 6 as mentioned by referring to FIG. 10, where an appropriate voltage is applied between the device electrodes 2 and 3 from an activation power source 24 to improve the electron emission characteristics of the device as shown in FIG. 11D.

An energization activation process is an operation where the electron-emitting region 5 that has been produced as a result of the above energization forming operation is electrically energized until carbon or a carbon compound is deposited near that region. (In FIG. 11D, the carbon or carbon compound deposits are schematically illustrated and denoted by reference numeral 6.) After the energization activation, the electron-emitting region of the device emits electrons at a rate more than 100 times greater than the rate of electron emission before the activation process if a same voltage is applied.

More specifically, a pulse voltage is periodically applied to the device in vacuum of a degree between $10^{-4}$ and $10^{-5}$ Torr so that carbon and carbon compounds may be deposited on the device out of the organic substances existing in the vacuum. The deposits 6 is typically made of monocrystalline graphite, polycrystalline graphite, non-crystalline carbon or a mixture thereof and have a film thickness of less than 500 angstroms, preferably less than 300 angstroms.

Figure 13A:
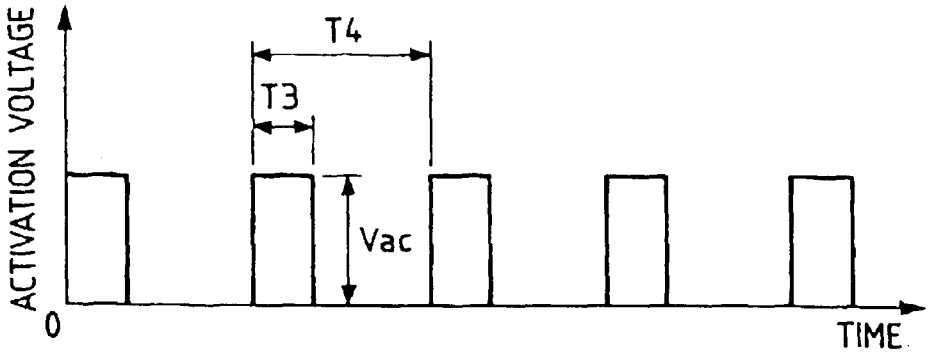
FIGS. 13A and 13B are graphs showing a voltage waveform and a waveform of an emission current that can be used for an energization activating operation for the purpose of the invention.

FIG. 13A shows a typical waveform of the voltage applied by the activation power source 24 in FIG. 11D. In examples that will be described hereinafter, a rectangular pulse voltage having a constant height was periodically applied in the energization activation process. The rectangular pulse voltage Vac was 14V and the pulse wave had a pulse width T3 of 1 millisecond and a pulse interval T4 of 10 milliseconds.

Note that the above described numerical values for the energization activation process are cited only as preferred examples and they may preferably and appropriately be modified when the different values are selected for the design parameters of the surface conduction electron-emitting device.

In FIG. 11D, reference numeral 25 denotes an anode for seizing the emission current Ie emitted from the surface conduction electron-emitting device, to which a DC high voltage power source 26 and an ammeter 27 are connected. (If the activation process is carried out after the substrate 1 is mounted on the display panel, the fluorescent plane of the display panel may be used for the anode 25.)

Figure 13B:
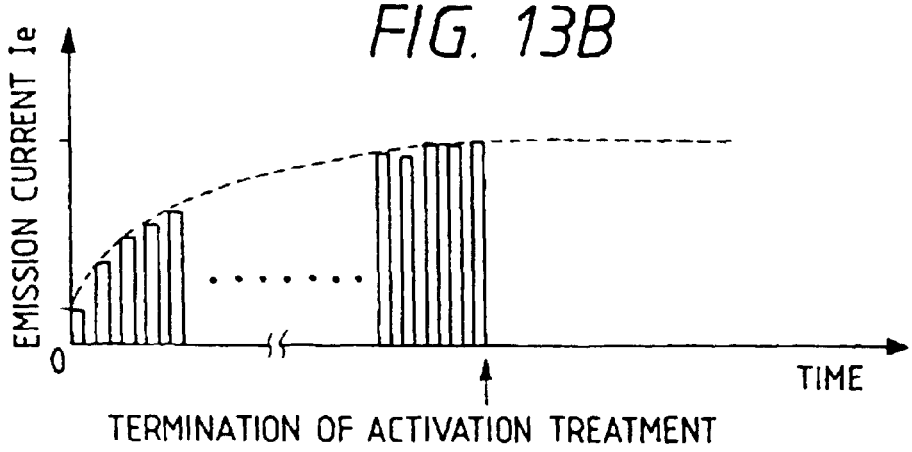

While a voltage is being applied by the activation power source 24, the emission current Ie is observed by means of the ammeter 27 to monitor the progress of the energization activation process so that the activation power source may be operated under control. FIG. 13B shows a typical behavior with time of the emission current Ie observed by means of the ammeter 27. As seen from FIG. 13B, although the emission current Ie increases with time in the initial stages of application of a pulse voltage, it eventually becomes saturated and stops increasing. The energization activation process is terminated by stopping the supply of power from the activation power source 24 when the emission current Ie gets to a saturation point.

Note that the above described numerical values for the energization activation process are cited only as preferred examples and they may preferably and appropriately be modified when the different values are selected for the design parameters of the surface conduction electron-emitting device.

Figure 11E:
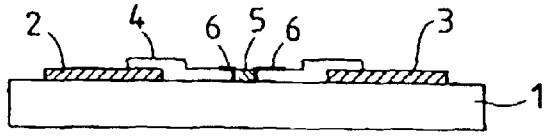

With the above manufacturing steps, a flat type surface conduction electron-emitting device as shown in FIG. 11E is produced.

Now, a step type surface conduction electron-emitting device will be described along with a method of manufacturing the same.

Figure 14:
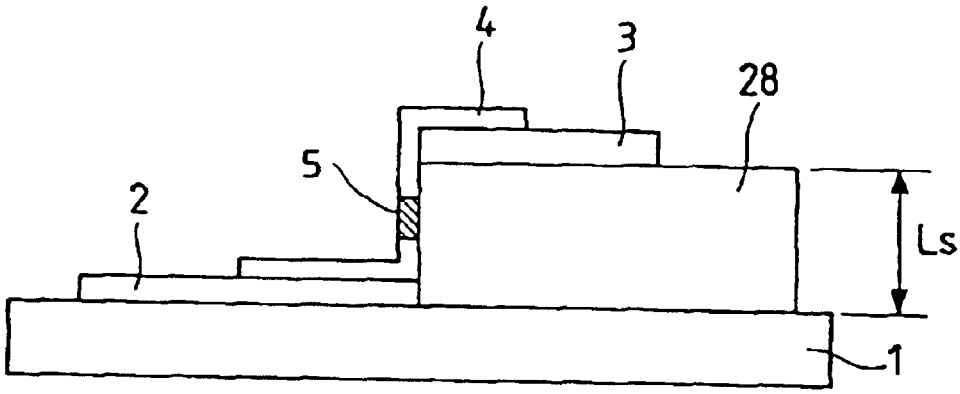
FIGS. 14 and 15 are schematic elevational cross sectional views of two different step type surface conduction electron-emitting devices that can be used for the purpose of the invention.
Figure 15:
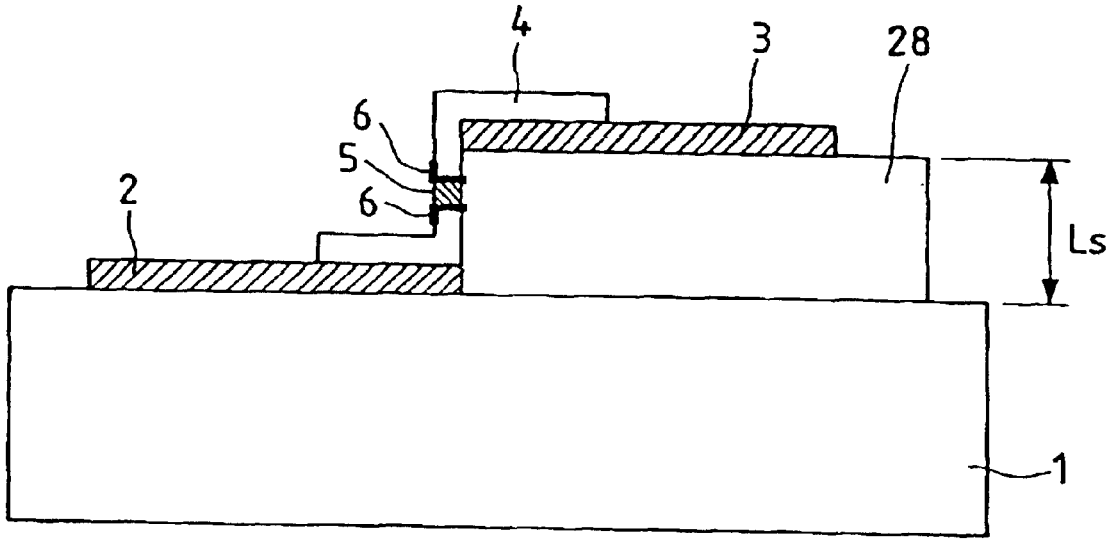

FIGS. 14 and 15 are schematic sectional side views showing the basic configuration of a step type surface conduction electron-emitting device. Referring to FIGS. 14 and 15, the device comprises a substrate 1, a pair of device electrodes 2 and 3, a step-forming section 28, an electroconductive film 4 including an electron-emitting region 5 produced by means of energization forming operation and thin films 6 formed by an energization activation process.

A step type surface conduction electron-emitting device differs from a flat type device in that one of the device electrodes, or electrode 3 is arranged on the step-forming section 28 and the electroconductive film 4 covers a lateral side of the step-forming section 28. Thus, the distance L separating the device electrodes of the flat type surface conduction electron-emitting device of FIGS. 9A, 9B or that of FIGS. 10A and 10B corresponds to the height Ls of the step of the step-forming section 28 of a step type surface conduction electron-emitting device. Note that the materials described above for a flat type surface conduction electron-emitting device may also be used for the substrate 1, the device electrodes 2 and 3 and the electroconductive film 4 of fine particles of a step type surface conduction electron-emitting device. The step-forming section 28 is typically made of an insulating material such as $SiO_2$.

A method of manufacturing a step type surface conduction electron-emitting device will be described below by referring to FIGS. 16A to 16F. Reference numerals in FIGS. 16A to 16F are the same as those in FIGS. 14 and 15.

Figure 16A:
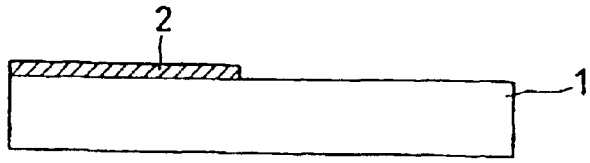
FIGS. 16A to 16F are schematic elevational cross sectional views of a step type surface conduction electron-emitting device that can be used for the purpose of the invention, illustrating different manufacturing steps thereof.

1) A device electrode 2 is formed on a substrate 1 as shown in FIG. 16A.

Figure 16B:
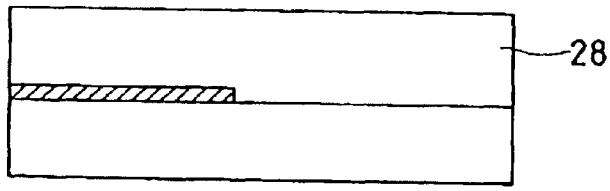

2) Then, an insulation layer 28 is laid on the substrate 1 to produce a step-forming section as shown in FIG. 16B. The insulation layer may be made of $SiO_2$ by appropriate means selected from sputtering, vacuum deposition, printing and other film forming techniques.

Figure 16C:
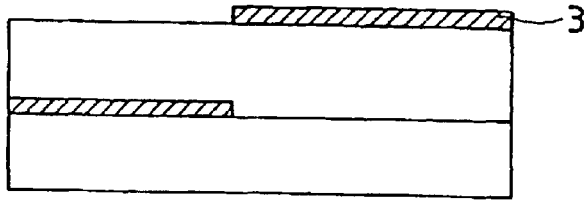

3) Thereafter, another device electrode 3 is formed on the insulation layer 28 as shown in FIG. 16C.

Figure 16D:
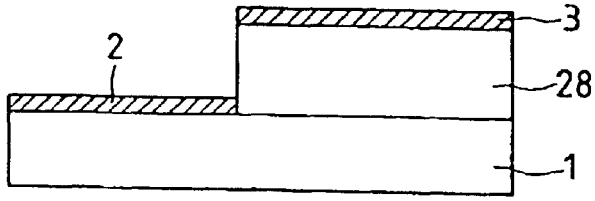

4) Subsequently, the insulation layer 28 is partly removed typically by etching to expose the device electrode 2 as shown in FIG. 16D.

Figure 16E:
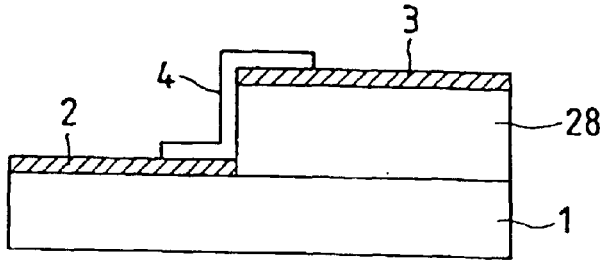

5) Then, an electroconductive film 4 of fine particles is formed as shown in FIG. 16E. The electroconductive film may be prepared typically by application as in the case of a flat type surface conduction electron-emitting device.

6) Thereafter, like the case of a flat type surface conduction electron-emitting device, the device is subjected to an energization forming operation to produce an electron-emitting region 5. That can be done by using the arrangement of FIG. 11C described earlier by referring to a flat type surface conduction electron-emitting device.

7) Finally, as in the case of a flat type surface conduction electron-emitting device, the device may be subjected to an energization activation process to deposit carbon or a carbon compound near the electron-emitting region. If such is the case, the arrangement of FIG. 11D described earlier by referring to a flat type surface conduction electron-emitting device can be used.

Figure 16F:
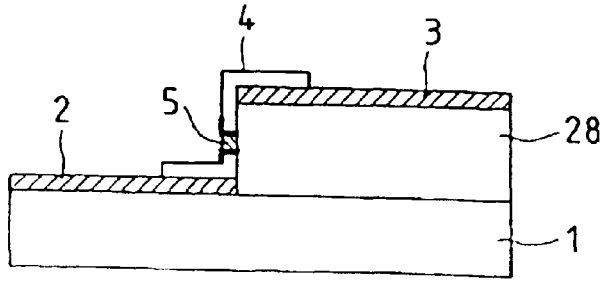

With the above manufacturing steps, a step type surface conduction electron-emitting device as shown in FIG. 16F is produced.

Now, some of the basic features of an electron-emitting device according to the invention and prepared in the above described manner will be described below when it is used for an image display apparatus.

Figure 17:
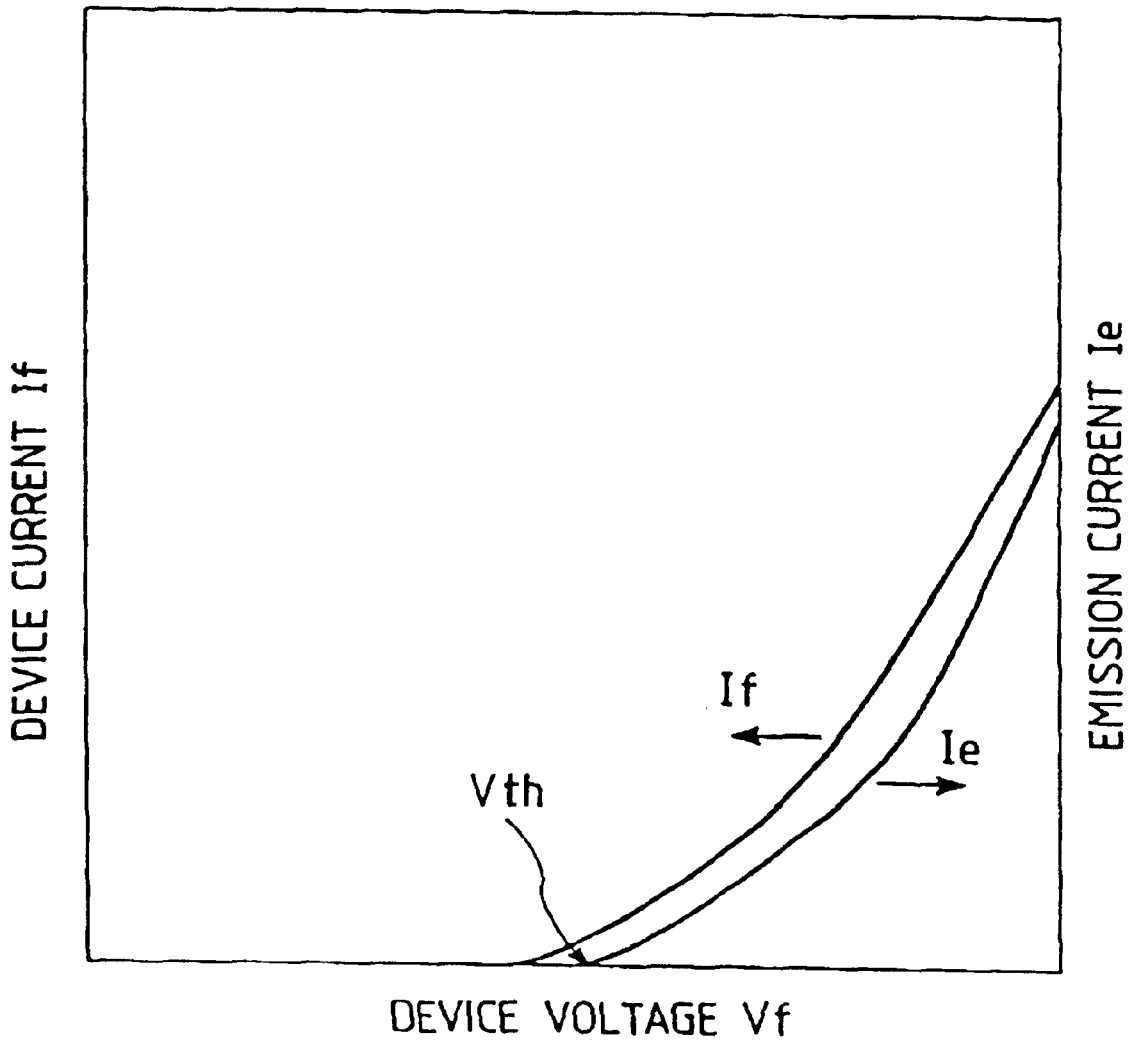
FIG. 17 is a graph showing the electric performance of a surface conduction type electron-emitting device according to the invention.

FIG. 17 shows a graph schematically illustrating the relationships between the emission current Ie and the device-applied voltage Vf and between the device current If and the device-applied voltage Vf of a surface conduction electron-emitting device when used for an image display apparatus. Note that different units are arbitrarily selected for Ie and If in FIG. 17 in view of the fact that the emission current Ie has a magnitude by far smaller than that of the device current If and the performance of the device can vary remarkably by changing the design parameters.

An electron-emitting device according to the invention has three remarkable features in terms of emission current Ie, which will be described below.

Firstly, an electron-emitting device according to the invention shows a sudden and sharp increase in the emission current Ie when the voltage applied thereto exceeds a certain level (which is referred to as a threshold voltage hereinafter Vth), whereas the emission current Ie is practically undetectable when the applied voltage is found lower than the threshold value Vth.

Differently stated, an electron-emitting device according to the invention is a non-linear device having a clear threshold voltage Vth to the emission current Ie.

Secondly, since the emission current Ie is highly dependent on the device voltage Vf, the former can be effectively controlled by way of the latter.

Thirdly, the electric charge of the electrons emitted from the device can be controlled as a function of the duration of time of application of the device voltage Vf because the emission current is produced by the electrons emitted from the device responds very quickly to the voltage Vf applied to the device.

Because of the above remarkable features, it will be understood that surface conduction electron-emitting devices according to the invention can suitable be used for image display apparatuses. By utilizing the first characteristic feature, an image can be displayed on the display screen by sequentially scanning the screen. More specifically, a voltage higher than the threshold voltage Vth is applied to a device to be driven to emit electrons as a function of the desired brightness, whereas a voltage lower than the threshold is applied to a device to be driven so as not to emit electrons. In this way, all the devices of the display apparatus are sequentially driven to scan the display screen and display an image.

Additionally, by utilizing the second or the third characteristic feature, the brightness of each device can be controlled to consequently control the tone of the image being displayed.

An image forming apparatus or an image display apparatus according to the invention can be driven in a manner as described below by referring to FIGS. 18 to 21.

Figure 18:
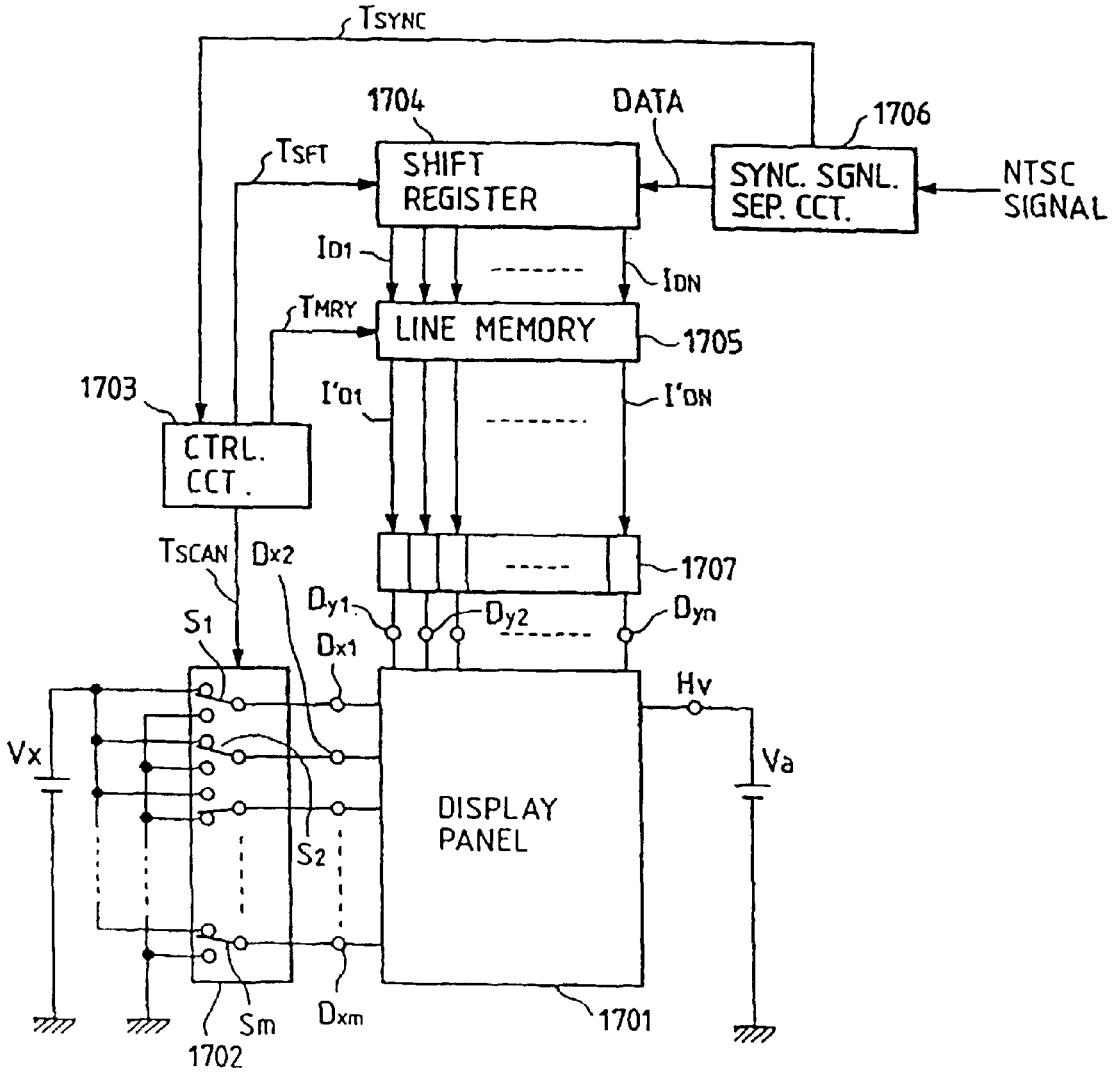
FIG. 18 is a block diagram schematically illustrating a drive circuit that can be used for an image forming apparatus according to the invention.

FIG. 18 is a block diagram of a drive circuit for carrying out the drive methods which are designed for image display operation using NTSC television signals. In FIG. 18, reference numeral 1701 denotes a display panel prepared in a manner as described above. Scan circuit 1702 operates to scan display lines whereas control circuit 1703 generates input signals to be fed to the scan circuit. Shift register 1704 shifts data for each line and line memory 1705 feeds modulation signal generator 1707 with data for a line. Synchronizing signal separation circuit 1706 separates a synchronizing signal from an incoming NTSC signal.

Each component of the apparatus of FIG. 18 operates in a manner as described below in detail.

The display panel 1701 is connected to external circuits via terminals Dx1 through Dxm, Dy1 through Dyn and high voltage terminal Hv, of which the terminals Dx1 through Dxm are designed to receive scan signals for sequentially driving on a one-by-one basis the rows (of n devices) of a multiple electron beam source in the display panel 1701 comprising a number of surface-conduction type electron-emitting devices arranged in the form of a matrix having m rows and n columns.

On the other hand, the terminals Dy1 through Dyn are designed to receive a modulation signal for controlling the output electron beam of each of the surface-conduction type electron-emitting devices of a row selected by a scan signal. The high voltage terminal Hv is fed by a DC voltage source Va with a DC voltage of a level typically around 5 kV, which is sufficiently high to energize the fluorescent bodies by electrons emitted from the selected surface-conduction type electron-emitting devices.

The scan circuit 1702 operates in a manner as follows.

The circuit comprises m switching devices (of which only devices S1 and Sm are schematically shown in FIG. 18), each of which takes either the output voltage of the DC voltage source or 0V (the ground voltage) and comes to be connected with one of the terminals Dx1 through Dxm of the display panel 1701. Each of the switching devices S1 through Sm operates in accordance with control signal Tscan fed from the control circuit 1703 and can be prepared by combining transistors such as FETs.

The DC voltage source Vx is designed to output a constant voltage so that any drive voltage applied to devices that are not being scanned is reduced to less than threshold voltage Vth as described earlier by referring to FIG. 17.

The control circuit 1703 coordinates the operations of related components so that images may be appropriately displayed in accordance with externally fed video signals. It generates control signals Tscan, Tsft and Tmry in response to synchronizing signal Tsync fed from the synchronizing signal separation circuit 1706, which will be described below.

The synchronizing signal separation circuit 1706 separates the synchronizing signal component and the luminance signal component from an externally fed NTSC television signal and can be easily realized using a popularly known frequency separation (filter) circuit. Although a synchronizing signal extracted from a television signal by the synchronizing signal separation circuit 1706 is constituted, as well known, of a vertical synchronizing signal and a horizontal synchronizing signal, it is simply designated as Tsync signal here for convenience sake, disregarding its component signals. On the other hand, a luminance signal drawn from a television signal, which is fed to the shift register 1704, is designed as DATA signal.

The shift register 1704 carries out for each line a serial/parallel conversion on DATA signals that are serially fed on a time series basis in accordance with control signal Tsft fed from the control circuit 1703. In other words, a control signal Tsft operates as a shift clock for the shift register 1704.

A set of data for a line that have undergone a serial/parallel conversion (and correspond to a set of drive data for n electron-emitting devices) are sent out of the shift register 1704 as n parallel signals Id1 through Idn.

Line memory 1705 is a memory for storing a set of data for a line, which are signals Id1 through Idn, for a required period of time according to control signal Tmry coming from the control circuit 1703. The stored data are sent out as I'd1 through I'dn and fed to modulation signal generator 1707.

Said modulation signal generator 1707 is in fact a signal source that appropriately drives and modulates the operation of each of the surface-conduction type electron-emitting devices and output signals of this device are fed to the surface-conduction type electron-emitting devices in the display panel 1701 via terminals Dy1 through Dyn.

The display panel 1701 is driven to operate in a manner as described below.

As described above by referring to FIG. 17, a surface conduction electron-emitting device according to the present invention is characterized by the following features in terms of emission current Ie. Firstly, as seen in FIG. 17, there exists a clear threshold voltage Vth (8V for the electron-emitting devices of the examples that will be described hereinafter) and the device emit electrons only when a voltage exceeding Vth is applied thereto.

Secondly, the level of emission current Ie changes as a function of the change in the applied voltage above the threshold level Vth also as shown in FIG. 17, although the value of Vth and the relationship between the applied voltage and the emission current may vary depending on the materials, the configuration and the manufacturing method of the electron-emitting device.

As each component of the drive circuit has been described above in detail by referring to FIG. 18, the operation of the display panel 1701 will now be discussed here in detail by referring to FIGS. 19 through 21 as illustrating surface conduction electron-emitting devices with a Vth value of [8[V]] *8V* to be used as a cold cathode device in examples described later, and then the overall operation of the examples will be described.

For the sake of convenience of explanation, it is assumed here that the display panel comprises 6×6 pixels (or m=n=6).

Figure 19:
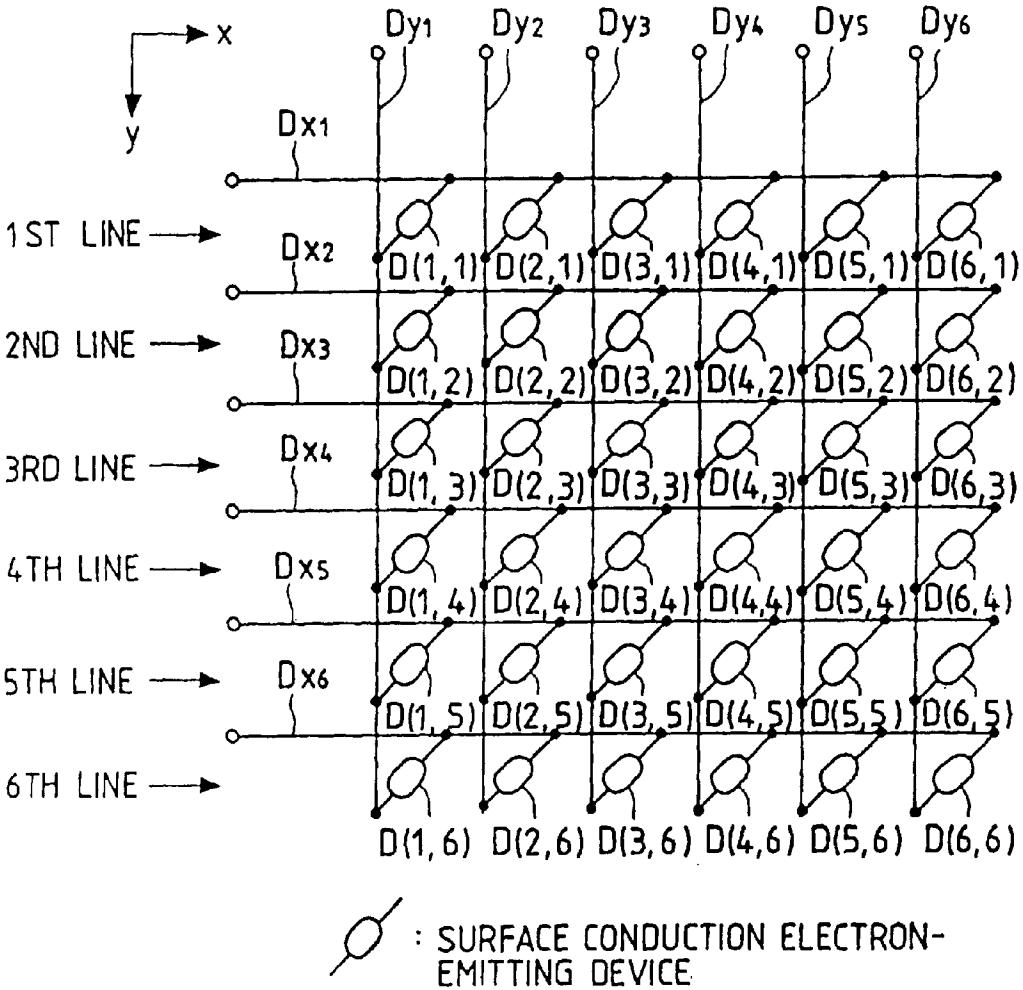
FIG. 19 is a circuit diagram showing only part of an electron source that can be used for an image forming apparatus according to the invention.

The multiple electron beam source of FIG. 19 comprises surface-conduction type electron-emitting devices arranged and wired in the form of a matrix of six rows and six columns. For the convenience of description, a (X, Y) coordinate is used to locate the devices. Thus, the locations of the devices are expressed as, for example, D(1, 1), D(1, 2) and D(6, 6).

In the operation of displaying images on the display panel by driving multiple electron beam sources as described above, an image is divided into a number of narrow strips, or lines as referred to hereinafter, running in parallel with the X-axis so that the image may be restored on the panel when all the lines are displayed there, the number of lines being assumed to be six here. In order to drive a row of surface conduction electron-emitting devices that is responsible for an image line, 0V is applied to the terminal of the horizontal wire corresponding to the row of devices, which is one of Dx1 through Dx6, while 7V is applied to the terminals of all the remaining wires. In synchronism with this operation, a modulation signal is given to each of the terminals of the vertical wires Dy1 through Dy6 according to the image of the corresponding line.

Figure 20:
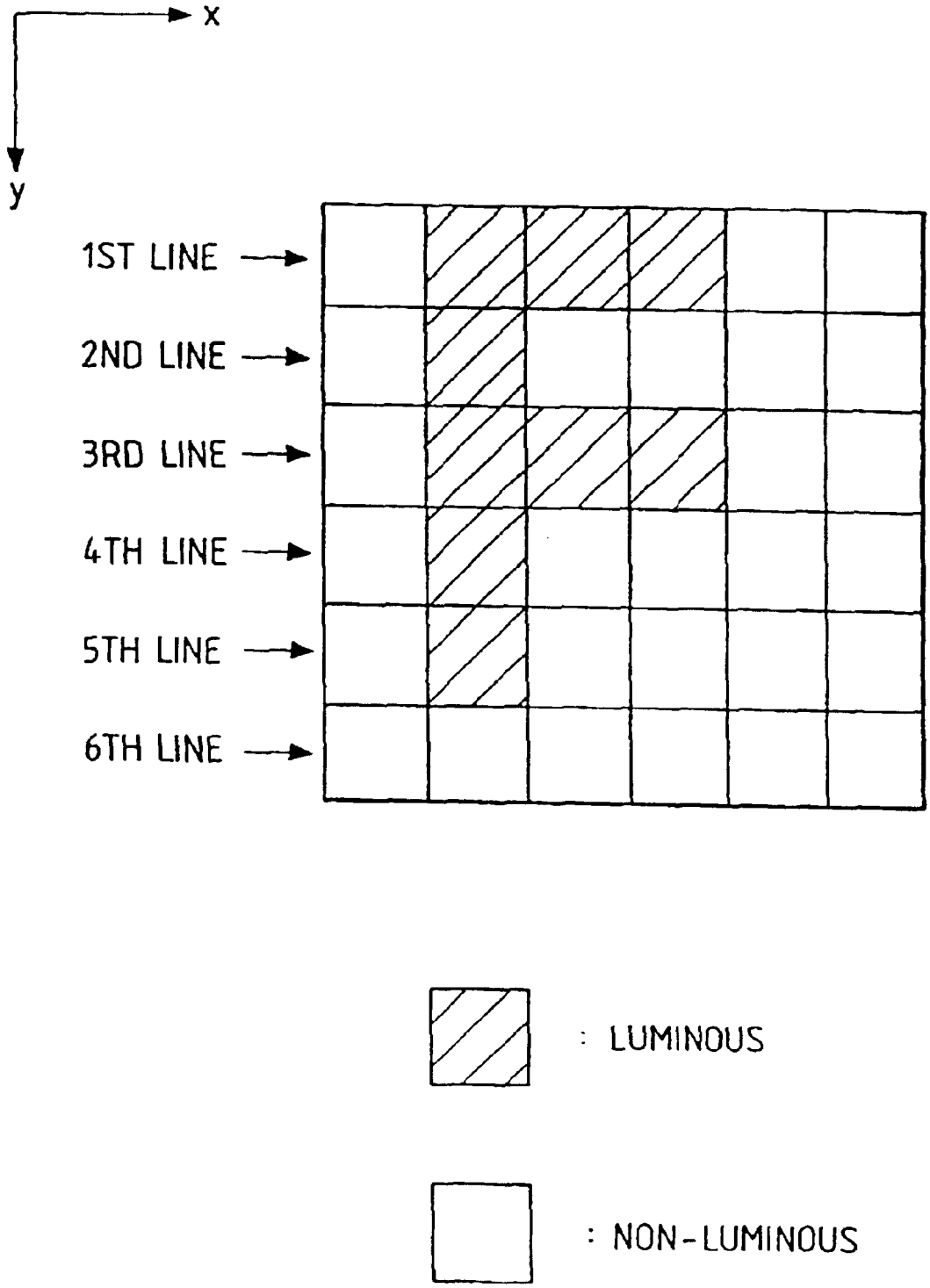
FIG. 20 is a schematic illustration showing the principle of driving an image forming apparatus according to the invention.
Figure 21:
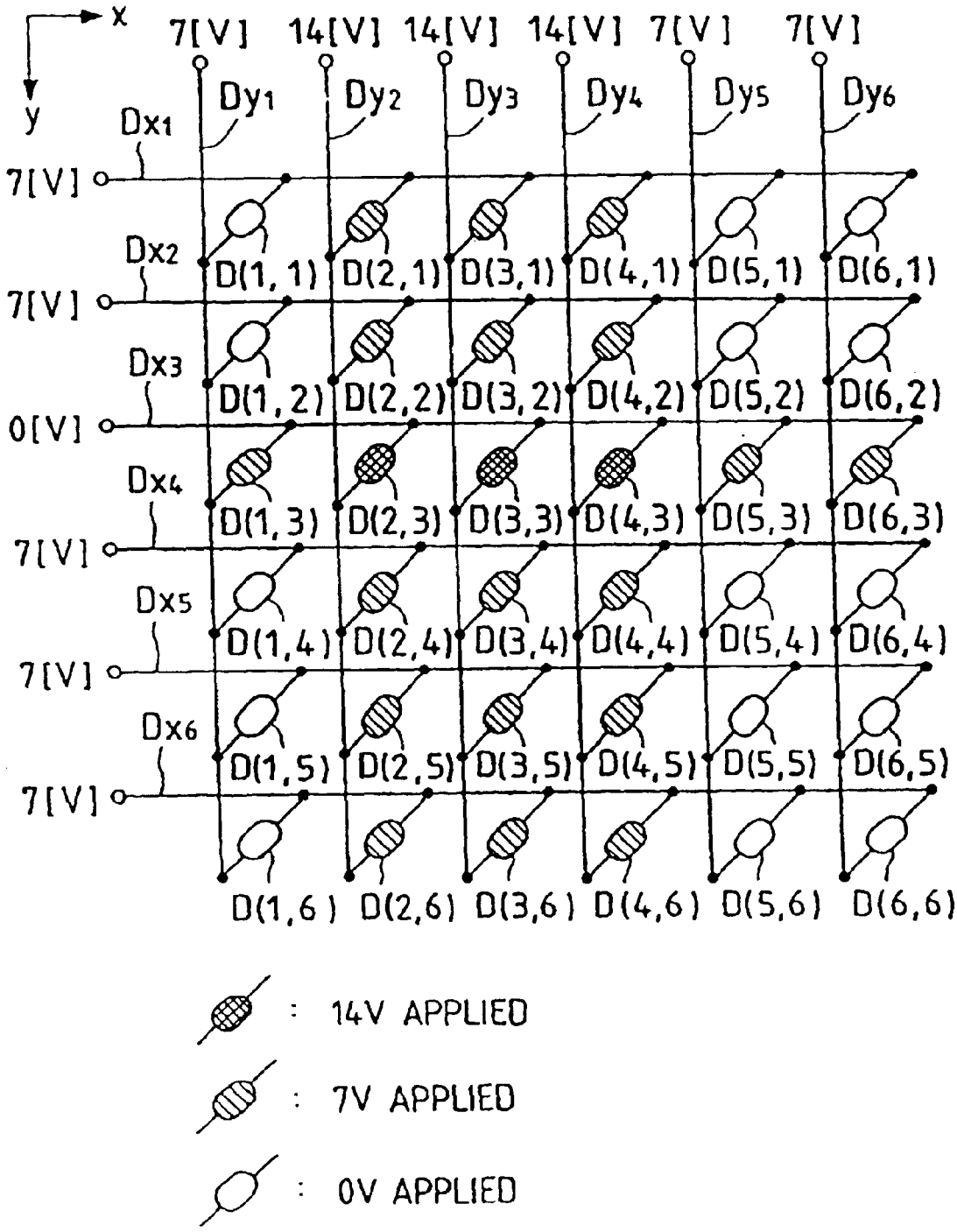
FIG. 21 is a circuit diagram showing only part of, an electron source that can be used for an image forming apparatus according to the invention, illustrating how different voltages are applied thereto.
Figure 22A:
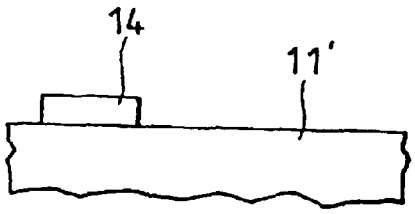
FIGS. 22A to 22H are schematic elevational cross sectional views of another surface conduction electron-emitting device that can be used for the purpose of the invention, illustrating different manufacturing steps thereof.
Figure 22B:
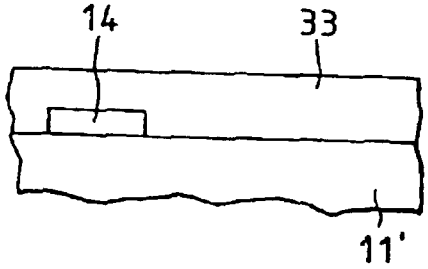
Figure 22C:
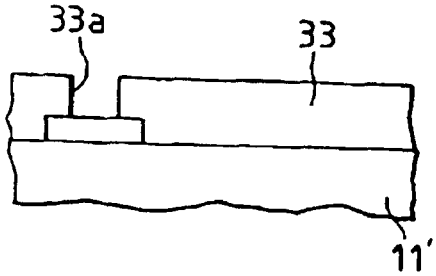
Figure 22D:
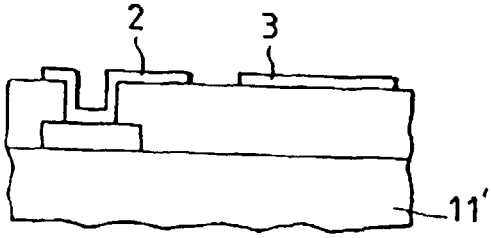
Figure 22E:
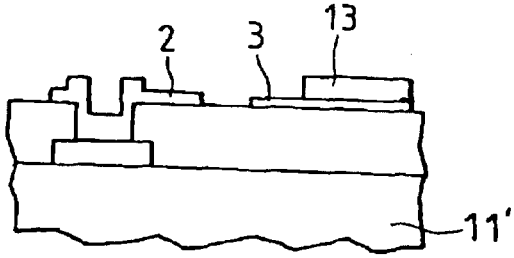
Figure 22F:
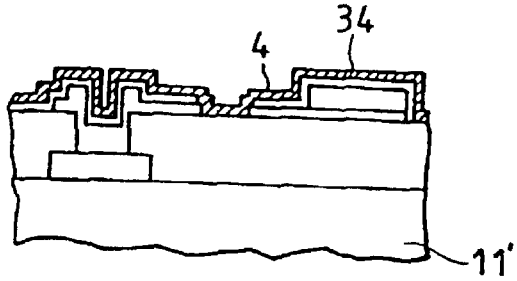
Figure 22G:
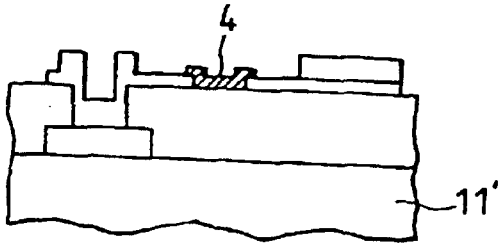
Figure 22H:
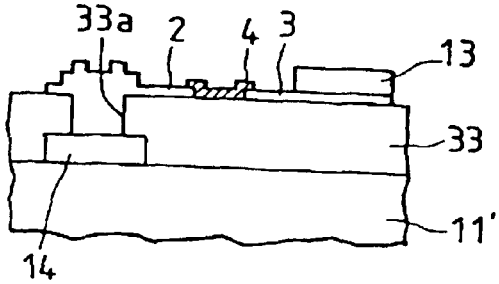

Assume now that an image as illustrated in FIG. 20 is displayed on the panel.

Assume further that, in FIG. 20, the operation is currently on the stage of making the third line turn bright. FIG. 21 shows what voltages are applied to the multiple electron beam source by way of the terminals Dx1 through Dx6 and Dy1 through Dy6. As seen in FIG. 21, a voltage of 14V which is by far above the threshold voltage of 8V for electron emission is applied to each of the surface conduction type electron-emitting devices D(2, 3), D(3, 3) and D(4, 3) (black devices) of the beam source, whereas 7V or 0V is applied to each of the remaining devices (7V to shaded devices and 0V to white devices). Since these voltages are lower than the threshold voltage of 8V, these devices do not emit electron beams at all.

In the same way, the multiple electron beam source is driven to operate for all the other lines. The lines are driven sequentially, starting from the first line and the operation of driving all the lines is repeated at a rate of 60 times per second so that images may be displayed without flickering.

EXAMPLES

Now, the present invention will be described in greater detail by way of examples.

In each of the examples described below, a multiple electron beam source comprising a total of N×M (N=3,072, M=1,024) surface conduction electron-emitting devices, each having an electron-emitting region formed in an electroconductive film arranged between a pair of device electrodes, along with M row-directed wirings and N column-directed wirings arranged in the form of a matrix for connecting the devices was used.

Firstly, a substrate 11' carrying thereon a total of N×M electroconductive films of fine particles along with N row-directed wirings and M column-directed wiring arranged in the form of a matrix for connecting the films was prepared by following the manufacturing steps illustrated in FIGS. 22A through 22H. Note that Steps a through h correspond to FIGS. 22A through 22H.

Step a: After thoroughly cleaning a soda lime glass plate a silicon oxide film was formed thereon to a thickness of 0.5 μm by sputtering to produce a substrate 11', on which Cr and Au were sequentially laid to thicknesses of 50 angstroms and 5,000 angstroms respectively and then a photoresist (AZ1370: available from Hoechst Corporation) was formed thereon by means of a spinner, and baked. Thereafter, a photo-mask image was exposed to light and developed to produce a resist pattern for column-directed wirings 14 and then the deposited Au/Cr film was wet-etched to produce column-directed wirings 14 having an intended profile.

Step b: A silicon oxide film was formed as an interlayer insulation layer 33 to a thickness of 1.0 μm by RF sputtering.

Step c: A photoresist pattern was prepared for producing a contact hole 33a in the silicon oxide film 14 deposited in Step b, which contact hole 33a was then actually formed by etching the interlayer insulation layer 33, using the photoresist pattern for a mask. A technique of RIE (Reactive Ion Etching) using $CF_4$ and $H_2$ gas was employed for the etching operation.

Step d: Thereafter, a pattern of photoresist (RD-2000N-41: available from Hitachi Chemical Co., Ltd.) was formed for a pair of device electrodes and a gap separating the pair of electrodes and then Ti and Ni were sequentially deposited thereon respectively to thicknesses of 50 Å and 1,000 Å by vacuum deposition for each surface conduction electron-emitting device. The photoresist pattern was dissolved by an organic solvent and the Ni/Ti deposit film was treated by using a lift-off technique to produce a pair of device electrodes having a width W (FIG. 9A) of 300 μm and separated from each other by a distance L (FIG. 9A) of 3 μm.

Step e: After forming a photoresist pattern on the device electrodes 2 and 3 for row-directed wirings 13, Ti and Au were sequentially deposited by vacuum deposition to respective thicknesses of 50 angstroms and 5,000 angstroms and then unnecessary areas were removed by means of a lift-off technique to produce row-directed wirings 13.

Figure 23:
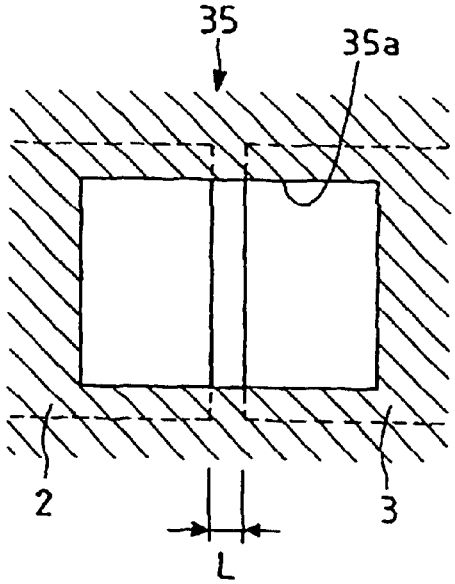
FIG. 23 is a schematic partial plan view of the step type surface conduction electron-emitting device of FIGS. 22A to 22H, illustrating how chromium film is formed thereon in the step of FIG. 22F.

Step f: A mask having an opening 35 that partly exposed both device electrodes separated by distance L as shown in FIG. 23 was used to form a Cr film 34 to a film thickness of 1,000 angstroms by vacuum deposition, which was then subjected to a patterning operation. Thereafter, an organic Pd solution (ccp4230: available from Okuno Pharmaceutical Co., Ltd.) was applied to the Cr film by means of a spinner, and baked at 300° C. for 10 minutes.

The formed electroconductive film for producing an electron-emitting region was made of fine particles containing Pd as a principal ingredient and had a film thickness of 100 angstroms and an electric resistance per unit area of $5\times10^4$ Ω/□. Note that, an electroconductive film of fine particles is a film made of aggregated fine particles, where fine particles may be in a dispersed, adjacently arranged or overlapped (including an islands structure) state, the fine particles having a diameter recognizable in any of the above listed states.

Note that an organic metal solution (other than an organic Pd solution used here) containing as a principal ingredient Pd, Ru, Ag, Au, Ti, In, Cu, Cr, Fe, Zn, Sn, Ta, W or Pb may be used for the purpose of the invention. While an organic metal solution was applied in the above description for preparing an electroconductive film, from which an electron-emitting region was produced, any other appropriate technique selected from vacuum deposition, sputtering, chemical vapor phase deposition, dispersive application, dipping and spinning may alternatively be used.

Step g: The Cr film 34 was removed by an acid etchant to produce an electron-emitting region having a desired pattern.

Step h: Then, a pattern for applying photoresist to the entire surface area except the contact hole 33a was prepared and Ti and Au were sequentially deposited by vacuum deposition to respective thicknesses of 50 angstroms and 5,000 angstroms. Any unnecessary areas were removed by means of a lift-off technique to consequently bury the contact hole 33a.

By following the above steps, a total of M×N electroconductive films 4 (for electron-emitting regions) that are respectively connected to M row-directed wirings 13 and N column-directed wiring 14 by way of respective device electrodes 2 and 3 were produced in the form of a matrix on the insulating substrate 11'.

Example 1-1

In this example, a display panel on which a number of spacers were arranged as shown in FIG. 1 was prepared. This example will be described by referring to FIGS. 1 and 2. A substrate 11' on which a plurality of electroconductive films for producing electron-emitting regions had been arranged and wired to form a matrix was secured to a rear plate. Then, a semiconductor thin film 20b of tin oxide was formed on four of the surfaces of the insulating member 20a of soda lime glass of each spacer 20 (height: 5 mm, thickness: 200 μm, length: 20 mm) that had been exposed to the inside of the envelope (airtightly sealed container) and the spacers 20 were secured on the substrate 11' on respective row-directed wirings 13 in parallel with the wirings 13 at regular intervals. Thereafter, a face plate 17 carrying a fluorescent film 18 and a metal back 19 on the inner surface thereof was arranged 5 mm above the substrate 11' with lateral walls 16 disposed therebetween and, subsequently, the rear plate 15, the face plate 17, the lateral walls 16 and the spacers 20 were secured relative to each other.

Frit glass (not shown) was then applied to the contact areas of the substrate 11' and the rear plate 15, the rear plate and the lateral walls 16 and the face plate 17 and the lateral walls 16 and baked at 400 to 500° C. in the ambient air for more than 10 minutes to hermetically seal the container.

The spacers 20 were bonded to the respective row-directed wirings 13 (width: 300 μm) on the substrate 11' and to the metal back 19 on the side of the face plate 17 by applying electroconductive frit glass (not shown) containing an electroconductive material such as metal and baking it at 400 to 500° C. in the ambient air for more than 10 minutes so that electric connection was established therebetween.

In the above example, the fluorescent film 18 comprised stripe-shaped fluorescent members 21a of red, green and blue extending along the Y-direction and black electroconductive members 21b separating any adjacent fluorescent members and pixels arranged in the Y-direction. The spacers 20 were located within the width (300 μm) of the respective black electroconductive members 21b with the metal back 19 disposed therebetween.

A deposit of tin oxide was formed to a thickness of 1,000 angstroms by ion plating, using an electron beam method, in an argon/oxygen atmosphere as a semiconductor thin film 20b on the soda lime glass made insulating member 20a of each spacer 20 that had been thoroughly cleansed. The electric resistance of the surface of the semiconductor thin film 20b was about $1\times10^{-9}$ Ω/□.

For the above bonding operation, the rear plate 15, the face plate 17 and the spacers 20 were carefully aligned in order to ensure an accurate positional correspondence between the color fluorescent members 21 and the electroconductive films 4 for producing electron-emitting regions arranged on the substrate 11'.

Figure 3:
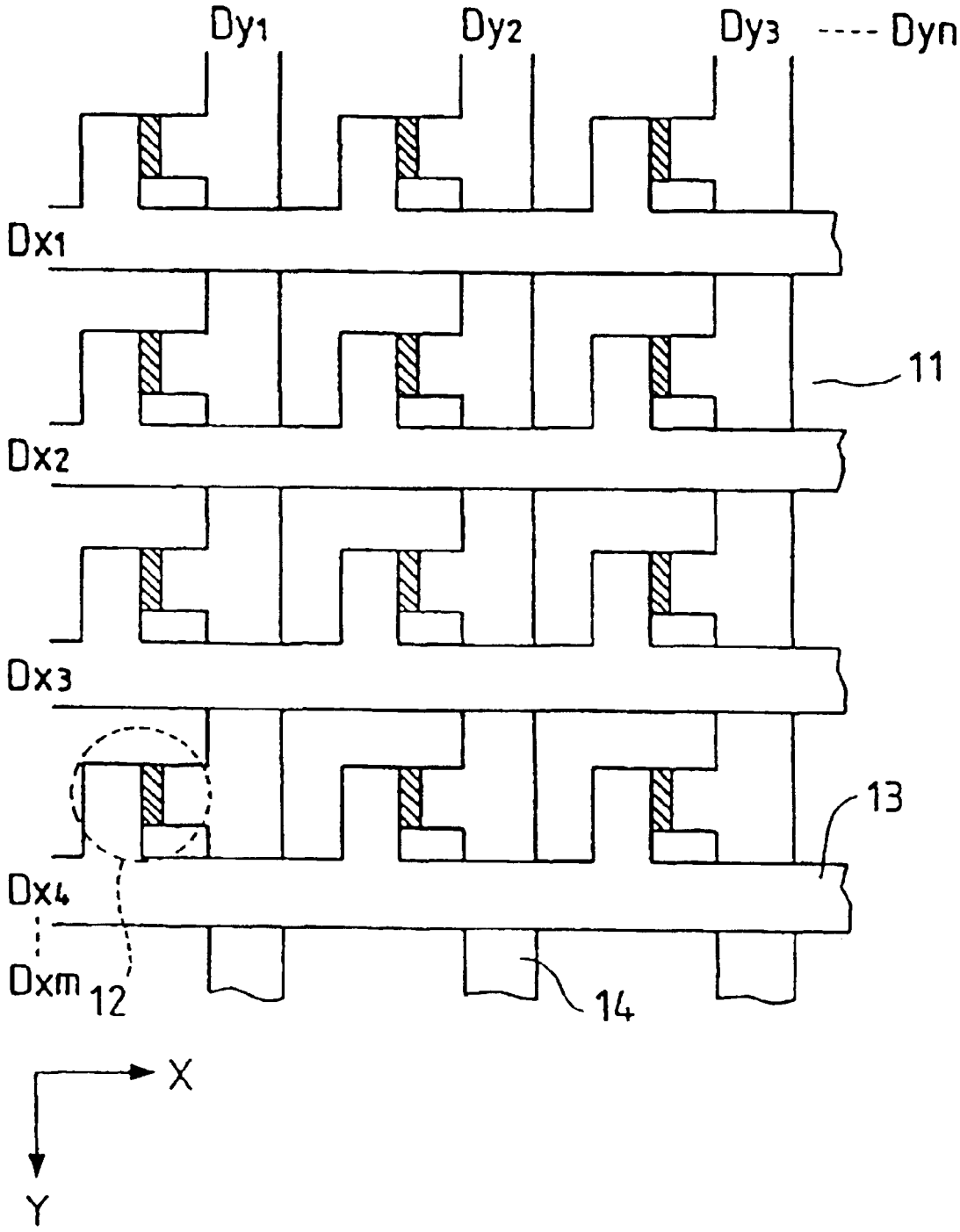
FIG. 3 is a schematic partial plan view of the electron source of the image forming apparatus of FIG. 1, showing a principal portion thereof.

The inside of the prepared envelope (airtightly sealed container) was then evacuated by way of an exhaust pipe and a vacuum pump to a sufficient degree of a vacuum and thereafter, a voltage having a waveform as shown in FIG. 12 was applied to the electroconductive films 4 for producing electron-emitting regions by way of the external terminals Dx1 through Dxm and Dy1 through Dyn to carry out an electrically energizing process (energization forming process) on the electroconductive films 4 for producing electron-emitting regions. Consequently, electron-emitting regions were formed on the respective electroconductive films 4 to produce a multiple electron beam source comprising surface conduction electron-emitting devices, or cold cathode devices, wired by a plurality of wirings arranged in the form of a matrix as shown in FIGS. 2 and 3.

Thereafter, when the inside of the envelope reached to a degree of vacuum of $10^{-6}$ Torr, the exhaust pipe (not shown) was sealed by heating and melting it with a gas burner to hermetically seal the envelope (airtightly sealed container).

Finally, the display panel was subjected to a getter operation in order to maintain the inside to a high degree of vacuum.

In order to drive the prepared image-display apparatus comprising a display panel as illustrated in FIGS. 1 and 2, scan signals and modulation signals were applied to the cold cathode devices (surface conduction electron-emitting devices) 12 to emit electrons from respective signal generation means by way of the external terminals Dx1 through Dxm and Dy1 through Dyn, while a high voltage was applied to the metal back 19 by way of the high voltage terminal Hv so that electrons emitted from the cold cathode devices were accelerated by the high voltage and collided with the fluorescent film 18 to cause the fluorescent members 21a of red, green and blue (FIG. 24) to excite to emit light and produce images. The voltage Va applied to the high voltage terminal Hv was from 3 kV to 10 kV, whereas the voltage Vf applied between the wirings 13 and 14 was 14V.

Under this condition, regularly arranged glowing spots were two-dimensionally formed at regular intervals on the display screen by electrons emitted from the cold cathode devices 12 including those located near the spacers 20 to produce clear and sharp images on the screen. This proved that the spacers 20 did not give rise to any disturbances to the electric fields in the display apparatus that could adversely affect the trajectories of electrons.

Example 1-2

This examples differs from Example 1-1 only in that a deposit of tin oxide was formed to a thickness of 1,000 angstroms by ion plating, using an electron beam method, in an oxygen atmosphere as a semiconductor thin film 20b on each spacer 20 in this example. The electric resistance of the surface of the semiconductor thin film 20b was about $1\times10^{12}$ Ω/□.

In order to drive the prepared image-display apparatus comprising a display panel, scan signals and modulation signals were applied to the cold cathode devices (surface conduction electron-emitting devices) 12 to emit electrons from respective signal generation means by way of the external terminals Dx1 through Dxm and Dy1 through Dyn, while a high voltage was applied to the metal back 19 by way of the high voltage terminal Hv so that electrons emitted from the cold cathode devices were accelerated by the high voltage and collided with the fluorescent film 18 to cause the fluorescent members 21a to excite to emit light and produce images. The voltage Va applied to the high voltage terminal Hv was from 3 kV to 10 kV, whereas the voltage Vf applied between the wirings 13 and 14 was 14V.

Under this condition, it was confirmed as a result of comparison with an image display apparatus comprising spacers without a semiconductor thin film 20b that the display panel was effectively protected against undesired electric charges as in the case of Example 1-1.

Example 1-3

This examples differs from Example 1-1 in that a deposit of tin oxide was formed to a thickness of 1,000 angstroms by ion plating, using an electron beam method, in an argon atmosphere as a semiconductor thin film 20b on each spacer 20 in this example. The electric resistance of the surface of the semiconductor thin film 20b was about $1\times10^{7}$ Ω/□. Besides, no metal back 19 was used and a transparent electrode of ITO film was arranged between the face plate 17 and the fluorescent film 18. Said ITO film provided electric connection between the black electroconductive members 21b (FIG. 24) and the high voltage terminal Hv (FIG. 2). Otherwise, the display panel of this examples was identical with that of Example 1-1.

In order to drive the prepared image-display apparatus comprising a display panel, scan signals and modulation signals were applied to the cold cathode devices (surface conduction electron-emitting devices) 12 to emit electrons from respective signal generation means by way of the external terminals Dx1 through Dxm and Dy1 through Dyn, while a high voltage was applied to the transparent electrode of ITO film by way of the high voltage terminal Hv so that electrons emitted from the cold cathode devices were accelerated by the high voltage and collided with the fluorescent film 18 to cause the fluorescent members 21a to excite to emit light and produce images. The voltage Va applied to the high voltage terminal Hv was less than 1 kV, whereas the voltage Vf applied between the wirings 13 and 14 was 14V.

Under this condition, regularly arranged glowing spots were two-dimensionally formed at regular intervals on the display screen by electrons emitted from the cold cathode devices 12 including those located near the spacers 20 to produce clear and sharp images on the screen. This proved that the spacers 20 did not give rise to any disturbances to the electric fields in the display apparatus that could adversely affect the trajectories of electrons.

Example 1-4

This examples differs from Example 1-1 in that a deposit of tin oxide containing a dopant was formed to a thickness of 1,000 angstroms by ion plating, using an electron beam method, as a semiconductor thin film 20b on each spacer 20 in this example. The electric resistance of the surface of the semiconductor thin film 20b was about $1\times10^{5}$ Ω/□. Besides, no metal back 19 was used and a transparent electrode of ITO film was arranged between the face plate 17 and the fluorescent film 18. Said ITO film provided electric connection between the black electroconductive members 21b (FIG. 24) and the high voltage terminal Hv (FIG. 2). The height of the spacers 20 and the distance between the substrate 11' and the face plate 17 were 1 mm. Otherwise, the display panel of this example was identical with that of Example 1-1.

In order to drive the prepared image-display apparatus comprising a display panel, scan signals and modulation signals were applied to the cold cathode devices (surface conduction electron-emitting devices) 12 to emit electrons from respective signal generation means by way of the external terminals Dx1 through Dxm and Dy1 through Dyn, while a high voltage was applied to the transparent electrode of ITO film by way of the high voltage terminal Hv so that electrons emitted from the cold cathode devices were accelerated by the high voltage and collided with the fluorescent film 18 to cause the fluorescent members 21a (FIG. 24) to excite to emit light and produce images. The voltage Va applied to the high voltage terminal Hv was from 10V to 100V, whereas the voltage Vf applied between the wirings 13 and 14 was 14V.

Under this condition, regularly arranged glowing spots were two-dimensionally formed at regular intervals on the display screen by electrons emitted from the cold cathode devices 12 including those located near the spacers 20 to produce clear and sharp images on the screen. This proved that the spacers 20 did not give rise to any disturbances to the electric fields in the display apparatus that could adversely affect the trajectories of electrons.

As seen from the above description, the image display apparatuses of the above examples have the following effects.

Firstly, since electric charges that have to be removed appear only on the surface of the spacers 20, the spacers 20 are required only to prevent electric charges from appearing on the surface. In the above examples, a semiconductor thin film 20b was formed on the insulating member 20a of each spacer 20 so that the spacer 20 showed a sufficiently low electric resistance on the surface that could neutralize any electric charge that might appear on the surface and a flow rate of leak current that did not significantly raise the power consumption level of the apparatus. In short, flat type image forming apparatuses having a large display screen were realized without adversely affecting the advantage of cold cathode devices or surface conduction electron-emitting devices of a very low heat generation rate.

Secondly, since the spacers 20 had an evenly flat cross section relative to the normal of the substrate 11 and the face plate 17 shown in FIGS. 1 and 2, they did not disturb any electric fields within the apparatus. Thus, unless the spacers 20 blocked the trajectories of electrons from the cold cathode devices 12, they could be placed close to the cold cathode devices 12 and therefore the latter could be arranged densely along the X-direction that was perpendicular relative to the spacers 20. Additionally, since any leak currents did not flow through the insulating member 20a that occupied most of the cross section of each spacer 20, small leak currents, if any, could be effectively suppressed without any additional arrangements such as using pointed spacers 20 to be bonded to the substrate 11 or the face plate 17.

In particular, as surface conduction electron-emitting devices were used for cold cathode devices in the above examples and flat spacers 20 were arranged in parallel with a plane defined by the X- and Z-directions along the trajectories of electrons from the surface conduction electron-emitting devices that were swerved toward the X-direction, the surface conduction electron-emitting devices could be arranged densely along the X-direction that was parallel relative to the spacers 20 without any trajectories of electrons blocked by any of the spacers 20.

Still additionally, since each of the spacers 20 were electrically connected to a single row-directed wiring 13 on the substrate 11, any entangled and/or unnecessary electric connections were avoided among the wirings on the substrate 11.

Finally, by using spacer 20 provided with a desired semiconductor thin film 20b and requiring no complicated additional structure as described above in an image display apparatus comprising a multiple electron beam source formed by arranging and wiring surface conduction electron-emitting devices to form a simple matrix proposed by the inventors of the present invention, a very flat image display apparatus having a large display screen was realized.

Figure 25:
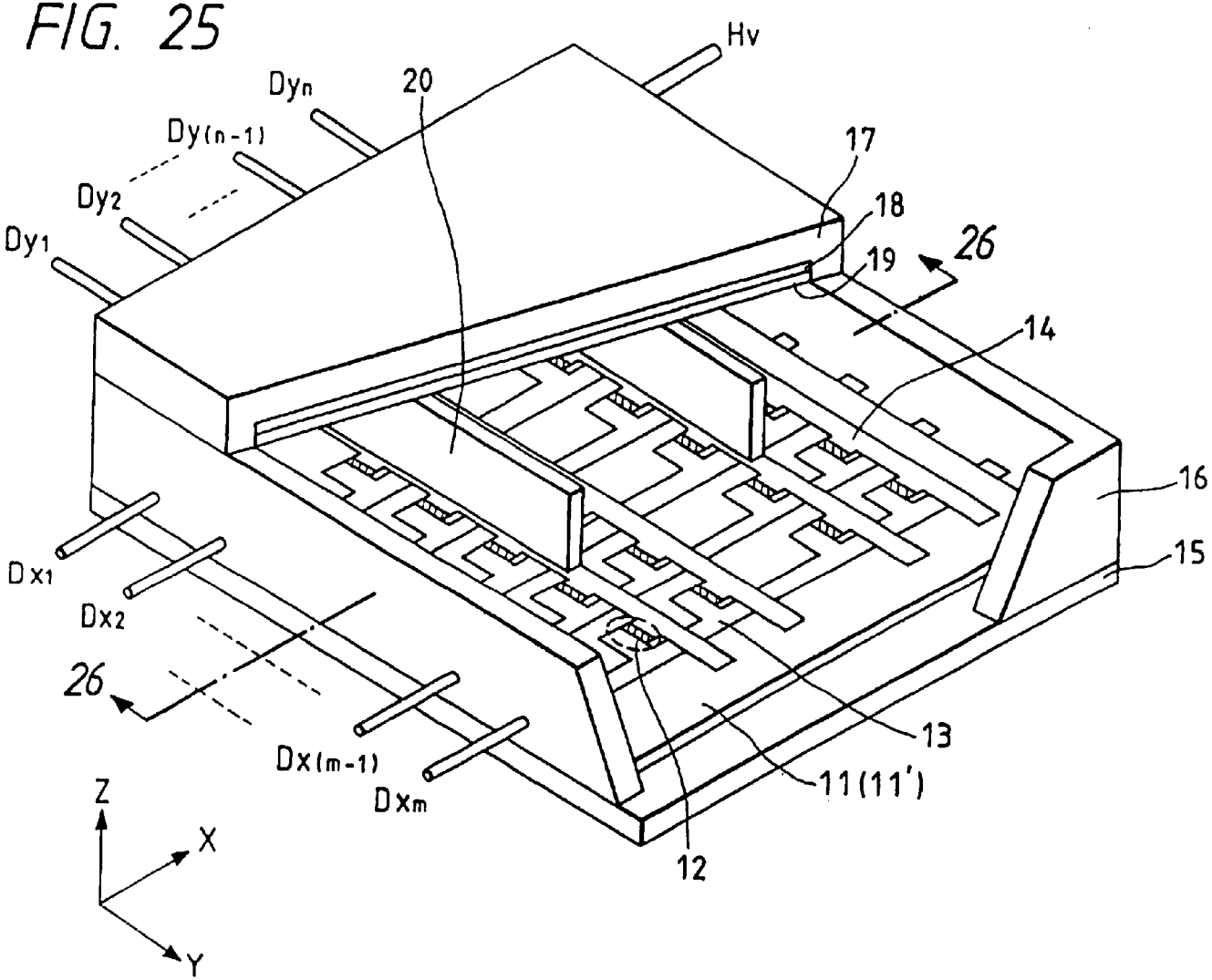
FIG. 25 is a partially broken schematic perspective view of another image forming apparatus according to the invention.
Figure 26:
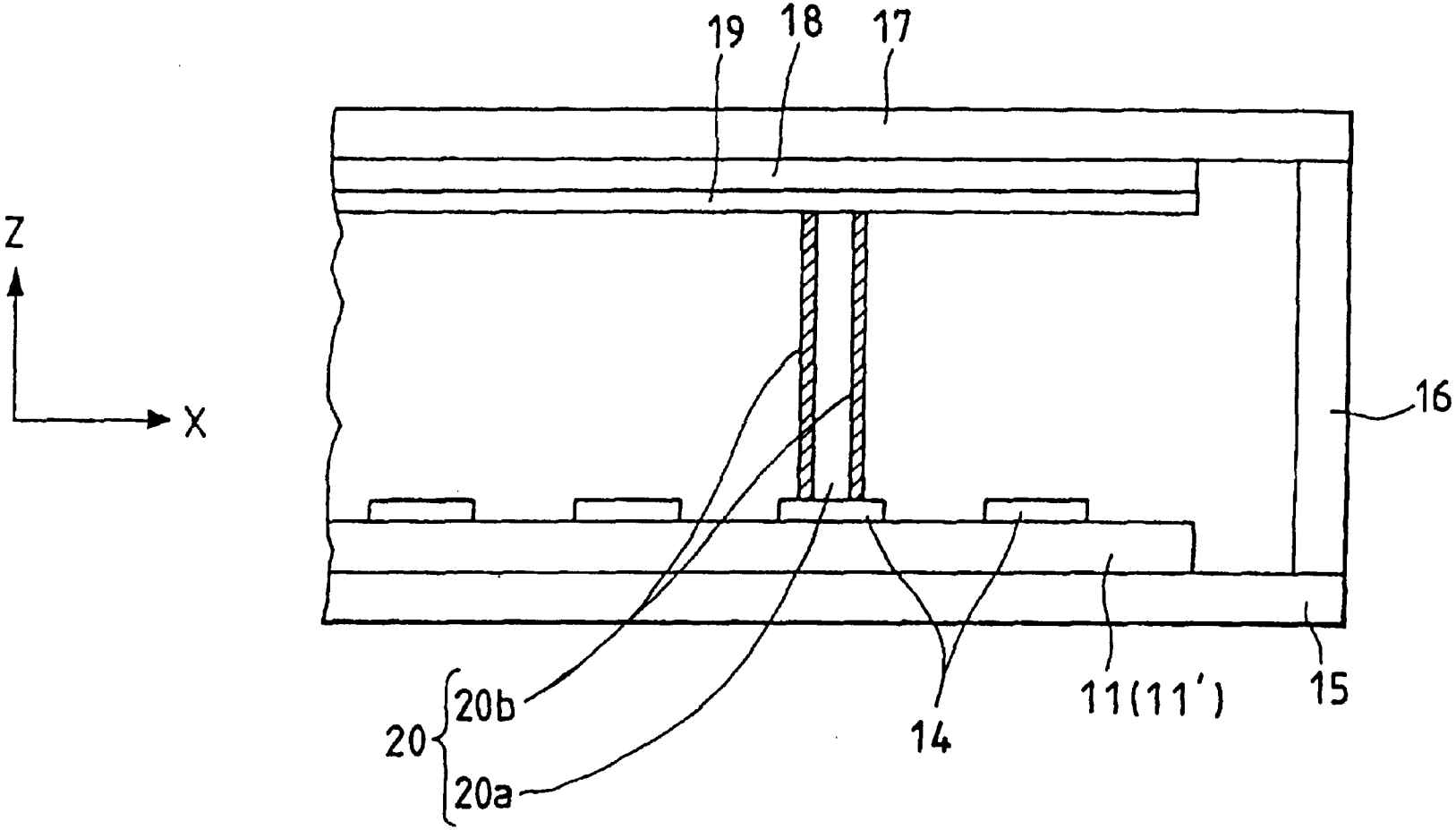
FIG. 26 is a schematic cross sectional view showing part of the image forming apparatus of FIG. 25 taken along line 26-26 to illustrate a spacer and its vicinity.

The following examples differ from the above examples in that the row-directed wirings 13 and the column-directed wirings 14 were laid in the image display apparatuses of the following examples inversely relative to those of the apparatuses of the above examples and that spacers 20 were arranged on the respective column-directed wirings 14 as shown in FIGS. 25 and 26.

FIG. 25 is a partially broken schematic perspective view of a display panel used in the image display apparatus of the following examples and FIG. 26 is a schematic cross sectional view showing part of the image forming apparatus of FIG. 25 taken along line 26-26 to illustrate a spacer and its vicinity.

Note that the fluorescent film 18 of the display panel of FIGS. 25 and 26 is the same as the one shown in FIG. 4A.

Referring to FIGS. 25 and 26, a plurality of surface conduction electron-emitting devices 12 are arranged and wired to show a matrix on a substrate 11, which is by turn rigidly secured to a rear plate 15. A face plate 17 carries on the inner surface thereof a fluorescent film 18 and a metal back 19 that operates as an accelerating electrode. Said face plate 17 and said substrate 11 are disposed vis-a-vis with lateral walls 16 made of an insulating material arranged therebetween. A high voltage is applied between the substrate 11 and the metal back 19 by means of a power source (not shown). The rear plate 15, the lateral walls 16 and the face plate 17 are bonded together by means of frit glass to produce an envelope (airtightly sealed container).

Thin and flat spacers 20 are arranged within the envelope (airtightly sealed container) to make it withstand the atmospheric pressure. Each spacer 20 comprises an insulating member 20a coated with a semiconductor thin film 20b. A number of spacers 20 necessary to make the envelope withstand the atmospheric pressure are arranged with required intervals in parallel with the Y-direction and bonded to the metal back 19 on the inner surface of the face plate 17 and the column-directed wirings 14 on the substrate 11 by means of frit glass. The semiconductor thin film 20b of each spacer 20 is electrically connected to the metal back 19 on the inner surface of the face plate 17 and the corresponding column-directed wiring 14 on the substrate 11.

Figure 27:
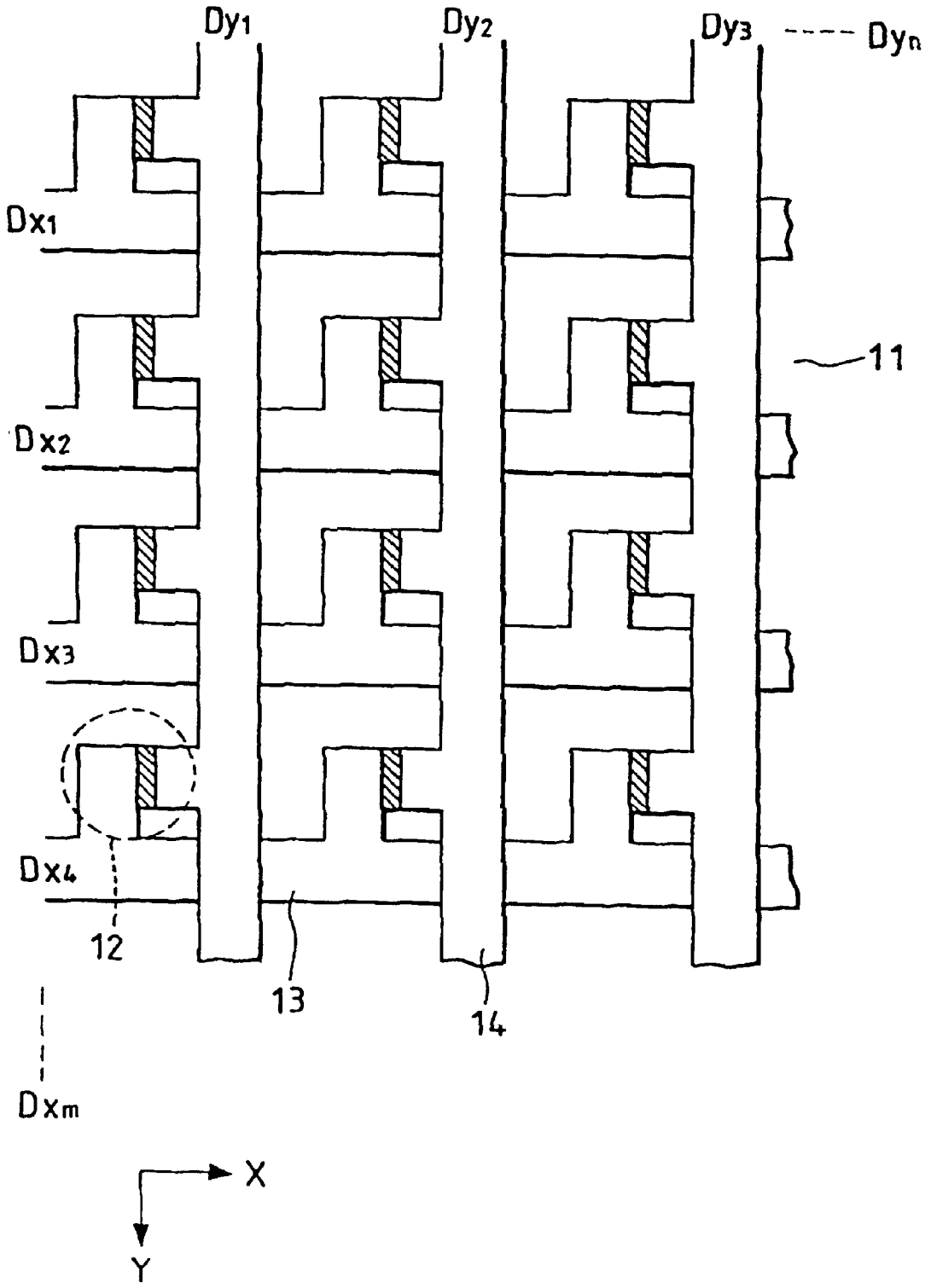
FIG. 27 is a schematic partial plan view of the electron source of the image forming apparatus of FIG. 25, showing a principal portion thereof.

FIG. 27 is a schematic partial plan view of a multiple electron beam source arranged on the substrate 11 of the display panel of FIG. 25.

The multiple electron beam source comprises a total of M row-directed wirings 13 and a total of N column-directed wirings 14 arranged on the insulating glass substrate 11 and electrically insulated from each other by means of an inter-layer insulation layer arranged at least at the crossings. At each crossing of a row-directed wiring 13 and a column-directed wiring 14, a surface conduction electron-emitting device 12 is provided between the wirings and electrically connected to them, said surface conduction electron-emitting device operating as a cold cathode device.

The row-directed wirings 13 and the column-directed wirings 14 are drawn to the outside of the envelope (airtightly sealed container) by way of external terminals Dx1 through Dxm and Dy1 through Dyn.

In each of the examples described below, a multiple electron beam source comprising a total of N×M (N=3,072, M=1,024) surface conduction electron-emitting devices, each having an electron-emitting region formed in an electroconductive film arranged between a pair of device electrodes, along with M row-directed wirings and N column-directed wirings arranged in the form of a matrix for connecting the devices was used as in the case of the above examples.

Firstly, a substrate 11' carrying thereon a total of N×M electroconductive films of fine particles along with M row-directed wirings and N column-directed wirings arranged in the form of a matrix for connecting the films was prepared by following the manufacturing steps illustrated in FIGS. 22A through 22H. Note that, however, a row-directed wiring 13, an interlayer insulation layer and a column-directed wiring 14 were laid in the above order from the bottom at each crossing of a row-directed wiring 13 and a column-directed wiring 14 in each of the following examples.

Example 2-1

In this example, a display panel comprising spacers 20 shown in FIG. 26 and described above was prepared in a manner as described below by referring to FIGS. 25 and 26.

A substrate 11' on which a plurality of electroconductive films for producing electron-emitting regions had been arranged and wired to form a matrix was secured to a rear plate. Then, a semiconductor thin film 20b of tin oxide was formed on four of the surfaces of the insulating member 20a of soda lime glass of each spacer 20 (height: 5 mm, thickness: 200 μm, length: 20 mm) that had been exposed to the inside of the envelope (airtightly sealed container) and the spacers 20 were secured on the substrate 11' on respective column-directed wirings 14 in parallel with the wirings 14 at regular intervals. Thereafter, a face plate 17 carrying a fluorescent film 18 and a metal back 19 on the inner surface thereof was arranged 5 mm above the substrate 11' with lateral walls 16 disposed therebetween and, subsequently, the rear plate 15, the face plate 17, the lateral walls 16 and the spacers 20 were secured relative to each other.

Note that the fluorescent film 18 of the display panel of FIGS. 25 and 26 is same as the one shown in FIG. 4A. Stripe-shaped fluorescent members 21a of red, green and blue and black electroconductive members 21b separating any adjacent fluorescent members 21a were made to extend along the Y-direction.

Frit glass (not shown) was then applied to the contact areas of the substrate 11' and the rear plate 15, the rear plate and the lateral walls 16 and the face plate 17 and the lateral walls 16 and baked at 400 to 500° C. in the ambient air for more than 10 minutes to hermetically seal the container.

The spacers 20 were bonded to the respective column-directed wirings 14 (width: 300 μm) on the substrate 11' and to the metal back 19 in the areas of the black electroconductive members 21b (width: 300 μm) on the side of the face plate 17 (FIG. 4A) by applying electroconductive frit glass (not shown) containing an electroconductive material such as metal and baking it at 400 to 500° C. in the ambient air for more than 10 minutes so that electric connection was established therebetween.

A deposit of tin oxide was formed to a thickness of 1,000 angstroms by ion plating, using an electron beam method, in an argon/oxygen atmosphere as a semiconductor thin film 20b on the soda lime glass made insulating member 20a of each spacer 20 that had been thoroughly cleansed. The electric resistance of the surface of the semiconductor thin film 20b was about $1\times10^{9}$ Ω/□.

For the above bonding operation, the rear plate 15, the face plate 17 and the spacers 20 were carefully aligned in order to ensure an accurate positional correspondence between the color fluorescent members 21 and the electroconductive films 4 for producing electron-emitting regions arranged on the substrate 11'.

The inside of the prepared envelope (airtightly sealed container) was then evacuated by way of an exhaust pipe (not shown) and a vacuum pump to a sufficient degree of vacuum and, thereafter, a voltage having a waveform as shown in FIG. 12 was applied to the electroconductive films for producing electron-emitting regions by way of the external terminals Dx1 through Dxm and Dy1 through Dyn to carry out an electrically energizing process (energization forming process) on the electroconductive films for producing electron-emitting regions. Consequently, electron-emitting regions were formed on the respective electroconductive films to produce a multiple electron beam source comprising surface conduction electron-emitting devices, or cold cathode devices, wired by a plurality of wirings arranged in the form of a matrix as shown in FIGS. 25 and 27.

Thereafter, when the inside of the envelope reached to a degree of vacuum of $10^{-6}$ Torr, the exhaust pipe (not shown) was sealed by heating and melting it with a gas burner to hermetically seal the envelope (airtightly sealed container).

Finally, the display panel was subjected to a getter operation in order to maintain the inside to a high degree of vacuum.

In order to drive the prepared image-display apparatus comprising a display panel as illustrated in FIGS. 25 and 26, scan signals and modulation signals were applied to the cold cathode devices (surface conduction electron-emitting devices) 12 to emit electrons from respective signal generation means by way of the external terminals Dx1 through Dxm and Dy1 through Dyn, while a high voltage was applied to the metal back 19 by way of the high voltage terminal Hv so that electrons emitted from the cold cathode devices were accelerated by the high voltage and collided with the fluorescent film 18 to cause the fluorescent members 21a (FIG. 4A) to excite to emit light and produce images. The voltage Va applied to the high voltage terminal Hv was from 3 kV to 10 kV, whereas the voltage Vf applied between the wirings 13 and 14 was 14V.

Under this condition, regularly arranged glowing spots were two-dimensionally formed at regular intervals on the display screen by electrons emitted from the cold cathode devices (surface conduction electron-emitting devices) 12 including those located near the spacers 20 to produce clear and sharp images on the screen. This proved that the spacers 20 did not give rise to any disturbances to the electric fields in the display apparatus that could adversely affect the trajectories of electrons.

Example 2-2

This examples differs from Example 2-1 only in that a deposit of tin oxide was formed to a thickness of 1,000 angstroms by ion plating, using an electron beam method, in an oxygen atmosphere as a semiconductor thin film 20b on each spacer 20 as shown in FIG. 26 in this example. The electric resistance of the surface of the semiconductor thin film 20b was about $1\times10^{12}$ Ω/□.

In order to drive the prepared image-display apparatus comprising a display panel, scan signals, and modulation signals were applied to the cold cathode devices (surface conduction electron-emitting devices) 12 to emit electrons from respective signal generation means by way of the external terminals Dx1 through Dxm and Dy1 through Dyn, while a high voltage was applied to the metal back 19 by way of the high voltage terminal Hv so that electrons emitted from the cold cathode devices were accelerated by the high voltage and collided with the fluorescent film 18 to cause the fluorescent members 21a (FIG. 4A) to excite to emit light and produce images. The voltage Va applied to the high voltage terminal Hv was from 3 kV to 10 kV, whereas the voltage Vf applied between the wirings 13 and 14 was 14V.

Under this condition, it was confirmed as a result of comparison with an image display apparatus comprising spacers without a semiconductor thin film 20b that the display panel was effectively protected against undesired electric charges as in the case of Example 2-1.

Example 2-3

This examples differs from Example 2-1 in that a deposit of tin oxide was formed to a thickness of 1,000 angstroms by ion plating, using an electron beam method, in an argon atmosphere as a semiconductor thin film 20b on each spacer 20 in this example. The electric resistance of the surface of the semiconductor thin film 20b was about $1\times10^{7}$ Ω/□. Besides, no metal back 19 was used and a transparent electrode of ITO film was arranged between the face plate 17 and the fluorescent film 18. Said ITO film provided electric connection between the black electroconductive members 21b (FIG. 4A) and the high voltage terminal Hv (FIG. 25). Otherwise, the display panel of this example was identical with that of Example 2-1.

In order to drive the prepared image-display apparatus comprising a display panel, scan signals and modulation signals were applied to the cold cathode devices (surface conduction electron-emitting devices) 12 to emit electrons from respective signal generation means by way of the external terminals Dx1 through Dxm and Dy1 through Dyn, while a high voltage was applied to the transparent electrode of ITO film by way of the high voltage terminal Hv so that electrons emitted from the cold cathode devices were accelerated by the high voltage and collided with the fluorescent film 18 to cause the fluorescent members 21a to excite to emit light and produce images. The voltage Va applied to the high voltage terminal Hv was less than 1 kV, whereas the voltage Vf applied between the wirings 13 and 14 was 14V.

Under this condition, regularly arranged glowing spots were two-dimensionally formed at regular intervals on the display screen by electrons emitted from the cold cathode devices 12 including those located near the spacers 20 to produce clear and sharp images on the screen. This proved that the spacers 20 did not give rise to any disturbances to the electric fields in the display apparatus that could adversely affect the trajectories of electrons.

Example 2-4

This example differs from Example 2-1 in that a deposit of tin oxide containing a dopant was formed to a thickness of 1,000 angstroms by ion plating, using an electron beam method, as a semiconductor thin film 20b on each spacer 20 in this example. The electric resistance of the surface of the semiconductor thin film 20b was about $1\times10^5$ Ω/□. Besides, no metal back 19 was used and a transparent electrode of ITO film was arranged between the face plate 17 and the fluorescent film 18. Said ITO film provided electric connection between the black electroconductive members 21b (FIG. 4A) and the high voltage terminal Hv (FIG. 25). The height of the spacers 20 and the distance between the substrate 11' and the face plate 17 were 1 mm. Otherwise, the display panel of this example was identical with that of Example 2-1.

In order to drive the prepared image-display apparatus comprising a display panel, scan signals and modulation signals were applied to the cold cathode devices (surface conduction electron-emitting devices) 12 to emit electrons from respective signal generation means by way of the external terminals Dx1 through Dxm and Dy1 through Dyn, while a high voltage was applied to the transparent electrode of ITO film by way of the high voltage terminal Hv so that electrons emitted from the cold cathode devices were accelerated by the high voltage and collided with the fluorescent film 18 to cause the fluorescent members 21a (FIG. 4A) to excite to emit light and produce images. The voltage Va applied to the high voltage terminal Hv was from 10V to 10V, whereas the voltage Vf applied between the wirings 13 and 14 was 14V.

Under this condition, regularly arranged glowing spots were two-dimensionally formed at regular intervals on the display screen by electrons emitted from the cold cathode devices 12 including those located near the spacers 20 to produce clear and sharp images on the screen. This proved that the spacers 20 did not give rise to any disturbances to the electric fields in the display apparatus that could adversely affect the trajectories of electrons.

As seen from the above description, the image display apparatuses of Examples 2-1 through 2-4 have the following effects.

Firstly, since electric charges that have to be removed appear only on the surface of the spacers 20, the spacers 20 are required only to prevent electric charges from appearing on the surface. In the above examples, a semiconductor thin film 20b was formed on the insulating member 20a of each spacer 20 so that the spacer 20 showed a sufficiently low electric resistance on the surface that could neutralize any electric charge that might appear on the surface and a flow rate of leak current that did not significantly raise the power consumption level of the apparatus. In short, flat type image forming apparatuses having a large display screen were realized without adversely affecting the advantage of cold cathode devices or surface conduction electron-emitting devices of a very low heat generation rate.

Secondly, since the spacers 20 had an evenly flat cross section relative to the normal of the substrate 11 and the face plate 17 shown in FIGS. 1 and 2, they did not disturb any electric fields within the apparatus. Thus, unless the spacers 20 blocked the trajectories of electrons from the cold cathode devices 12, they could be placed close to the cold cathode devices 12 and therefore the latter could be arranged densely along the X-direction that was perpendicular relative to the spacers 20. Additionally, since any leak currents did not flow through the insulating member 20a that occupied most of the cross section of each spacer 20, small leak currents, if any, could be effectively suppressed without any additional arrangements such as using pointed spacers 20 to be bonded to the substrate 11 or the face plate 17.

Secondly, since the spacers 20 were column-shaped and had an evenly flat cross section relative to the normal of the substrate 11 and the face plate 17, they did not disturb any electric fields within the apertures. Thus, unless the spacers 20 blocked the trajectories of electrons from the cold cathode devices (surface conduction electron-emitting devices) 12, they could be placed close to the cold cathode devices 12 and therefore the latter could be arranged densely along the Y-direction that was perpendicular relative to the spacers 20. Additionally, since any leak currents did not flow through the insulating member 20a that occupied most of the cross section of each spacer 20, small leak currents, if any, could be effectively suppressed without any additional arrangements such as using pointed spacers 20 to be bonded to the substrate 11 or the face plate 17.

Further, since the fluorescent film 18 used was of the type shown in FIG. 4A having fluorescent members of each color (R, G and B) in a stripe pattern and a black conductive member also in a stripe pattern between each fluorescent member, the luminosity of displayed images was not damaged even when the cold cathode devices 12 ware arranged densely in the Y-direction.

Still additionally, since each of the spacers 20 were electrically connected to a single column-directed wiring 14 on the substrate 11, any entangled and/or unnecessary electric connections were avoided among the wirings on the substrate 11.

Finally, by using above described spacer 20 provided with a desired semiconductor thin film 20b and requiring no complicated additional structure as described above in an image display apparatus comprising a multiple electron beam source formed by arranging and wiring surface conduction electron-emitting devices to form a simple matrix proposed by the inventors of the present invention, a very flat image display apparatus having a large display screen was realized.

Now, the present invention will be described further by way of another example.

Figure 28:
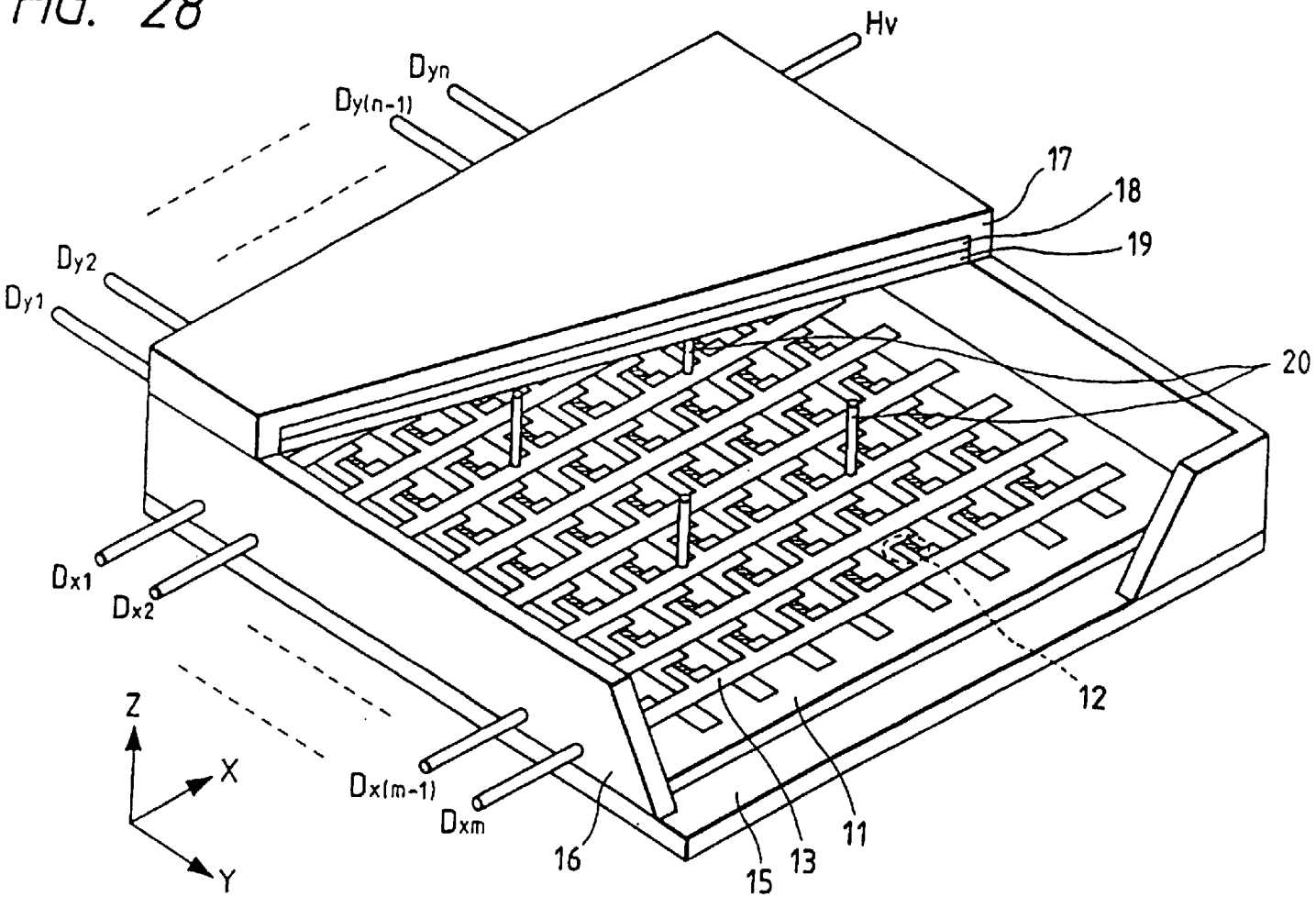
FIG. 28 is a partially broken schematic perspective view of still another image forming apparatus according to the invention.

FIG. 28 is a partially broken schematic perspective view of a display panel used in the image display apparatus of the following example.

Note that the display panel of FIG. 28 is the same as those described above except that the spacers 20 are column-shaped.

Referring to FIG. 28, a plurality of surface conduction electron-emitting devices 12 are arranged and wired to show a matrix on a substrate 11, which is by turn rigidly secured to a rear plate 15. A face plate 17 carries on the inner surface thereof a fluorescent film 18 and a metal back 19 that operates as an accelerating electrode. Said face plate 17 and said substrate 11 are disposed vis-a-vis with lateral walls 16 made of an insulating material arranged therebetween. A high voltage is applied between the substrate 11 and the metal back 19 by means of a power source (not shown). The rear plate 15, the lateral walls 16 and the face plate 17 are bonded together by means of frit glass to produce an envelope (airtightly sealed container).

Column-shaped spacers 20 are arranged within the envelope (airtightly sealed container) to make it withstand the atmospheric pressure. As in the case of the above example, each spacer 20 comprises an insulating member 20a coated with a semiconductor thin film 20b. A number of spacers 20 necessary to make the envelope withstand the atmospheric pressure are arranged with required intervals and bonded to the metal back 19 on the inner surface of the face plate 17 and the row-directed wirings 13 on the substrate 11 by means of frit glass. The semiconductor thin film 20b of each spacer 20 is electrically connected to the metal back 19 on the inner surface of the face plate 17 and the corresponding row-directed wiring 13 on the substrate 11.

Otherwise the display panel is same as those of Examples 1-1 through 1-4 and hence it will not be described any further.

Firstly, a substrate 11' carrying thereon a total of N×M electroconductive films of fine particles along with M row-directed wirings and N column-directed wiring arranged in the form of a matrix for connecting the films was prepared by following the above described manufacturing steps (FIGS. 22A through 22H).

Example 3

In this example, a display panel comprising spacers 20 shown in FIG. 28 and described above was prepared.

A substrate 11 on which a plurality of electroconductive films for producing electron-emitting regions had been arranged and wired to form a matrix was secured to a rear plate 15. Then, a semiconductor thin film 20b of tin oxide was formed on the surfaces of the insulating member 20a of soda lime glass of each column-shaped spacer 20 (height: 5 mm, diameter: 100 μm) that had been exposed to the inside of the envelope (airtightly sealed container) and the spacers 20 were secured on the substrate 11' on respective row-directed wirings 13 at regular intervals. Thereafter, a face plate 17 carrying a fluorescent film 18 and a metal back 19 on the inner surface thereof was arranged 5 mm above the substrate 11' with lateral walls 16 disposed therebetween and, subsequently, the rear plate 15, the face plate 17, the lateral walls 16 and the spacers 20 were secured relative to each other.

Frit glass (not shown) was then applied to the contact areas of the substrate 11' and the rear plate 15, the rear plate and the lateral walls 16 and the face plate 17 and the lateral walls 16 and baked at 400 to 500° C. in the ambient air for more than 10 minutes to hermetically seal the container.

The spacers 20 were bonded to the respective row-directed wirings 13 (width: 300 μm) on the substrate 11' and to the metal back 19 in the areas of the black electroconductive members 21b (width: 300 μm) on the side of the face plate 17 by applying electroconductive frit glass (not shown) containing an electroconductive material such as metal and baking it at 400 to 500° C. in the ambient air for more than 10 minutes so that electric connection was established therebetween.

A deposit of tin oxide was formed to a thickness of 1,000 angstroms by ion plating, using an electron beam method, in an argon/oxygen atmosphere as a semiconductor thin film 20b on the soda lime glass made insulating member 20a of each spacer 20 that had been thoroughly cleansed. The electric resistance of the surface of the semiconductor thin film 20b was about $1\times10^9$ Ω/□.

For the above bonding operation, the rear plate 15, the face plate 17 and the spacers 20 were carefully aligned in order to ensure an accurate positional correspondence between the color fluorescent members 21 and the electroconductive films 4 for producing electron-emitting regions arranged on the substrate 11'.

The inside of the prepared envelope (airtightly sealed container) was then evacuated by way of an exhaust pipe (not shown) and a vacuum pump to a sufficient degree of vacuum and, thereafter, a voltage having a waveform as shown in FIG. 12 was applied to the electroconductive films for producing electron-emitting regions by way of the external terminals Dx1 through Dxm and Dy1 through Dyn to carry out an electrically energizing process (energization forming process) on the electroconductive films for producing electron-emitting regions. Consequently, electron-emitting regions were formed on the respective electroconductive films to produce a multiple electron beam source comprising surface conduction electron-emitting devices, or cold cathode devices, wired by a plurality of wirings arranged in the form of a matrix as shown in FIGS. 28 and 3.

Thereafter, when the inside of the envelope reached to a degree of vacuum of $10^{-6}$ Torr, the exhaust pipe (not shown) was sealed by heating and melting it with a gas burner to hermetically seal the envelope (airtightly sealed container).

Finally, the display panel was subjected to a getter operation in order to maintain the inside to a high degree of vacuum.

In order to drive the prepared image-display apparatus comprising a display panel as illustrated in FIG. 28, scan signals and modulation signals were applied to the cold cathode devices (surface conduction electron-emitting devices) 12 to emit electrons from respective signal generation means by way of the external terminals Dx1 through Dxm and Dy1 through Dyn, while a high voltage was applied to the metal back 19 by way of the high voltage terminal Hv so that electrons emitted from the cold cathode devices were accelerated by the high voltage and collided with the fluorescent film 18 to cause the fluorescent members 21a to excite to emit light and produce images. The voltage Va applied to the high voltage terminal Hv was from 3 kV to 10 kV, whereas the voltage Vf applied between the wirings 13 and 14 was 14V.

Under this condition, regularly arranged glowing spots were two-dimensionally formed at regular intervals on the display screen by electrons emitted from the cold cathode devices (surface conduction electron-emitting devices) 12 including those located near the spacers 20 to produce clear and sharp images on the screen. This proved that the spacers 20 did not give rise to any disturbances to the electric fields in the display apparatus that could adversely affect the trajectories of electrons.

As seen from the above description, the image display apparatus of Example 3 has the following effects.

Firstly, since electric charges that have to be removed appear only on the surface of the spacers 20, the spacers 20 are required only to prevent electric charges from appearing on the surface. In the above examples, a semiconductor thin film 20b was formed on the insulating member 20a of each spacer 20 so that the spacer 20 showed a sufficiently low electric resistance on the surface that could neutralize any electric charge that might appear on the surface and a flow rate of leak current that did not significantly raise the power consumption level of the apparatus. In short, flat type image forming apparatuses having a large display screen were realized without adversely affecting the advantage of cold cathode devices or surface conduction electron-emitting devices of a very low heat generation rate.

Secondly, since the spacers 20 was column-shaped and had an evenly flat cross section relative to the normal of the substrate 11 and the face plate 17, they did not disturb any electric fields within the apparatus. Thus, unless the spacers 20 blocked the trajectories of electrons from the cold cathode devices (surface conduction electron-emitting devices) 12, they could be placed close to the cold cathode devices 12 and therefore the latter could be arranged densely along the X-direction and the Y-direction. Additionally, since any leak currents did not flow through the insulating member 20a that occupied most of the cross section of each spacer 20, small leak currents, if any, could be effectively suppressed without any additional arrangements such as using pointed spacers 20 to be bonded to the substrate 11 or the face plate 17.

Additionally, since each of the spacers 20 were electrically connected to a single row-directed wiring 13 on the substrate 11, any entangled and/or unnecessary electric connections were avoided among the wirings on the substrate 11.

Finally, by using spacer 20 provided with a desired semiconductor thin film 20b and requiring no complicated additional structure as described above in an image display apparatus comprising a multiple electron beam source formed by arranging and wiring surface conduction electron-emitting devices to form a simple matrix proposed by the inventors of the present invention, a very flat image display apparatus having a large display screen was realized.

The following example differs from the above examples in that the lateral walls 16 were arranged as close as possible relative to the surface conduction electron-emitting devices 12 and a semiconductor thin film 16b was formed on the inner surface of the lateral walls 16.

Figure 29:
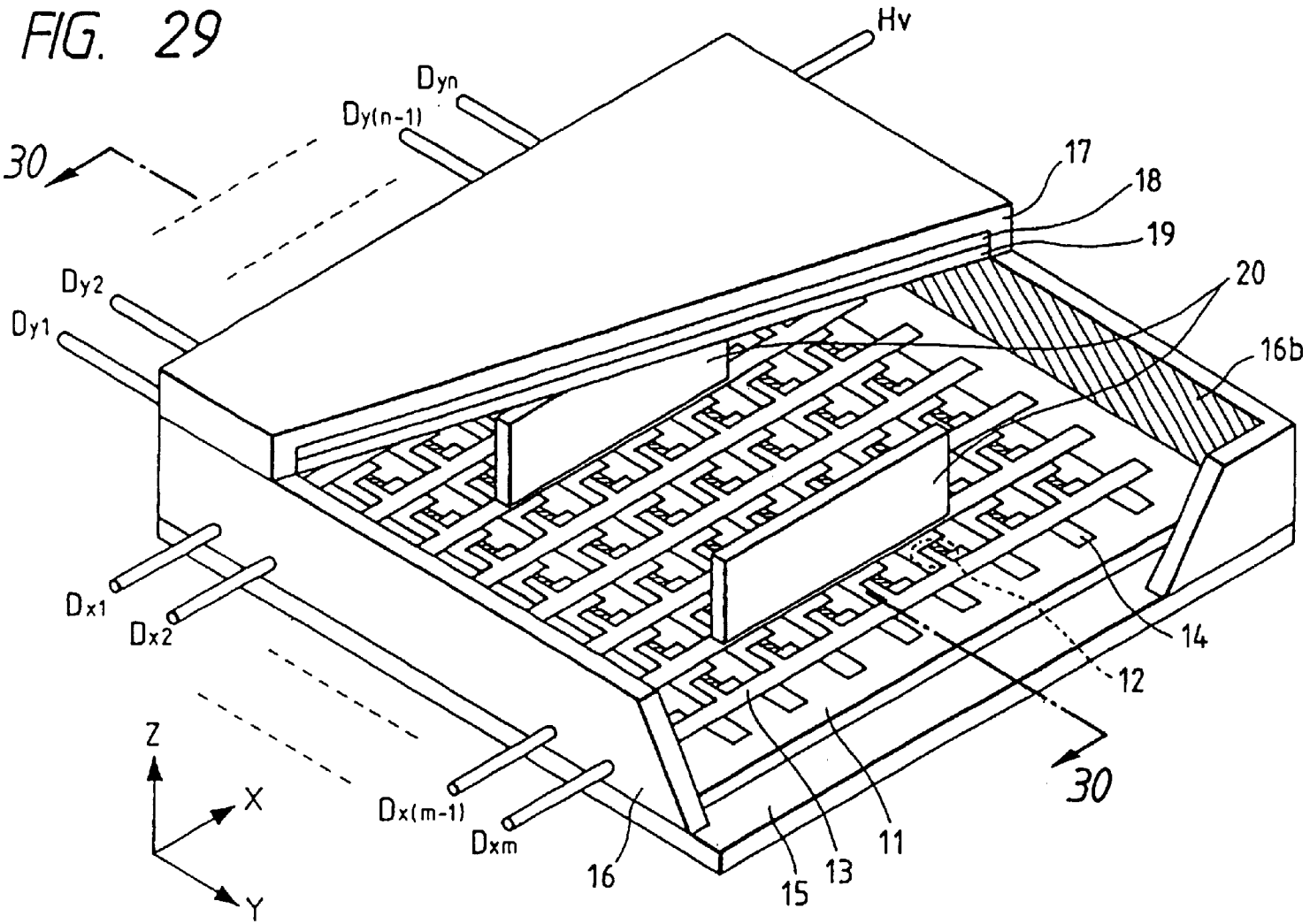
FIG. 29 is a partially broken schematic perspective view of still another image forming apparatus according to the invention.
Figure 30:
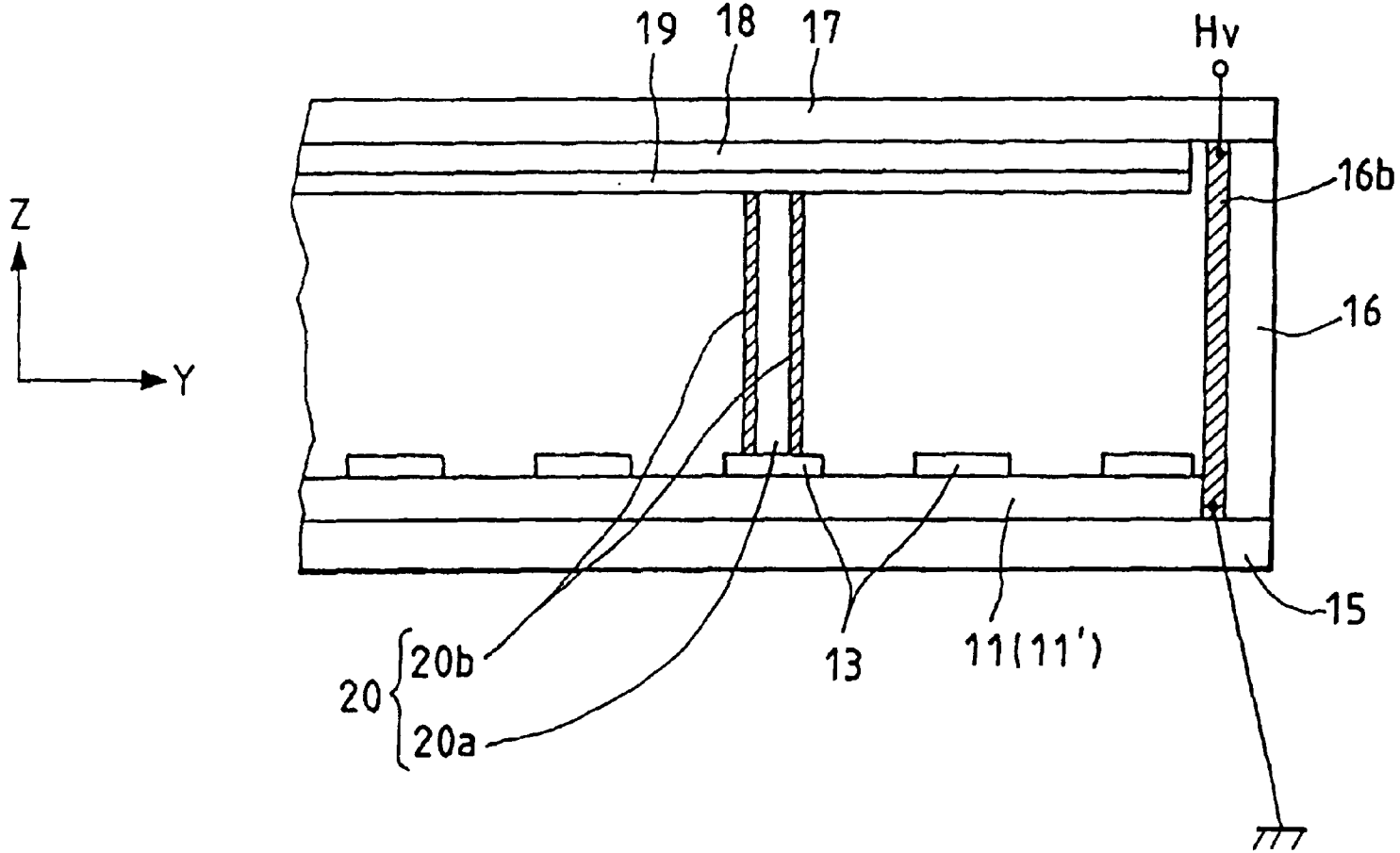
FIG. 30 is a schematic cross sectional view showing part of the image forming apparatus of FIG. 29 taken along line 30-30 to illustrate a spacer and its vicinity.

FIG. 29 is a partially broken schematic perspective view of a display panel used in the image display apparatus of the following example and FIG. 30 is a schematic cross sectional view showing part of the image forming apparatus of FIG. 29 taken along line 30-30 to illustrate a spacer and its vicinity.

Referring to FIGS. 29 and 30, a plurality of surface conduction electron-emitting devices 12 are arranged and wired to show a matrix on a substrate 11, which is by turn rigidly secured to a rear plate 15. A face plate 17 carries on the inner surface thereof a fluorescent film 18 and a metal back 19 that operates as an accelerating electrode. Said face plate 17 and said substrate 11 are disposed vis-a-vis with lateral walls 16 made of an insulating material arranged therebetween. A high voltage is applied between the substrate 11 and the metal back 19 by means of a power source (not shown). The rear plate 15, the lateral walls 16 and the face plate 17 are bonded together by means of frit glass to produce an envelope (airtightly sealed container). Thin and flat spacers 20 are arranged within the envelope (airtightly sealed container) to make it withstand the atmospheric pressure.

Each spacer 20 comprises an insulating member 20a coated with a semiconductor thin film 20b. A number of spacers 20 necessary to make the envelope withstand the atmospheric pressure are arranged with required intervals in parallel with the X-direction and bonded to the metal back 19 on the inner surface of the face plate 17 and the row-directed wirings 13 on the substrate 11 by means of frit glass. The semiconductor thin film 20b of each spacer 20 is electrically connected to the metal back 19 on the inner surface of the face plate 17 and the corresponding row-directed wiring 13 on the substrate 11.

Each of the lateral walls 16 is prepared by forming a semiconductor thin film 16b on the inner surface of an insulating member and the semiconductor thin film 16b is electrically connected to the drawn-out electrode (not shown) arranged on the inner surface of the rear plate 15 and the drawn-out wirings connected to the electrode Hv arranged on the face plate 17.

Otherwise, the apparatus is same as those of the above examples and hence it will not be described any further.

In the example described below, a multiple electron beam source comprising a total of N×M (N=3,072, M=1,024) surface conduction electron-emitting devices, each having an electron-emitting region formed in an electroconductive film arranged between a pair of device electrodes, along with M row-directed wirings and N column-directed wirings arranged in the form of a matrix for connecting the devices was used as in the case of the above examples.

Firstly, a substrate 11' carrying thereon a total of N×M electroconductive films of fine particles along with M row-directed wirings and N column-directed wiring arranged in the form of a matrix for connecting the films was prepared by following the manufacturing steps illustrated in FIGS. 22A through 22H.

Example 4

In this example, a display panel provided with a number of spacers and semiconductor thin films 16b arranged as shown in FIG. 30 was prepared. This example will be described by referring to FIGS. 29 and 30. A substrate 11 on which a plurality of electroconductive films for producing electron-emitting regions had been arranged and wired to form a matrix was secured to a rear plate. Then, a semiconductor thin film 20b of tin oxide was formed on four of the surfaces of the insulating member 20a of soda lime glass of each spacer 20 (height: 5 mm, thickness: 200 μm, length: 20 mm) that had been exposed to the inside of the envelope (airtightly sealed container) and the spacers 20 were secured on the substrate 11' on respective row-directed wirings 13 in parallel with the wirings 13 at regular intervals. Thereafter, a face plate 17 carrying a fluorescent film 18 and a metal back 19 on the inner surface thereof was arranged 5 mm above the substrate 11' with lateral walls 16 disposed therebetween and, subsequently, the rear plate 15, the face plate 17, the lateral walls 16 and the spacers 20 were secured relative to each other. The lateral walls 16 were placed as close as possible relative to the electroconductive films for producing electron-emitting regions on the substrate 11' and the fluorescent film 18 on the face plate 17, although they did not block the trajectories of electrons emitted from the cold cathode devices 12.

Frit glass (not shown) was then applied to the contact areas of the substrate 11' and the rear plate 15, the rear plate and the lateral walls 16 and the face plate 17 and the lateral walls 16 and baked at 400 to 500° C. in the ambient air for more than 10 minutes to hermetically seal the container.

The spacers 20 were bonded to the respective row-directed wirings 13 (width: 300 μm) on the substrate 11' and to the metal back 19 on the side of the face plate 17 by applying electroconductive frit glass (not shown) containing an electroconductive material such as metal and baking it at 400 to 500° C. in the ambient air for more than 10 minutes so that electric connection was established therebetween.

Frit glass containing an electroconductive material such as metal (not shown) was also applied to the contact areas of the rear plate 15 and the lateral walls 16 and the face plate 17 and the lateral walls 16 and baked at 400 to 500° C. in the ambient air for more than 10 minutes to hermetically seal the container. The semiconductor thin films 16b of the lateral walls 16 were grounded on the side of the rear plate 15 and electrically connected to the high voltage terminal Hv on the side of the face plate 17.

A deposit of tin oxide was formed to a thickness of 1,000 angstroms by ion plating, using an electron beam method, in an argon/oxygen atmosphere as a semiconductor thin film 20b on the soda lime glass made insulating member 20a of each spacer 20 that had been thoroughly cleansed. The electric resistance of the surface of the semiconductor thin film 20b was about $1\times10^9$ Ω/□.

Also, a deposit of tin oxide was formed to a thickness of 1,000 angstroms by ion plating, using an electron beam method, in an argon/oxygen atmosphere as a semiconductor thin film 16b on the inner surface of the soda lime glass made insulating member of each lateral wall 16 that had been thoroughly cleansed. The electric resistance of the surface of the semiconductor thin film 16b was about $1\times10^9$ Ω/□.

Figure 24:
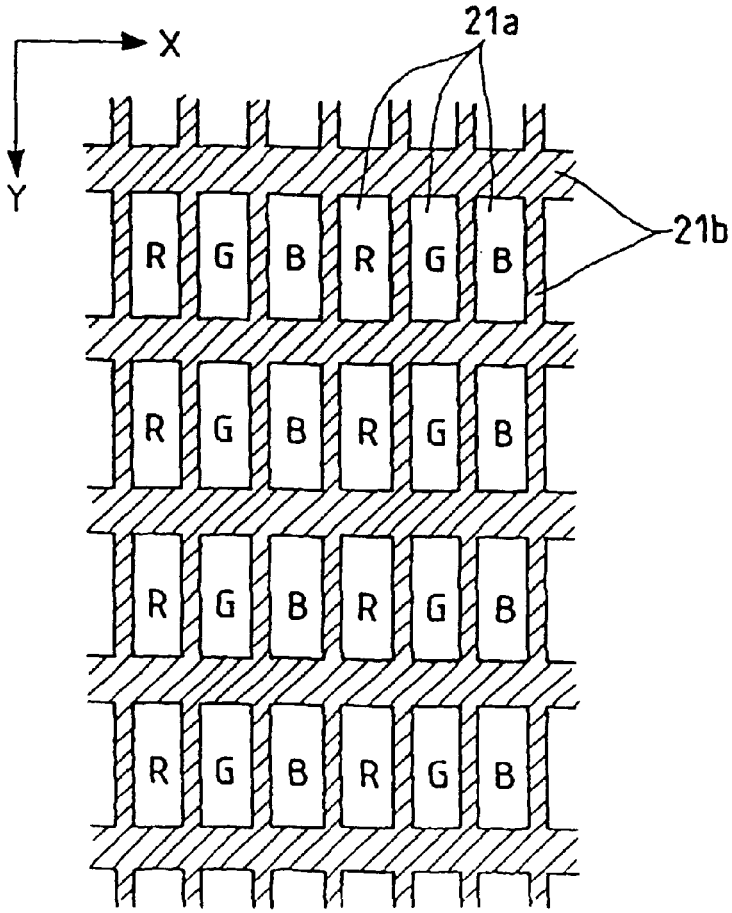
FIG. 24 is a schematic partial plan view of a fluorescent film that can be used for the purpose of the invention.

As shown in FIG. 24, the fluorescent film 18 that operated as an image forming member comprised stripe-shaped fluorescent members 21a of red, green and blue extending along the Y-direction and black electroconductive members 21b separating any adjacent fluorescent members and pixels arranged in the Y-direction. The spacers 20 were located within the width (300 μm) of the respective black electroconductive members 21b with the metal back 19 disposed therebetween.

For the above bonding operation, the rear plate 15, the face plate 17 and the spacers 20 were carefully aligned in order to ensure an accurate positional correspondence between the color fluorescent members 21 and the electroconductive films 4 (FIG. 22H) for producing electron-emitting regions arranged on the substrate 11'.

The inside of the prepared envelope (airtightly sealed container) was then evacuated by way of an exhaust pipe and a vacuum pump to a sufficient degree of vacuum and, thereafter, a voltage having a waveform as shown in FIG. 12 was applied to the electroconductive films 4 for producing electron-emitting regions by way of the external terminals Dx1 through Dxm and Dy1 through Dyn to carry out an electrically energizing process (energization forming process) on the electroconductive films 4 for producing electron-emitting regions. Consequently, electron-emitting regions were formed on the respective electroconductive films 4 to produce a multiple electron beam source comprising surface conduction electron-emitting devices, or cold cathode devices, wired by a plurality of wirings arranged in the form of a matrix as shown in FIG. 29.

Thereafter, when the inside of the envelope reached to a degree of vacuum of $10^{-6}$ Torr, the exhaust pipe (not shown) was sealed by heating and melting it with a gas burner to hermetically seal the envelope (airtightly sealed container).

Finally, the display panel was subjected to a getter operation in order to maintain the inside to a high degree of vacuum.

In order to drive the prepared image-display apparatus comprising a display panel as illustrated in FIGS. 29 and 30, scan signals and modulation signals were applied to the cold cathode devices (surface conduction electron-emitting devices) 12 to emit electrons from respective signal generation means by way of the external terminals Dx1 through Dxm and Dy1 through Dyn, while a high voltage was applied to the metal back 19 by way of the high voltage terminal Hv so that electrons emitted from the cold cathode devices were accelerated by the high voltage and collided with the fluorescent film 18 to cause the fluorescent members 21a of red, green and blue (FIG. 24) to excite to emit light and produce images. The voltage Va applied to the high voltage terminal Hv was from 3 kV to 10 kV, whereas the voltage Vf applied between the wirings 13 and 14 was 14V.

Under this condition, regularly arranged glowing spots were two-dimensionally formed at regular intervals on the display screen by electrons emitted from the cold cathode devices 12 including those located near the spacers 20 and lateral walls 16 to produce clear and sharp images on the screen. This proved that the spacers 20 and lateral walls 16 did not give rise to any disturbances to the electric fields in the display apparatus that could adversely affect the trajectories of electrons, even they were placed close to the cold cathode devices 12.

The above described image display apparatus of Example 4 have the following effects in addition to those described earlier by referring to the preceding examples.

Firstly, since electric charges that have to be removed appear only on the surface of the lateral walls 16 located close to the cold cathode devices 12 on the substrate 11', the lateral walls 16 are required only to prevent electric charges from appearing on the surface. In the above examples, a semiconductor thin film 16b was formed on the insulating member of each lateral walls 16 so that the lateral walls 16 showed a sufficiently low electric resistance on the surface that could neutralize any electric charge that might appear on the surface and a flow rate of leak current that did not significantly raise the power consumption level of the apparatus. In short, flat type image forming apparatuses having a large display screen were realized without adversely affecting the advantage of cold cathode devices or surface conduction electron-emitting devices of a very low heat generation rate.

Secondly, with the above arrangement, the entire image display apparatus can be down-sized because the peripheral areas of the image display apparatus can be reduced.

Now, the present invention will be described further by way of other examples.

Figure 31:
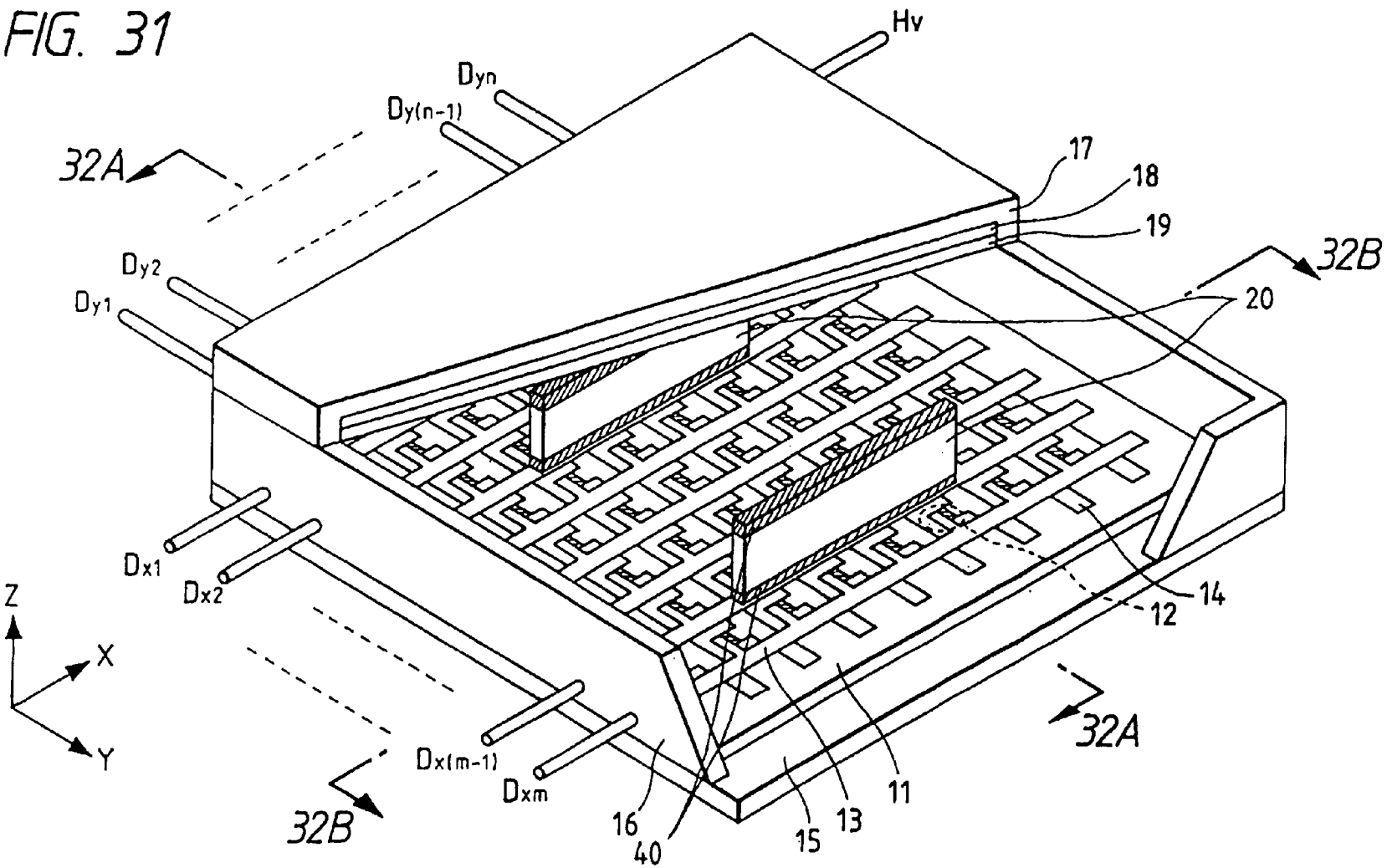
FIG. 31 is a partially broken schematic perspective view of still another image forming apparatus according to the invention.

FIG. 31 is a partially broken schematic perspective view of a display panel used in the image display apparatus of the following example.

Note that the display panel of FIG. 31 differs from those of the preceding examples in that an abutting member 40 is additionally arranged in each of the contact areas between the spacers 20 and the components (e.g., the row-directed wirings 13) on the side of the substrate 11 and between the spacers 20 and the components on the side of the face plate 17 (e.g., the metal back 19) in order to improve the mechanical holding and electric contact.

Referring to FIG. 31, a plurality of cold cathode devices (surface conduction electron-emitting devices) 12 are arranged and wired to show a matrix on a substrate 11, which is by turn rigidly secured to a rear plate 15. A face plate 17 carries on the inner surface thereof a fluorescent film 18 and a metal back 19 that operates as an accelerating electrode. Said face plate 17 and said substrate 11 are disposed vis-a-vis with lateral walls 16 made of an insulating material arranged therebetween. A high voltage is applied between the substrate 11 and the metal back 19 by means of a power source (not shown). The rear plate 15, the lateral walls 16 and the face plate 17 are bonded together by means of frit glass to produce an envelope (airtightly sealed container).

Flat spacers 20 are arranged within the envelope (airtightly sealed container) to make it withstand the atmospheric pressure. Each spacer 20 comprises an insulating member 20a coated with a semiconductor thin film 20b and electroconductive thin films (to be referred to as spacer electrodes hereinafter) 20c on the surface areas that are placed vis-a-vis the substrate 11 and the face plate 17 respectively (FIG. 7C). A number of spacers 20 necessary to make the envelope withstand the atmospheric pressure are arranged with required intervals in parallel with the X-direction and bonded to the metal back 19 on the inner surface of the face plate 17 and the row-directed wirings 13 on the substrate 11 by means of frit glass. The semiconductor thin film 20b and the corresponding spacer electrodes 20c of each spacer are electrically well connected.

Each of the spacers 20 is rigidly secured to the surface of the metal back 19 on the inner surface of the face plate 17 and that of the corresponding row-directed wiring 13 on the substrate 11 with respective abutting members 40 disposed therebetween. The semiconductor thin film 20b on the surface of each spacer 20 is electrically connected to the metal back 19 on the inner surface of the face plate 17 and the corresponding row-directed wiring 13 on the substrate 11 by way of the respective abutting members 40.

In each of the examples described below, a multiple electron beam source comprising a total of N×M (N=3,072, M=1,024) surface conduction electron-emitting devices, each having an electron-emitting region formed in an electroconductive film arranged between a pair of device electrodes, along with M row-directed wirings and N column-directed wirings arranged in the form of a matrix for connecting the devices was used as in the case of the above examples.

The multiple electron beam source used in the following example was prepared exactly as those of the preceding examples and therefore it will not be described any further.

Example 5-1

Figure 32A:
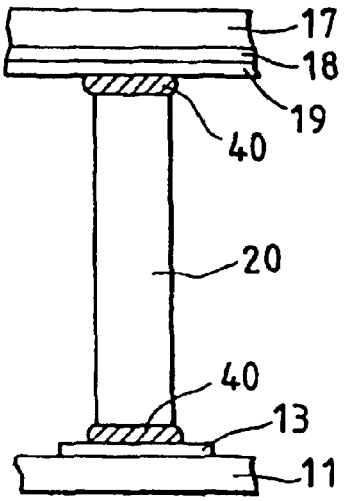
FIGS. 32A, 32B, 33A, 33B, 34A and 34B are schematic cross sectional views showing part of the image forming apparatus of FIG. 31 taken along lines (32A, 33A, 34A)-(32A, 33A, 34A) and (32B, 33B, 34B)-(32B, 33B, 34B) respectively.
Figure 32B:
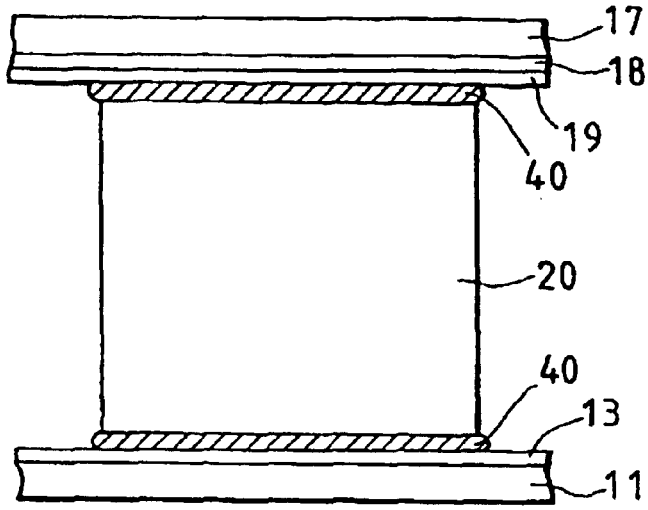

In this example, abutting members 40 that operated for both mechanical securing and electric connection and had a configuration as shown in FIG. 31 were used. Each of the spacers 20 used in this example comprised an insulating member 20a as shown in FIG. 7C, a semiconductor film 20b and spacer electrodes 20c. FIGS. 32A and 32B are schematic cross sectional views showing part of the image-display apparatus of FIG. 31 taken along lines 32A-32A and 32B-32B respectively.

Each of the spacers 20 (FIG. 7C) was prepared in a manner as described below. Firstly, a deposit of tin oxide was formed to a thickness of 1,000 angstroms by ion plating, using an electron beam method, in an argon/oxygen atmosphere as a semiconductor thin film 20b on the soda lime glass made insulating member 20a of the spacer 20 that had been thoroughly cleansed. The electric resistance of the surface of the semiconductor thin film 20b was about $1\times10^9$ Ω/□. Thereafter, Ti and Au films were sequentially formed thereon to respective thicknesses of 20 angstroms and 1,000 angstroms to produce spacer electrodes 20c. Electric connection between the semiconductor thin film 20b and the spacer electrodes 20c was also established in the above process.

An airtightly sealed container was prepared, following the steps described below.

Firstly, the spacers 20 (height: 5 mm, thickness: 200 μm, length: 20 mm) were bonded onto the metal back 19 on the face plate 17 by applying electroconductive frit glass 40 containing an electroconductive material such as metal to the contact areas thereof and baking it at 400 to 500° C. in the ambient air for more than 10 minutes. Thus, the spacers 20 were mechanically secured and electrically connected to the metal back 19.

Note that the fluorescent film 18 of the display panel of FIG. 3 is same as the one shown in FIG. 4A and the spacers 20 were placed on the stripe-shaped black electroconductive members 21b (width: 300 μm) of the fluorescent film with the metal back 19 disposed therebetween.

Frit glass (not shown) was then applied to the contact areas of the substrate 11 and the rear plate 15, the rear plate and the lateral walls 16 and the face plate 17 and the lateral walls 16 and baked at 400 to 500° C. in the ambient air for more than 10 minutes to hermetically seal the container. The spacers 20 were bonded to the respective row-directed wirings 13 (width: 300 μm) on the substrate 11 by applying electroconductive frit glass 40 containing an electroconductive material such as metal and baking it at 400 to 500° C. in the ambient air for more than 10 minutes so that electric connection was established therebetween.

For the above bonding operation, the substrate 11, the rear plate 15, the face plate 17 and the spacers 20 were carefully aligned in order to ensure an accurate positional correspondence between the color fluorescent members 21a (FIG. 4A) and cold cathode devices (surface conduction electron-emitting devices) 12.

The airtightly sealed container prepared in a manner as described above was then subjected to a series of processing steps of evacuation, energization forming, energization activation, sealing and getter operation as in the case of the preceding examples.

In order to drive the prepared image-display apparatus comprising a display panel as illustrated in FIGS. 31, 32, scan signals and modulation signals were applied to the cold cathode devices (surface conduction electron-emitting devices) 12 to emit electrons from respective signal generation means by way of the external terminals Dx1 through Dxm and Dy1 through Dyn, while a high voltage was applied to the metal back 19 by way of the high voltage terminal Hv so that electrons emitted from the cold cathode devices were accelerated by the high voltage and collided with the fluorescent film 18 to cause the fluorescent members 21a to excite to emit light and produce images. The voltage Va applied to the high voltage terminal Hv was from 3 kV to 10 kV, whereas the voltage Vf applied between the wirings 13 and 14 was 14V.

Under this condition, regularly arranged glowing spots were two-dimensionally formed at regular intervals on the display screen by electrons emitted from the cold cathode devices (surface conduction electron-emitting devices) 12 including those located near the spacers 20 to produce clear and sharp images on the screen. This proved that the spacers 20 did not give rise to any disturbances to the electric fields in the display apparatus that could adversely affect the trajectories of electrons.

Example 5-2

This examples differs from Example 5-1 in that each of the abutting members 40 comprised a mechanical securing section 40a and an electric connecting section 40b that were independent from each other.

Figure 33A:
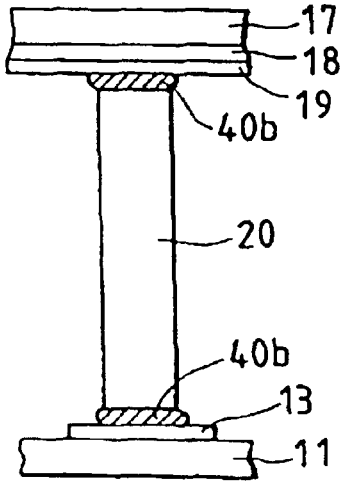
Figure 33B:
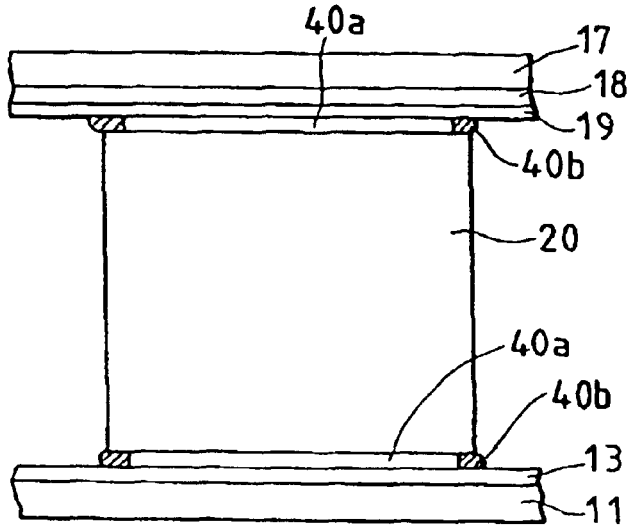

FIGS. 33A and 33B are schematic cross sectional views showing part of the image forming apparatus of FIG. 31 taken along lines 33A-33A and 33B-33B respectively.

Each of the spacers 20 (FIG. 7C) was prepared in a manner as described below. Firstly, a deposit of tin oxide was formed to a thickness of 1,000 angstroms by ion plating, using an electron beam method, in an argon/oxygen atmosphere as a semiconductor thin film 20b on the soda lime glass made insulating member 20a of the spacer 20 that had been thoroughly cleansed. The electric resistance of the surface of the semiconductor thin film 20b was about $1\times10^9$ Ω/□. Thereafter, Ti and Au films were sequentially formed thereon to respective thicknesses of 20 angstroms and 1,000 angstroms to produce spacer electrodes 20c. Electric connection between the semiconductor thin film 20b and the spacer electrodes 20c was also established in the above process.

An airtightly sealed container was prepared, following the steps described below.

Firstly, the spacers 20 (height: 5 mm, thickness: 200 μm, length: 20 mm) were bonded onto the metal back 19 on the face plate 17 by applying electroconductive frit glass containing an electroconductive material such as metal to the contact areas thereof and baking it at 400 to 500° C. in the ambient air for more than 10 minutes. Thus, the spacers 20 were mechanically secured and electrically connected to the metal back 19.

Note that the fluorescent film 18 of the display panel of FIG. 31 is same as the one shown in FIG. 4A and the spacers 20 were placed on the stripe-shaped black electroconductive members 21b (width: 300 μm) of the fluorescent film with the metal back 19 disposed therebetween.

Frit glass (not shown) was then applied to the contact areas of the substrate 11 and the rear plate 15, the rear plate and the lateral walls 16 and the face plate 17 and the lateral walls 16 and baked at 400 to 500° C. in the ambient air for more than 10 minutes to hermetically seal the container. The spacers 20 were bonded to the respective row-directed wirings 13 (width: 300 μm) on the substrate 11 by applying frit glass constituting the mechanically fixing member 40a and electroconductive frit glass constituting the electrically connecting member 40b containing an electroconductive material such as metal and baking it at 400 to 500° C. in the ambient air for more than 10 minutes so that electric connection was established therebetween.

For the above bonding operation, the substrate 11, the rear plate 15, the face plate 17 and the spacers 20 were carefully aligned in order to ensure an accurate positional correspondence between the color fluorescent members 21a (FIG. 4A) and cold cathode devices (surface conduction electron-emitting devices) 12.

The airtightly sealed container prepared in a manner as described above was then subjected to a series of processing steps of evacuation, energization forming, energization activation, sealing and getter operation as in the case of the preceding examples.

In order to drive the prepared image-display apparatus comprising a display panel as illustrated in FIGS. 31, 33, scan signals and modulation signals were applied to the cold cathode devices (surface conduction electron-emitting devices) 12 to emit electrons from respective signal generation means by way of the external terminals Dx1 through Dxm and Dy1 through Dyn, while a high voltage was applied to the metal back 19 by way of the high voltage terminal Hv so that electrons emitted from the cold cathode devices were accelerated by the high voltage and collided with the fluorescent film 18 to cause the fluorescent members 21a to excite to emit light and produce images. The voltage Va applied to the high voltage terminal Hv was from 3 kV to 10 kV, whereas the voltage Vf applied between the wirings 13 and 14 was 14V.

Under this condition, regularly arranged glowing spots were two-dimensionally formed at regular intervals on the display screen by electrons emitted from the cold cathode devices (surface conduction electron-emitting devices) 12 including those located near the spacers 20 to produce clear and sharp images on the screen. This proved that the spacers 20 did not give rise to any disturbances to the electric fields in the display apparatus that could adversely affect the trajectories of electrons.

Example 5-3

Figure 34A:
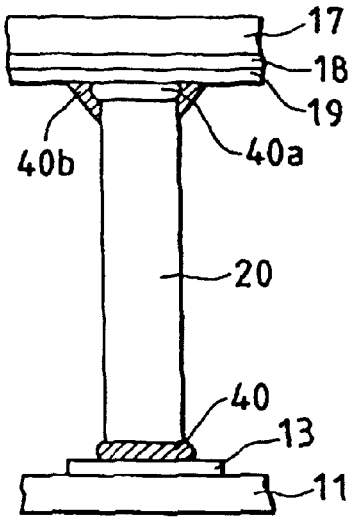
Figure 34B:
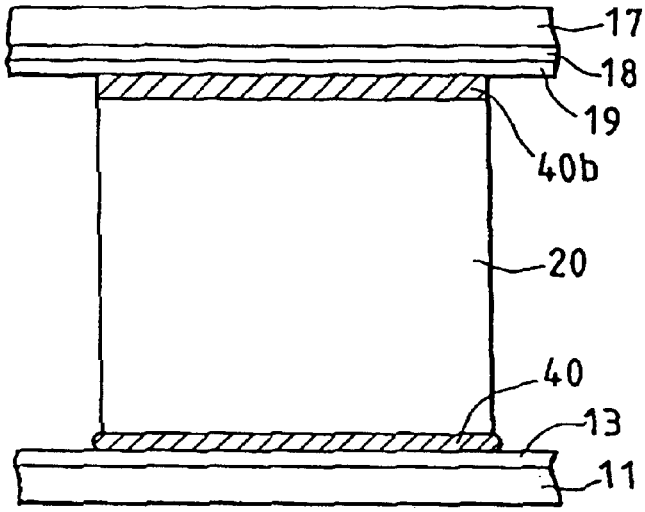
Figure 36:
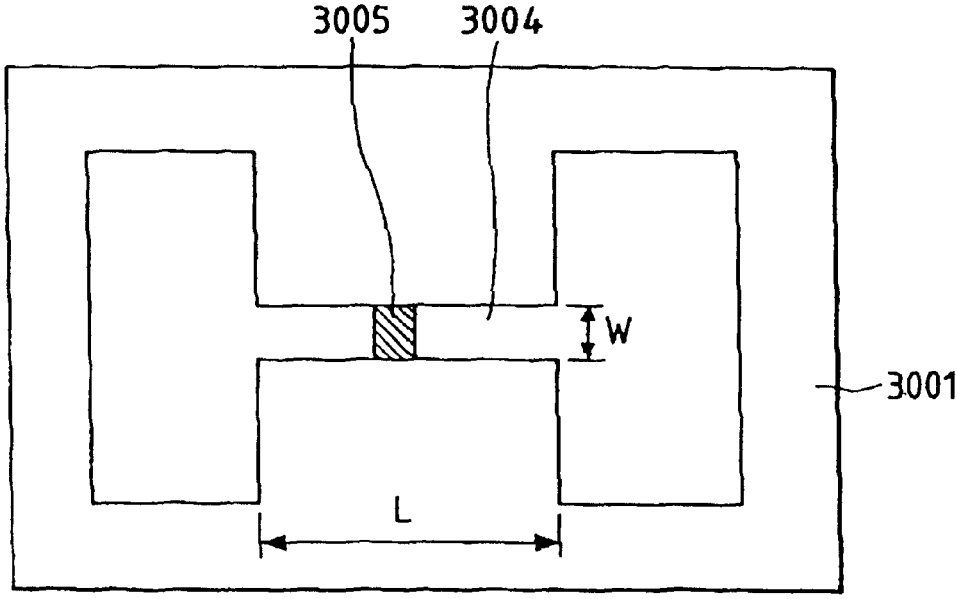
FIG. 36 PRIOR ART
FIG. 36 is a schematic plan view of a conventional surface conduction electron-emitting device.

This examples differs from Example 5-1 in that after mechanically securing the abutting members 40 to the face plate 17, an electroconductive material is arranged on part of the contact areas and the lateral surface of each abutting member for electric connection. On the side of the substrate 11, to the contrary, the abutting members 40 operated for both mechanical securing and electric connection. The electroconductive material was deposited on the abutting members on the side of the face plate 17 while the airtightly sealed container was being prepared. FIGS. 34A and 34B are schematic cross sectional views showing part of the image forming apparatus of FIG. 31 taken along lines 34A-34A and 34B-34B respectively.

Each of the spacers 20 (FIG. 7C) was prepared in a manner as described below. Firstly, a deposit of tin oxide was formed to a thickness of 1,000 angstroms by ion plating, using an electron beam method, in an argon/oxygen atmosphere as a semiconductor thin film 20b on the soda lime glass made insulating member 20a of the spacer 20 that had been thoroughly cleansed. The electric resistance of the surface of the semiconductor thin film 20b was about $1\times10^9$ Ω/□. Thereafter, Ti and Au films were sequentially formed thereon to respective thicknesses of 20 angstroms and 1,000 angstroms to produce spacer electrodes 20c. Electric connection between the semiconductor thin film 20b and the spacer electrodes 20c was also established in the above process.

An airtightly sealed container was prepared, following the steps described below.

Firstly, the spacers 20 (height: 5 mm, thickness: 200 μm, length: 20 mm) were bonded onto the metal back 19 on the face plate 17 by applying electroconductive frit glass containing an electroconductive material such as metal to the contact areas thereof and baking it at 400 to 500° C. in the ambient air for more than 10 minutes. Thus, the spacers 20 were mechanically secured and electrically connected to the metal back 19.

Note that the fluorescent film 18 of the display panel of FIG. 31 is same as the one shown in FIG. 4A and the spacers 20 were placed on the stripe-shaped black electroconductive members 21b (width: 300 μm) of the fluorescent film with the metal back 19 disposed therebetween.

Frit glass (not shown) was then applied to the contact areas of the substrate 11' and the rear plate 15, the rear plate and the lateral walls 16 and the face plate 17 and the lateral walls 16 and baked at 400 to 500° C. in the ambient air for more than 10 minutes to hermetically seal the container. The spacers 20 were bonded to the respective row-directed wirings 13 (width: 300 μm) on the substrate 11' by applying electroconductive frit glass 40 containing an electroconductive material such as metal and baking it at 400 to 500° C. in the ambient air for more than 10 minutes so that electric connection was established therebetween.

For the above bonding operation, the substrate 11, the rear plate 15, the face plate 17 and the spacers 20 were carefully aligned in order to ensure an accurate positional correspondence between the color fluorescent members 21a (FIG. 4A) and cold cathode devices (surface conduction electron-emitting devices) 12.

The airtightly sealed container prepared in a manner as described above was then subjected to a series of processing steps of evacuation, energization forming, energization activation, sealing and getter operation as in the case of the preceding examples.

In order to drive the prepared image-display apparatus comprising a display panel as illustrated in FIGS. 31 and 34, scan signals and modulation signals were applied to the cold cathode devices (surface conduction electron-emitting devices) 12 to emit electrons from respective signal generation means by way of the external terminals Dx1 through Dxm and Dy1 through Dyn, while a high voltage was applied to the metal back 19 by way of the high voltage terminal Hv so that electrons emitted from the cold cathode devices were accelerated by the high voltage and collided with the fluorescent film 18 to cause the fluorescent members 21a to excite to emit light and produce images. The voltage Va applied to the high voltage terminal Hv was from 3 kV to 10 kV, whereas the voltage Vf applied between the wirings 13 and 14 was 14V.

Under this condition, regularly arranged glowing spots were two-dimensionally formed at regular intervals on the display screen by electrons emitted from the cold cathode devices (surface conduction electron-emitting devices) 12 including those located near the spacers 20 to produce clear and sharp images on the screen. This proved that the spacers 20 did not give rise to any disturbances to the electric fields in the display apparatus that could adversely affect the trajectories of electrons.

As seen from the above description, the image display apparatuses of Examples 5-1 through 5-3 have the following effects in addition to those described earlier for Examples 1-1 through 1-4.

Firstly, while the semiconductor thin film 20b formed on each spacer 20 needs to be electrically connected to the substrate 11 and the face plate 17, the electric potential of the entire area of the spacer 20 that is held in contact with them can be stably maintained to a constant level by means of the spacer electrodes 20 arranged thereon so that, consequently, the potential distribution of the semiconductor thin film 20b electrically connected to the spacer electrodes 20c can be held to conform to a desired pattern.

Additionally, if each abutting member 40 is provided with a mechanical holding capability and an electric connecting capability that are independent from each other, the spacer can be mechanically secured and electrically connected in a more secure way.

Still additionally, if each spacer is provided with at least two electric connecting sections, the spacer can be electrically connected in a further secured way.

Finally, if an electric connecting section is formed on each spacer after forming a mechanical securing section, the entire process of manufacturing a display panel according to the invention can be designed with an enhanced level of adaptability that leads to an improved reliability, a reduced processing time and a lowered manufacturing cost.

Example 6

Figure 35:
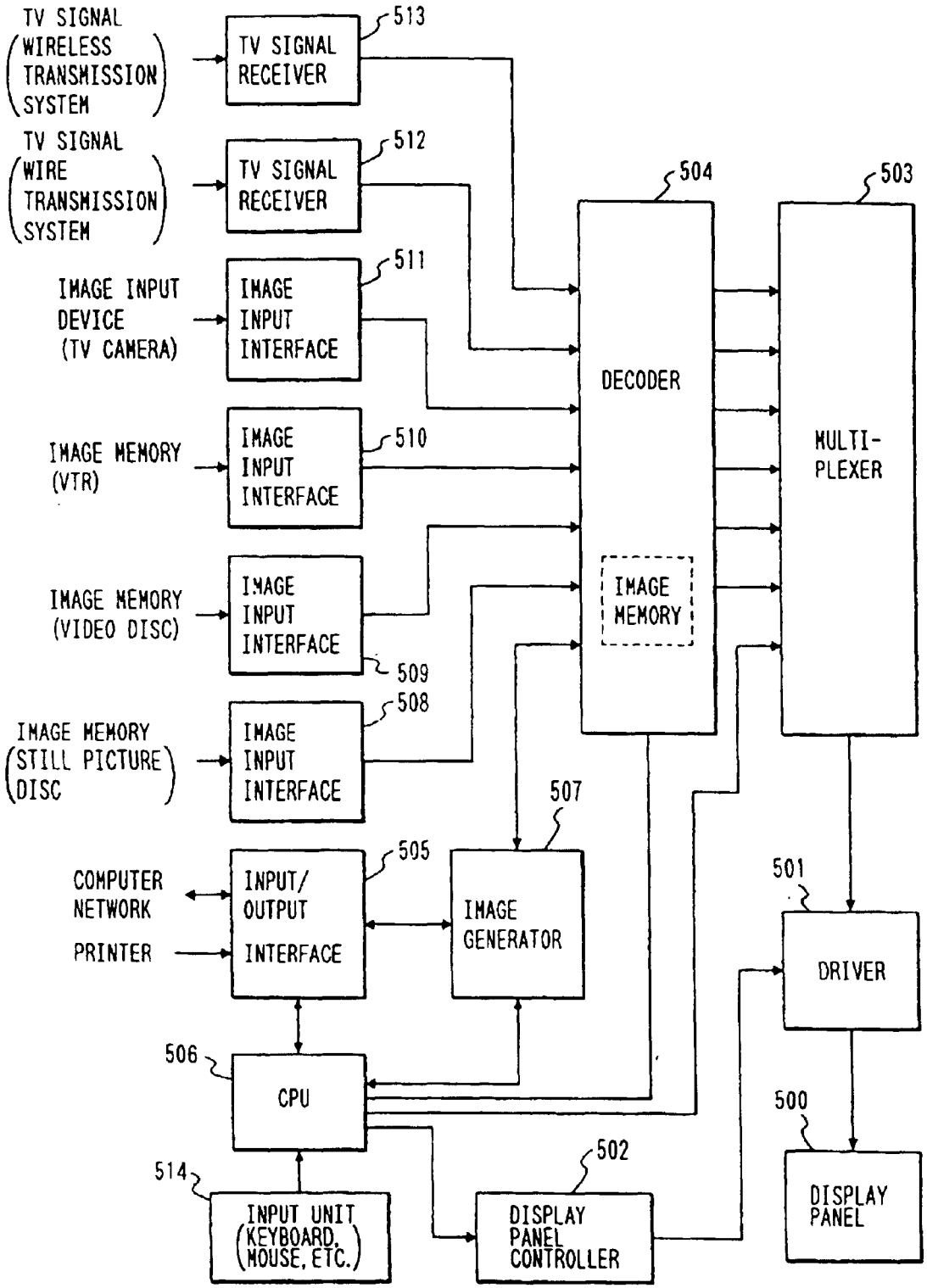
FIG. 35 is a block diagram of an image forming apparatus according to the invention.
Figure 37:
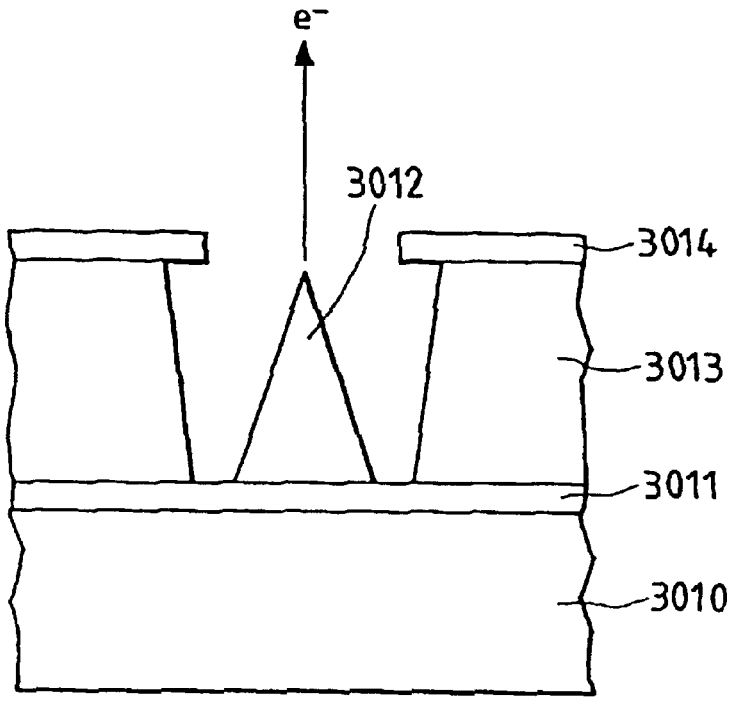
FIG. 37 PRIOR ART
FIG. 37 is a schematic cross sectional view of a conventional FE device.
Figure 38:
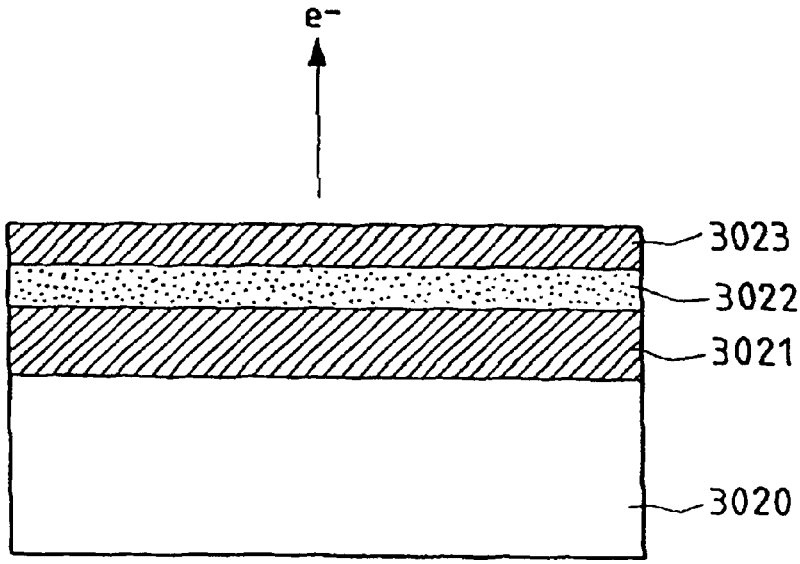
FIG. 38 PRIOR ART
FIG. 38 is a schematic cross sectional view of a conventional MIM device.

FIG. 35 is a block diagram of the display apparatus comprising an electron source realized by arranging a number of surface conduction electron-emitting devices and a display panel and designed to display a variety of visual data as well as pictures of television transmission in accordance with input signals coming from different signal sources. If the display apparatus is used for receiving television signals that are constituted by video and audio signals, circuits, speakers and other devices are required for receiving, separating, reproducing, processing and storing audio-signals along with the circuits shown in the drawing. However, such circuits and devices are omitted here in view of the scope of the present invention.

Now, the components of the apparatus will be described, following the flow of image signals therethrough.

Firstly, the TV signal reception circuit 513 is a circuit for receiving TV image signals transmitted via a wireless transmission system using electromagnetic waves and/or spatial optical telecommunication networks. The TV signal system to be used is not limited to a particular one and any system such as NTSC, PAL or SECAM may feasibly be used with it. It is particularly suited for TV signals involving a larger number of scanning lines (typically of a high definition TV system such as the MUSE system) because it can be used for a large display panel 500 comprising a large number of pixels. The TV signals received by the TV signal reception circuit 513 are forwarded to the decoder 504.

Secondly, the TV signal reception circuit 512 is a circuit for receiving TV image signals transmitted via a wired transmission system using coaxial cables and/or optical fibers. Like the TV signal reception circuit 513, the TV signal system to be used is not limited to a particular one and the TV signals received by the circuit are forwarded to the decoder 504.

The image input interface circuit 511 is a circuit for receiving image signals forwarded from an image input device such as a TV camera or an image pick-up scanner. It also forwards the received image signals to the decoder 504.

The image memory interface circuit 510 is a circuit for retrieving image signals stored in a video tape recorder (hereinafter referred to as VTR) and the retrieved image signals are also forwarded to the decoder 504.

The image memory interface circuit 509 is a circuit for retrieving image signals stored in a video disc and the retrieved image signals are also forwarded to the decoder 504.

The image memory interface circuit 508 is a circuit for retrieving image signals stored in a device for storing still image data such as so-called still disc and the retrieved image signals are also forwarded to the decoder 504.

The input/output interface circuit 505 is a circuit for connecting the display apparatus and an external output signal source such as a computer, a computer network or a printer. It carries out input/output operations for image data and data on characters and graphics and, if appropriate, for control signals and numerical data between the CPU 506 of the display apparatus and an external output signal source.

The image generation circuit 507 is a circuit for generating image data to be displayed on the display screen on the basis of the image data and the data on characters and graphics input from an external output signal source via the input/output interface circuit 505 or those coming from the CPU 506. The circuit comprises reloadable memories for storing image data and data on characters and graphics, read-only memories for storing image patterns corresponding given character codes, a processor for processing image data and other circuit components necessary for the generation of screen images.

Image data generated by the image generation circuit 507 for display are sent to the decoder 504 and, if appropriate, they may also be sent to an external circuit such as a computer network or a printer via the input/output interface circuit 505.

The CPU 506 controls the display apparatus and carries out the operation of generating, selecting and editing images to be displayed on the display screen.

For example, the CPU 506 sends control signals to the multiplexer 503 and appropriately selects or combines signals for images to be displayed on the display screen. At the same time it generates control signals for the display panel controller 502 and controls the operation of the display apparatus in terms of image display frequency, scanning method (e.g., interlaced scanning or non-interlaced scanning), the number of scanning lines per frame and so on.

The CPU 506 also sends out image data and data on characters and graphic directly to the image generation circuit 507 and accesses external computers and memories via the input/output interface circuit 505 to obtain external image data and data on characters and graphics.

The CPU 506 may additionally be so designed as to participate other operations of the display apparatus including the operation of generating and processing data like the CPU of a personal computer or a word processor.

The CPU 506 may also be connected to an external computer network via the input/output interface circuit 505 to carry out computations and other operations, cooperating therewith.

The input section 514 is used for forwarding the instructions, programs and data given to it by the operator to the CPU 506. As a matter of fact, it may be selected from a variety of input devices such as keyboards, mice, joysticks, bar code readers and voice recognition devices as well as any combinations thereof.

The decoder 504 is a circuit for converting various image signals input via said circuits 507 through 513 back into signals for three primary colors, luminance signals and I and Q signals. Preferably, the decoder 504 comprises image memories as indicated by a dotted line in FIG. 35 for dealing with television signals such as those of the MUSE system that require image memories for signal conversion. The provision of image memories additionally facilitates the display of still images as well as such operations as thinning out, interpolating, enlarging, reducing, synthesizing and editing frames to be optionally carried out by the decoder 504 in cooperation with the image generation circuit 507 and the CPU 506.

The multiplexer 503 is used to appropriately select images to be displayed on the display screen according to control signals given by the CPU 506. In other words, the multiplexer 503 selects certain converted image signals coming from the decoder 504 and sends them to the drive circuit 501. It can also divide the display screen in a plurality of frames to display different images simultaneously by switching from a set of image signals to a different set of image signals within the time period for displaying a single frame.

The display panel controller 502 is a circuit for controlling the operation of the drive circuit 501 according to control signals transmitted from the CPU 506.

Among others, it operates to transmit signals to the drive circuit 501 for controlling the sequence of operations of the power source (not shown) for driving the display panel in order to define the basic operation of the display panel 500.

It also transmits signals to the drive circuit 501 for controlling the image display frequency and the scanning method (e.g., interlaced scanning or non-interlaced scanning) in order to define the mode of driving the display panel 500.

If appropriate, it also transmits signals to the drive circuit 501 for controlling the quality of the images to be displayed on the display screen in terms of luminance, contrast, color tone and sharpness.

The drive circuit 501 is a circuit for generating drive signals to be applied to the display panel 500. It operates according to image signals coming from said multiplexer 503 and control signals coming from the display panel controller 502.

A display apparatus according to the invention and having a configuration as described above and illustrated in FIG. 35 can display on the display panel 500 various images given from a variety of image data sources. More specifically, image signals such as television image signals are converted back by the decoder 504 and then selected by the multiplexer 503 before sent to the drive circuit 501. On the other hand, the display controller 502 generates control signals for controlling the operation of the drive circuit 501 according to the image signals for the images to be displayed on the display panel 500. The drive circuit 501 then applies drive signals to the display panel 500 according to the image signals and the control signal. Thus, images are displayed on the display panel 500. All the above described operations are controlled by the CPU 506 in a coordinated manner.

The above described display apparatus can not only select and display particular images out of a number of images given to it but also carry out various image processing operations including those for enlarging, reducing, rotating, emphasizing edges of, thinning out, interpolating, changing colors of and modifying the aspect ratio of images and editing operations including those for synthesizing, erasing, connecting, replacing and inserting images as the image memories incorporated in the decoder 504, the image generation circuit 507 and the CPU 506 participate such operations. Although not described with respect to the above embodiment, it is possible to provide it with additional circuits exclusively dedicated to audio signal processing and editing operations.

The above described display apparatus can not only select and display particular pictures out of a number of images given to it but also carry out various image processing operations including those for enlarging, reducing, rotating, emphasizing edges of, thinning out, interpolating, changing colors of and modifying the aspect ratio of images and editing operations including those for synthesizing, erasing, connecting, replacing and inserting images as the image memories incorporated in the decoder 504, the image generation circuit 507 and the CPU 506 participate such operations. Although not described with respect to the above embodiments, it is possible to provide it with additional circuits exclusively dedicated to audio signal processing and editing operations.

Thus, a display apparatus according to the invention and having a configuration as described above can have a wide variety of industrial and commercial applications because it can operate as a display apparatus for television broadcasting, as a terminal apparatus for video teleconferencing, as an editing apparatus for still and movie pictures, as a terminal apparatus for a computer system, as an OA apparatus such as a word processor, as a game machine and in many other ways.

It may be needless to say that FIG. 35 shows only an example of possible configuration of a display apparatus comprising a display panel provided with an electron source prepared by arranging a number of surface conduction electron-emitting devices and the present invention is not limited thereto. For example, some of the circuit components of FIG. 35 may be omitted or additional components may be arranged there depending on the application. For instance, if a display apparatus according to the invention is used for visual telephone, it may be appropriately made to comprise additional components such as a television camera, a microphone, lighting equipment and transmission/reception circuits including a modem.

Since a display apparatus according to the invention comprises a display panel that is provided with an electron source prepared by arranging a large number of surface conduction electron-emitting device and hence adaptable to reduction in the depth, the overall apparatus can be made very thin. Additionally, since a display panel comprising an electron source prepared by arranging a large number of surface conduction electron-emitting devices is adapted to have a large display screen with an enhanced luminance and provide a wide angle for viewing, it can offer really impressive scenes to the viewers with a sense of presence.

Other examples

The present invention can be applied to any electron-emitting devices other than surface conduction electron-emitting devices so long as they are cold cathode type electron-emitting devices. Specific examples include a field emission type (FE type) electron-emitting device comprising a pair of electrodes arranged along the surface of a substrate that operates as an electron source as disclosed in Japanese Patent Application Laid-Open No. 63-274047 of the inventors of the present invention and a metal/insulation layer/metal (MIM type) electron-emitting device.

Additionally, the present invention can be applied to image forming apparatuses comprising an electron source other than that of the sample matrix type. Examples of such apparatuses include an image forming apparatus proposed by the inventors of the present invention and disclosed in Japanese Patent Application Laid-Open No. 2-257551 comprising control electrodes for selecting surface conduction electron-emitting devices, wherein spacers of the above described type are used between the face plate and the control electrodes and between the electron source and the control electrodes.

While the spacers and the lateral walls were coated with a semiconductor thin film in the above examples, they may be replaced by spacers and lateral walls that are semiconductor per se. If such is the case, the spacers and the lateral walls do not require any semiconductor film to be formed thereon.

The basic concept of the present invention can be applied not only to image forming apparatuses for displaying images. An image forming apparatus according to the invention can be used as a light source and replace the light emitting diodes of an optical printer comprising a photosensitive drum and light emitting diodes. In such a case, it can be used not only as a line type light source but also as a two-dimensional light source that can be operated by appropriately selecting the m row-directed wirings and the n column-directed wirings. Then, the fluorescent members of the above examples that emit light directly may be replaced by members that form latent images when charged with electrons.

Finally, the concept of the present invention can be applied to an arrangement where the members irradiated with electrons emitted from an electron source are not image forming members as in the case of an electronic microscope. Therefore, an electron beam generating apparatus that does not comprise any determined object of irradiation is also found within the scope of the invention.

What is claimed is:

1. An electron beam apparatus comprising:

a vacuum envelope containing a plurality of electron-emitting devices wired by a plurality of row-directed wires and a plurality of column-directed wires to form a matrix wiring structure; and a plate-shaped spacer capable of forming an electrical connection between a plurality of wires if arranged in electrical contact with the plurality of wires, said spacer being in electrical contact with only one wire of said row-directed or column-directed wires, wherein said row-directed wires are laminated over said column-directed wires and said spacer is in electrical contact with one of said row-directed wires, or wherein said column-directed wires are laminated over said row-directed wires and said spacer is in electrical contact with one of said column-directed wires.

2. An electron beam apparatus according to claim 1, wherein said plate-shaped spacer is rectangularly parallelepiped in such a way that the longitudinal direction thereof is in parallel with one of said row-directed or column-directed wires with which said spacer is in electrical contact.

3. An electron beam apparatus according to claim 1, wherein said spacer has a semiconductor film on its surface.

4. An electron beam apparatus according to claim 1, wherein said apparatus further comprises a target arranged to be irradiated with an electron beam emitted from said electron-emitting devices.

5. An electron beam apparatus according to claim 1, wherein said spacer is in electrical-contact with another electrode in addition to one of said row-directed or column-directed wires.

6. An electron beam apparatus according to claim 5, wherein different electric potentials are applied to said another electrode and said one of said row-directed or column-directed wires.

7. An electron beam apparatus according to claim 1, wherein said spacer is located on the wire with which said spacer is in electrical contact.

8. An electron beam apparatus according to claim 6, wherein said spacer is located on the wire with which said spacer is in electrical contact.

*9. An electron beam apparatus comprising:*

*a vacuum envelope containing a plurality of electron-emitting devices wired by a plurality of row-directed wires and a plurality of column-directed wires to form a matrix wiring structure; and*

*a spacer capable of forming an electrical connection between a plurality of wires if arranged in electrical contact with the plurality of wires, said spacer being in electrical contact with only one wire of said row-directed or column-directed wires, wherein*

*said row-directed wires are laminated over said column-directed wires and said spacer is in electrical contact with one of said row-directed wires, or wherein said column-directed wires are laminated over said row-directed wires and said spacer is in electrical contact with one of said column-directed wires.*

*10. An electron beam apparatus comprising:*

*an electron source having a plurality of wirings comprised of row-directed wires and column-directed wires and a plurality of electron-emitting devices connected to said plurality of wirings;*

*an electrode for controlling electrons emitted from said electron source;*

*a target irradiated with electrons emitted from said electron source; and*

*a spacer arranged between said electron source and said electrode,*

*wherein said spacer contacts only one of said wirings and contacts said electrode to make an electrical connection between said one wiring and said electrode, and*

*said row-directed wires are laminated over said column-directed wires and said spacer is in electrical contact*

*with one of said row-directed wires, or wherein said column-directed wires are laminated over said row-directed wires and said spacer is in electrical contact with one of said column-directed wires.*

*11. The electron beam apparatus according to claim 10, wherein said spacer is column-shaped.*

*12. The electron beam apparatus according to claim 10, wherein said spacer comprises an insulating member and a semi-conductive film coating said insulating member.*

*13. The electron beam apparatus according to claim 10, wherein said spacer has a conductive film at its surface contacting said electron source and said electrode.*

*14. The electron beam apparatus according to claim 10, wherein said spacer is rectangular in shape and disposed between said one wiring and said electrode so that a longitudinal direction of said spacer is parallel to said wiring.*

*15. The electron beam apparatus according to claim 10, wherein said electrode is disposed on said target.*

*16. The electron beam apparatus according to claim 10, wherein*

*said plurality of electron-emitting devices are arranged in a matrix and connected to row and column wirings of said wirings, and*

*said spacer is disposed between and contacts said wirings and said electrodes.*

*17. The electron beam apparatus according to claim 10, wherein said electrode accelerates the electrons emitted from said electron source.*

*18. The electron beam apparatus according to claim 10, wherein said spacer has a sheet resistance of* $10^5$-$10^{12}$ *Ω/square.*

*19. The electron beam apparatus according to claim 10, wherein said electron-emitting device is a cold cathode device.*

*20. The electron beam apparatus according to claim 10, wherein said electron-emitting device comprises a pair of electrodes and an electroconductive film including an electron emitting area.*

*21. The electron beam apparatus according to claim 10, wherein said electron-emitting device is a surface conduction electron-emitting device.*

*22. The electron beam apparatus according to claim 10, wherein an image is formed by irradiating said target with electrons emitted from said electron source according to an input signal.*

*23. The electron beam apparatus according to claim 10, wherein said target is a fluorescent member.*

* * * * *